(12) United States Patent
Kuriyama

(10) Patent No.: US 6,819,546 B2
(45) Date of Patent: Nov. 16, 2004

(54) PACKAGED SOLID ELECTROLYTIC CAPACITOR AND METHOD OF MAKING THE SAME

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/008,934

(22) Filed: Nov. 9, 2001

(65) Prior Publication Data

US 2002/0054470 A1 May 9, 2002

Related U.S. Application Data

(62) Division of application No. 09/580,344, filed on May 25, 2000, now Pat. No. 6,346,127.

(30) Foreign Application Priority Data

| Jun. 1, 1999 | (JP) | ............................................. 11-153816 |
| Jun. 1, 1999 | (JP) | ............................................. 11-153817 |
| Jun. 1, 1999 | (JP) | ............................................. 11-153818 |
| Nov. 30, 1999 | (JP) | ............................................. 11-340980 |

(51) Int. Cl.$^7$ .............................. H01G 9/08; H01G 9/10; H01G 9/00

(52) U.S. Cl. .......................... 361/535; 361/538; 361/540
(58) Field of Search .............................. 361/306.1, 307, 361/308.1, 310, 523, 531, 533, 535, 537–540; 29/25.03

(56) References Cited

U.S. PATENT DOCUMENTS

| 4,417,298 A | | 11/1983 | Nakata et al. |
| 4,497,105 A | * | 2/1985 | Uemura |
| 4,814,946 A | * | 3/1989 | Su |
| 4,876,451 A | * | 10/1989 | Ikeda et al. |
| 5,390,074 A | * | 2/1995 | Gasegawa et al. |
| 5,850,332 A | | 12/1998 | Kunieda et al. |
| 6,011,683 A | | 1/2000 | Dat |
| 6,214,060 B1 | | 4/2001 | Kuriyama |

* cited by examiner

Primary Examiner—Ha Tran Nguyen
(74) Attorney, Agent, or Firm—Merchant & Gould P.C.

(57) ABSTRACT

A solid electrolytic capacitor is provided which includes a capacitor element having an anode and a cathode, a sheet member for mounting the capacitor element, and a protection package formed on the sheet member to enclose the capacitor element. The sheet member is provided with an anode terminal and a cathode terminal which are connected to the anode and the cathode, respectively.

15 Claims, 73 Drawing Sheets

US 6,819,546 B2

PACKAGED SOLID ELECTROLYTIC CAPACITOR AND METHOD OF MAKING THE SAME

This application is a divisional of application Ser. No. 09/580,344, filed May 25, 2000 now U.S. Pat. No. 6,346,127 which application(s) are incorporated herein by reference.

BACKGROUND OF THE INVENTION

1. Field of the Invention

The present invention relates to a packaged solid electrolytic capacitor of the type which comprises a capacitor element made of a valve metal such as tantalum, niobium or aluminum, and a synthetic resin package enclosing the capacitor element. The present invention also relates to a method of making such a capacitor.

2. Description of the Related Art

A conventional method for collectively producing a plurality of packaged solid electrolytic capacitors may utilize a metal lead frame as shown in FIG. 154 of the accompanying drawings. Specifically, the illustrated lead frame A is elongated in one direction and includes a number of pairs of right and left lead portions B and C. The respective pairs of the lead portions B and C are arranged at regular intervals longitudinally of the lead frame A. As shown, a capacitor element D is mounted on each pair of the right and left lead portions B, C.

Each capacitor element D is provided with an anode D1 and a cathode D2 which are connected to the right lead portion B and the left lead portion C, respectively. After being thus mounted, the capacitor element D as a whole is enclosed by a protection package E made of a thermosetting resin. Then, the packaged capacitor element D is cut off the lead frame A, with the paired lead portions B and C remaining to protrude from the package E. Finally, as shown in FIG. 155, the protruding lead portions B and C are downwardly bent and further toward the bottom surface of the package E.

According to the conventional method, the respective packages E are made separately from each other by e.g. transfer molding of a synthetic resin. In this manner, disadvantageously, each package E tends to be rather bulky to compensate for inaccurate mounting of the capacitor element D. Specifically, as indicated by broken lines in FIGS. 155 and 156, the capacitor element D to be mounted on the lead portions B and C may positionally deviate vertically (FIG. 155) and/or horizontally (FIG. 156). To deal with such positional deviation, it is necessary to cause the vertical dimensions H1' and H2' of the package E (FIG. 155) and the horizontal dimension W1' (FIG. 156) to be unduly large. Accordingly, the overall height H' and width W' of the conventional capacitor need to be increased. This means that the volumetric efficiency or ratio of the capacitor element to the entirety of the capacitor is degraded. Disadvantageously, the conventional capacitor is unduly large for the capacitance of the capacitor element.

Further, the conventional capacitor is provided with two protruding leads B, C bent toward the bottom surface of the package E to be surface-mounted onto e.g. a printed circuit board. With such leads B and C provided, the overall weight and length L of the conventional capacitor are unnecessarily increased, and the production cost becomes unduly large.

SUMMARY OF THE INVENTION

It is, therefore, an object of the present invention to provide a solid electrolytic capacitor designed to overcome the above problems.

Another object of the present invention is to provide a method of making such capacitors collectively.

According to a first aspect of the present invention, there is provided a solid electrolytic capacitor comprising: a capacitor element having an anode and a cathode; a base sheet member having an obverse surface for mounting the capacitor element and a reverse surface opposite to the obverse surface; a protection package formed on the obverse surface of the sheet member to enclose the capacitor element, the package having a first side surface adjacent to the anode of the capacitor element and a second side surface opposite to the first side surface; a conductive outer anode layer electrically connected to the anode of the capacitor element; and a conductive outer cathode layer electrically connected to the cathode of the capacitor element. The outer anode layer is formed on at least either one of the package and the sheet member. Likewise, the outer cathode layer is formed on at least either one of the package and the sheet member.

With the above arrangement, the overall height of the capacitor is rendered smaller than that of the conventional capacitor, since the capacitor element is supported by the base sheet member. Further, since the capacitor element is mounted on the sheet member, the positional deviation of the capacitor element is advantageously reduced.

According to a preferred embodiment, the solid electrolytic capacitor may further comprise an upper sheet member for shielding the capacitor element. In this case, the capacitor element may be arranged between the base sheet member and the upper sheet member.

Preferably, the package may be formed with an at least partially slanted portion so that the polarities of the anode layer and the cathode layer are readily discerned.

Preferably, the outer anode layer may be formed on at least either one of the first side surface of the package and the reverse surface of the base sheet member. Likewise, the outer cathode layer may be formed on at least either one of the second side surface of the package and the reverse surface of the base sheet member.

According to a preferred embodiment, the anode may be exposed at the first side surface of the package to come into contact with the outer anode layer.

According to another preferred embodiment, the solid electrolytic capacitor may further comprise a metal piece attached to the anode of the capacitor element. The metal piece may be exposed at the first side surface of the package to come into contact with the outer anode layer.

According to another preferred embodiment, the solid electrolytic capacitor may comprise both a metal piece attached to the anode of the capacitor element and an anode connection layer formed on the obverse surface of the base sheet member. The anode connection layer may be connected to the metal piece and exposed at the first side surface of the package to come into contact with the outer anode layer.

According to another preferred embodiment, the base sheet member may be formed with a through-hole for connecting the anode connection layer to the outer anode layer.

According to another preferred embodiment, the solid electrolytic capacitor may further comprise a cathode connection layer formed on the obverse surface of the base sheet member and connected to the cathode of the capacitor element. The cathode connection layer may be exposed at the second side surface of the package to come into contact with the outer cathode layer.

Preferably, the solid electrolytic capacitor may comprise a cathode bump arranged on the cathode of the capacitor element. The cathode bump may be exposed at the second side surface of the package to come into contact with the outer cathode layer.

According to a preferred embodiment, the solid electrolytic capacitor may comprise a cathode connection layer formed on the obverse surface of the base sheet member and connected to the cathode of the capacitor element. The base sheet member may be formed with a through-hole for connecting the cathode connection layer to the outer cathode layer.

According to a second aspect of the present invention, there is provided a method of making a solid electrolytic capacitor comprising the steps of: preparing a sheet member having an obverse surface and a reverse surface, the obverse surface being provided with at least one cathode connection layer; placing a capacitor element having an anode and a cathode onto the obverse surface of the sheet member so that the cathode of the capacitor element comes into contact with the cathode connection layer; forming a resin plate on the obverse surface of the sheet member to enclose the capacitor element; cutting the resin plate to generate a first cut surface and a second cut surface, the anode of the capacitor element being exposed at the first cut surface, the cathode connection layer being exposed at the second cut surface; forming an anode terminal layer on the first cut surface; forming a cathode terminal layer on the second cut surface; and cutting the resin plate to provide a product capacitor.

Preferably, at least either one of the first and the second cut surfaces may include an at least partially slanted portion.

According to a third aspect of the present invention, there is provided a method of making a solid electrolytic capacitor comprising the steps of: preparing a sheet member having an obverse surface and a reverse surface, the obverse surface being provided with at least one cathode connection layer, the reverse surface being provided with at least one cathode electrode layer, the sheet member being formed with a through-hole for electrically connecting the cathode connection layer to the cathode electrode layer; placing a capacitor element having an anode and a cathode onto the obverse surface of the sheet member so that the cathode of the capacitor element comes into contact with the cathode connection layer; forming a resin plate on the obverse surface of the sheet member to enclose the capacitor element; cutting the resin plate to generate a first cut surface and a second cut surface, the anode of the capacitor element being exposed at the first cut surface; forming an anode terminal layer on the first cut surface; and cutting the resin plate to provide a product capacitor.

According to a fourth aspect of the present invention, there is provided a method of making a solid electrolytic capacitor comprising the steps of: preparing a sheet member having an obverse surface and a reverse surface, the obverse surface being provided with at least one cathode connection layer; preparing at least one capacitor element having an anode and a cathode; attaching a metal piece to the anode of the capacitor element; placing the capacitor element onto the obverse surface of the sheet member so that the cathode of the capacitor element comes into contact with the cathode connection layer; forming a resin plate on the obverse surface of the sheet member to enclose the capacitor element; cutting the resin plate to generate a first cut surface and a second cut surface, the metal piece of the capacitor element being exposed at the first cut surface, the cathode connection layer being exposed at the second cut surface; forming an anode terminal layer on the first cut surface; forming a cathode terminal layer on the second cut surface; and cutting the resin plate to provide a product capacitor.

According to a fifth aspect of the present invention, there is provided a method of making a solid electrolytic capacitor comprising the steps of: preparing a sheet member having an obverse surface and a reverse surface, the obverse surface being provided with at least one cathode connection layer, the reverse surface being provided with at least one cathode electrode layer, the sheet member being formed with an through-hole for electrically connecting the cathode connection layer to the cathode electrode layer; preparing a capacitor element having an anode and a cathode; attaching a metal piece to the anode of the capacitor element; placing the capacitor element onto the obverse surface of the sheet member so that the cathode of the capacitor element comes into contact with the cathode connection layer; forming a resin plate on the obverse surface of the sheet member to enclose the capacitor element; cutting the resin plate to generate a first cut surface and a second cut surface, the metal piece of the capacitor element being exposed at the first cut surface; forming an anode terminal layer on the first cut surface; and cutting the resin plate to provide a product capacitor.

According to a sixth aspect of the present invention, there is provided a method of making a solid electrolytic capacitor comprising the steps of: preparing a capacitor element having an anode, a cathode and a cathode bump formed on the cathode; placing the capacitor element onto a sheet member; forming a resin plate on the sheet member to enclose the capacitor element; cutting the resin plate to generate a first cut surface and a second cut surface, the anode of the capacitor element being exposed at the first cut surface, the cathode bump being exposed at the second cut surface; forming an anode terminal layer on the first cut surface; forming a cathode terminal layer on the second cut surface; and cutting the resin plate to provide a product capacitor.

According to a seventh aspect of the present invention, there is provided a method of making a solid electrolytic capacitor comprising the steps of: preparing a capacitor element provided with a cathode, a cathode bump formed on the cathode, an anode, and a metal piece attached to the anode; placing the capacitor element onto a sheet member; forming a resin plate on the sheet member to enclose the capacitor element; cutting the resin plate to generate a first cut surface and a second cut surface, the metal piece of the capacitor element being exposed at the first cut surface, the cathode bump being exposed at the second cut surface; forming an anode terminal layer on the first cut surface; forming a cathode terminal layer on the second cut surface; and cutting the resin plate to provide a product capacitor.

According to an eighth aspect of the present invention, there is provided a method of making a solid electrolytic capacitor comprising the steps of: preparing a lower sheet member having an obverse surface and a reverse surface, the obverse surface being provided with at least one cathode connection layer; placing a capacitor element having an anode and a cathode onto the obverse surface of the lower sheet member so that the cathode of the capacitor element comes into contact with the cathode connection layer; stacking an upper sheet member on the capacitor element; supplying a resin material into a space between the lower and the upper sheet members to enclose the capacitor element; hardening the supplied resin material to form a resin plate attached to the lower and the upper sheet members, the resin plate and the lower and the upper sheet members constituting a plate assembly; cutting the plate assembly to generate a first cut surface and a second cut surface, the anode of the capacitor element being exposed at the first cut surface, the cathode connection layer being exposed at the second cut surface; forming an anode terminal layer on the first cut surface; forming a cathode terminal layer on the second cut surface; and cutting the plate assembly to provide a product capacitor.

According to a ninth aspect of the present invention, there is provided a method of making a solid electrolytic capacitor comprising the steps of: preparing a lower sheet member having an obverse surface and a reverse surface, the obverse surface being provided with at least one cathode connection layer, the reverse surface being provided with at least one cathode electrode layer, the lower sheet member being formed with a through-hole for electrically connecting the cathode connection layer to the cathode electrode layer; placing a capacitor element having an anode and a cathode onto the obverse surface of the sheet member so that the cathode of the capacitor element comes into contact with the cathode connection layer; stacking an upper sheet member on the capacitor element; supplying a resin material into a space between the lower and the upper sheet members to enclose the capacitor element; hardening the supplied resin material to form a resin plate attached to the lower and the upper sheet members, the resin plate and the lower and the upper sheet members constituting a plate assembly; cutting the plate assembly to generate a first cut surface and a second cut surface, the anode of the capacitor element being exposed at the first cut surface; forming an anode terminal layer on the first cut surface; and cutting the plate assembly to provide a product capacitor.

According to a tenth aspect of the present invention, there is provided a method of making a solid electrolytic capacitor comprising the steps of: preparing a lower sheet member having an obverse surface and a reverse surface, the obverse surface being provided with at least one cathode connection layer; preparing a capacitor element having a cathode, an anode, and a metal piece attached to the anode; placing the capacitor element onto the obverse surface of the lower sheet member so that the cathode of the capacitor element comes into contact with the cathode connection layer; stacking an upper sheet member on the capacitor element; supplying a resin material into a space between the lower and the upper sheet members to enclose the capacitor element; hardening the supplied resin material to form a resin plate attached to the lower and the upper sheet members, the resin plate and the lower and the upper sheet members constituting a plate assembly; cutting the plate assembly to generate a first cut surface and a second cut surface, the metal piece of the capacitor element being exposed at the first cut surface, the cathode connection layer being exposed at the second cut surface; forming an anode terminal layer on the first cut surface; forming a cathode terminal layer on the second cut surface; and cutting the plate assembly to provide a product capacitor.

According to an eleventh aspect of the present invention, there is provided a method of making a solid electrolytic capacitor comprising the steps of: preparing a capacitor element having an anode, a cathode and a cathode bump formed on the cathode; placing the capacitor element onto a lower sheet member; stacking an upper sheet member on the capacitor element; supplying a resin material into a space between the lower and the upper sheet members to enclose the capacitor element; hardening the supplied resin material to form a resin plate attached to the lower and the upper sheet members, the resin plate and the lower and the upper sheet members constituting a plate assembly; cutting the plate assembly to generate a first cut surface and a second cut surface, the anode of the capacitor element being exposed at the first cut surface, the cathode bump being exposed at the second cut surface; forming an anode terminal layer on the first cut surface; forming a cathode terminal layer on the second cut surface; and cutting the plate assembly to provide a product capacitor.

According to a twelfth aspect of the present invention, there is provided a method of making a solid electrolytic capacitor element comprising the steps of: preparing a capacitor element provided with a cathode, a cathode bump formed on the cathode, an anode, and a metal piece attached to the anode; placing the capacitor element onto a lower sheet member; stacking an upper sheet member on the capacitor element; supplying a resin material into a space between the lower and the upper sheet members to enclose the capacitor element; hardening the supplied resin material to form a resin plate attached to the lower and the upper sheet members, the resin plate and the lower and the upper sheet members constituting a plate assembly; cutting the plate assembly to generate a first cut surface and a second cut surface, the metal piece of the capacitor element being exposed at the first cut surface, the cathode bump being exposed at the second cut surface; forming an anode terminal layer on the first cut surface; forming a cathode terminal layer on the second cut surface; and cutting the plate assembly to provide a product capacitor.

According to a thirteenth aspect of the present invention, there is provided a method of making a solid electrolytic capacitor comprising the steps of: preparing a sheet member having an obverse surface and a reverse surface, the obverse surface being formed with at lease one pair of an anode connection layer and a cathode connection layer, the reverse surface being formed with at least one pair of an anode electrode layer and a cathode electrode layer, the sheet member being formed with a first through-hole for electrically connecting the anode connection layer to the anode electrode layer and with a second through-hole for electrically connecting the cathode connection layer to the cathode electrode layer; placing a capacitor element having an anode and a cathode onto the obverse surface of the sheet member so that the cathode of the capacitor element comes into contact with the cathode connection layer; forming a resin plate on the obverse surface of the sheet member to enclose the capacitor element; and cutting the resin plate to provide a product capacitor.

According to a fourteenth aspect of the present invention, there is provided a method of making a solid electrolytic capacitor comprising the steps of: preparing a sheet member having an obverse surface and a reverse surface, the obverse surface being formed with at lease one pair of an anode connection layer and a cathode connection layer, the reverse surface being formed with at least one pair of an anode electrode layer and a cathode electrode layer, the sheet member being formed with a first through-hole for electrically connecting the anode connection layer to the anode electrode layer and with a second through-hole for electrically connecting the cathode connection layer to the cathode electrode layer; preparing a capacitor element having an anode, a cathode and a metal piece attached to the anode; placing the capacitor element onto the sheet member so that the metal piece comes into contact with the anode connection layer and that the cathode comes into contact with the cathode connection layer; forming a resin plate on the sheet member to enclose the capacitor element; and cutting the resin plate to provide a product capacitor.

According to a fifteenth aspect of the present invention, there is provided a method of making a solid electrolytic capacitor comprising the steps of: preparing a lower sheet member having an obverse surface and a reverse surface, the obverse surface being formed with at lease one pair of an anode connection layer and a cathode connection layer, the reverse surface being formed with at least one pair of an anode electrode layer and a cathode electrode layer, the lower sheet member being formed with a first through-hole for electrically connecting the anode connection layer to the anode electrode layer and with a second through-hole for electrically connecting the cathode connection layer to the cathode electrode layer; placing a capacitor element having an anode and a cathode onto the lower sheet member so that the anode comes into contact with the anode connection layer and that the cathode comes into contact with the cathode connection layer; stacking an upper sheet member on the capacitor element; supplying a resin material into a space between the lower and the upper sheet members to enclose the capacitor element; hardening the supplied resin material to form a resin plate attached to the lower and the upper sheet members, the resin plate and the lower and the upper sheet members constituting a plate assembly; and cutting the plate assembly to provide a product capacitor.

According to a sixteenth aspect of the present invention, there is provided a method of making a solid electrolytic capacitor comprising the steps of: preparing a lower sheet member having an obverse surface and a reverse surface, the obverse surface being formed with at lease one pair of an anode connection layer and a cathode connection layer, the reverse surface being formed with at least one pair of an anode electrode layer and a cathode electrode layer, the lower sheet member being formed with a first through-hole for electrically connecting the anode connection layer to the anode electrode layer and with a second through-hole for electrically connecting the cathode connection layer to the cathode electrode layer; preparing a capacitor element having an anode, a cathode and a metal piece attached to the anode; placing the capacitor element onto the lower sheet member so that the metal piece comes into contact with the anode connection layer and that the cathode comes into contact with the cathode connection layer; stacking an upper sheet member on the capacitor element; supplying a resin material into a space between the lower and the upper sheet members to enclose the capacitor element; hardening the supplied resin material to form a resin plate attached to the lower and the upper sheet members, the resin plate and the lower and the upper sheet members constituting a plate assembly; and cutting the plate assembly to provide a product capacitor.

Other features and advantages of the present invention will become apparent from the detailed description given below with reference to the accompanying drawings.

BRIEF DESCRIPTION OF THE DRAWINGS

FIG. 120 is a sectional view showing the plate assembly of FIG. 119 with several cuts made therein;

FIG. 121 is a sectional view showing the plate assembly formed with terminal electrode layers;

FIG. 122 is a sectional view showing a different manner for cutting the plate assembly of FIG. 119;

FIG. 123 is a perspective view showing a solid electrolytic capacitor obtained by the fabrication method of the eleventh embodiment;

FIG. 124 is a sectional view taken along lines CXXIV—CXXIV in FIG. 123;

FIG. 125 is a sectional view taken along lines CXXV—CXXV in FIG. 124;

FIG. 126 is a perspective view showing a capacitor element used for implementing a fabrication method according to a twelfth embodiment of the present invention;

FIG. 127 is a sectional view showing a plate assembly formed by the fabrication method of the twelfth embodiment;

FIG. 128 is a sectional view showing the plate assembly of FIG. 127 with several cuts made therein;

FIG. 129 is a sectional view showing the divided resin plate with terminal electrode layers formed on its exposed cut surfaces;

FIG. 130 is a sectional view showing a solid electrolytic capacitor obtained by the fabrication method of the twelfth embodiment;

FIG. 131 is a sectional view showing a different type of solid electrolytic capacitor according to the twelfth embodiment;

Figure 132:
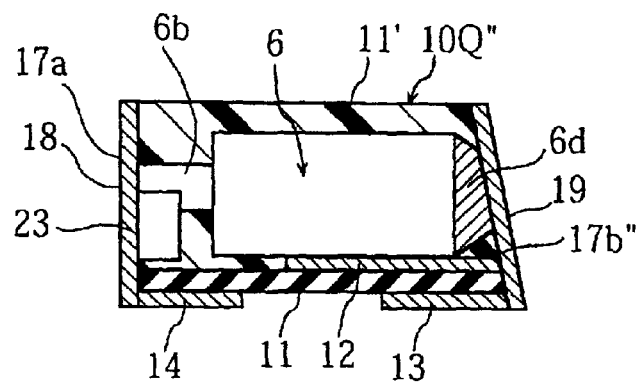
Figure 133:
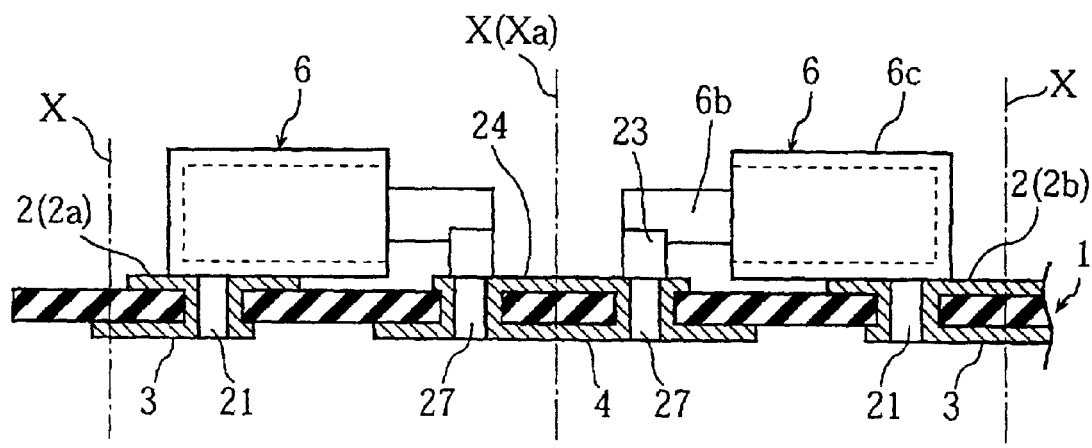
Figure 134:
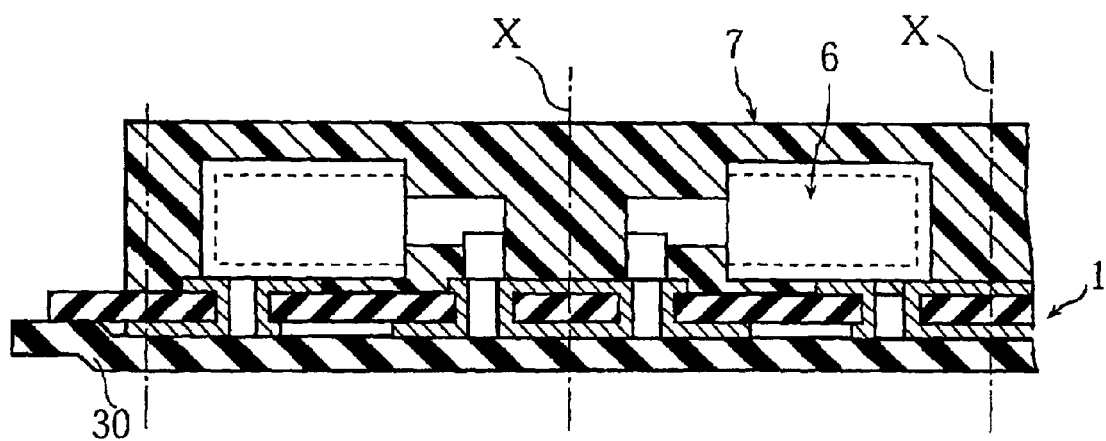
Figure 135:
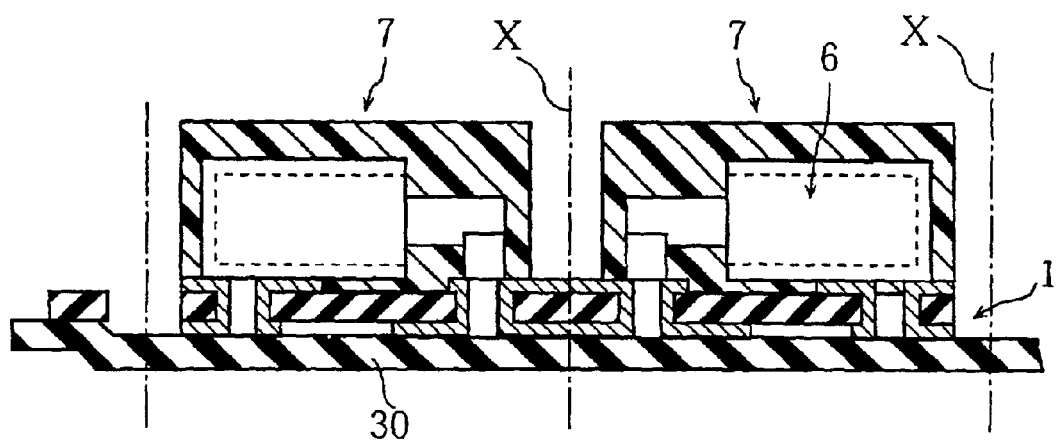
Figure 136:
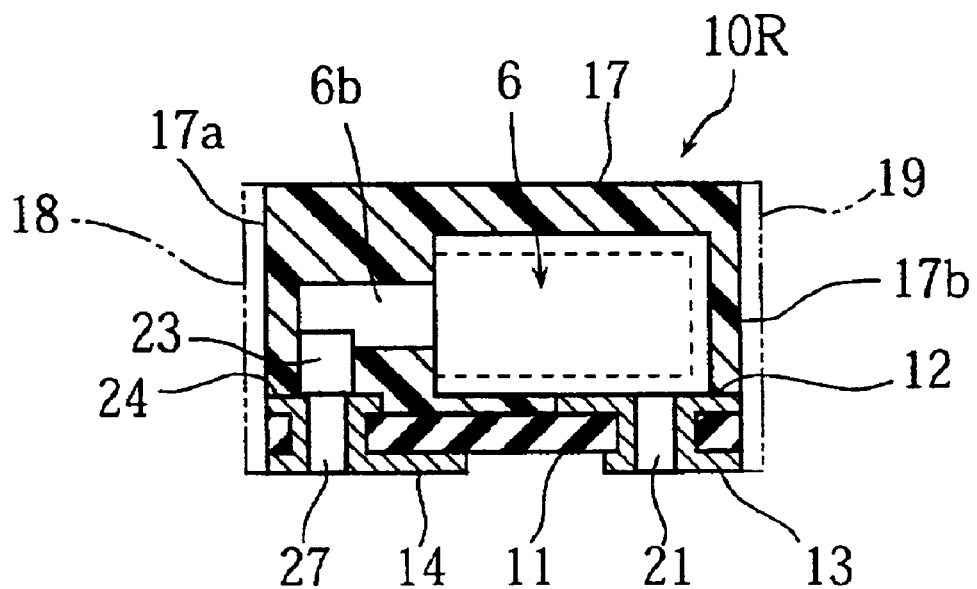
Figure 137:
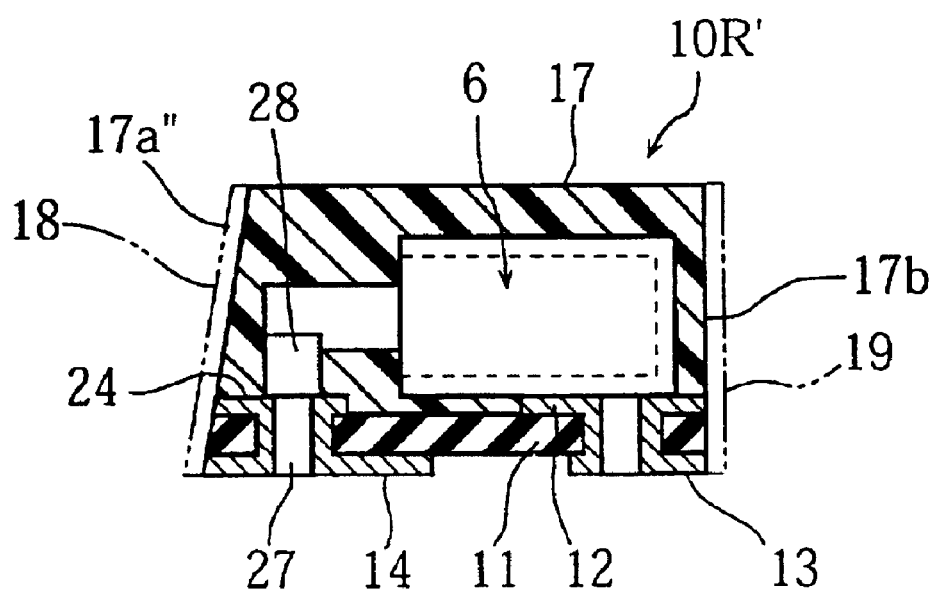
Figure 138:
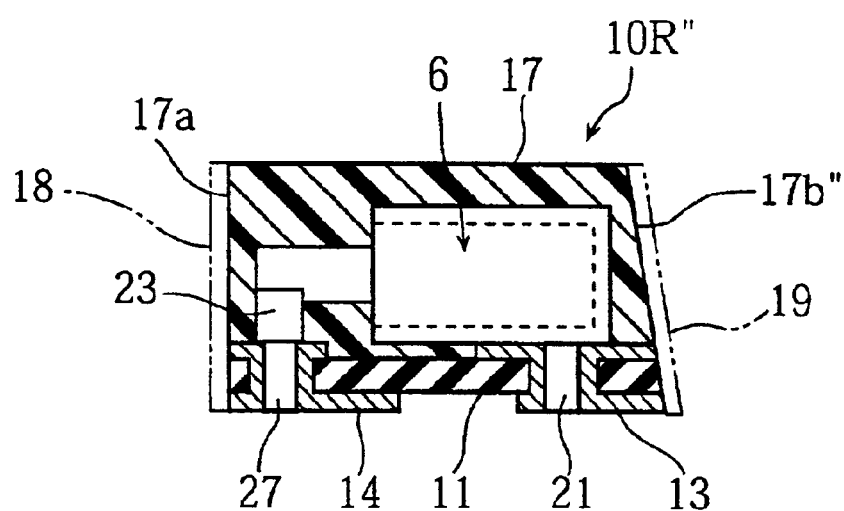
Figure 139:
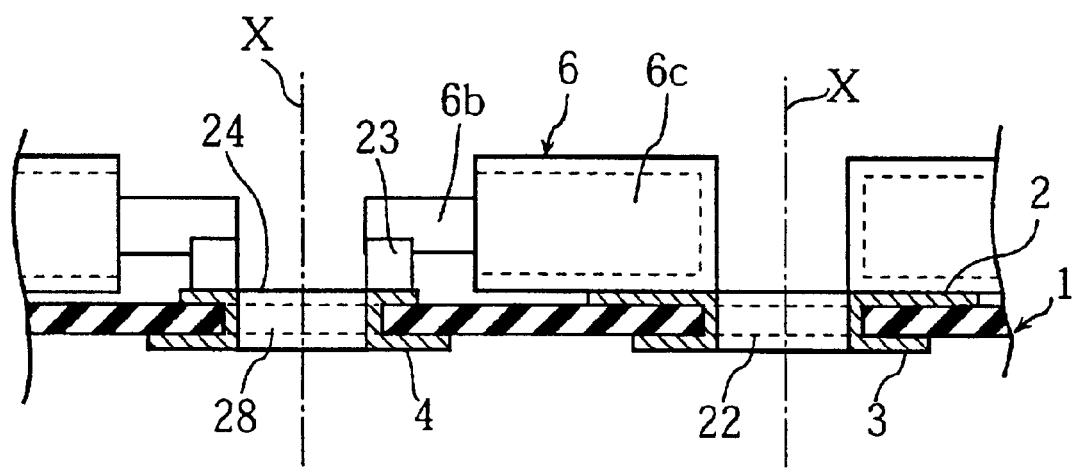
Figure 140:
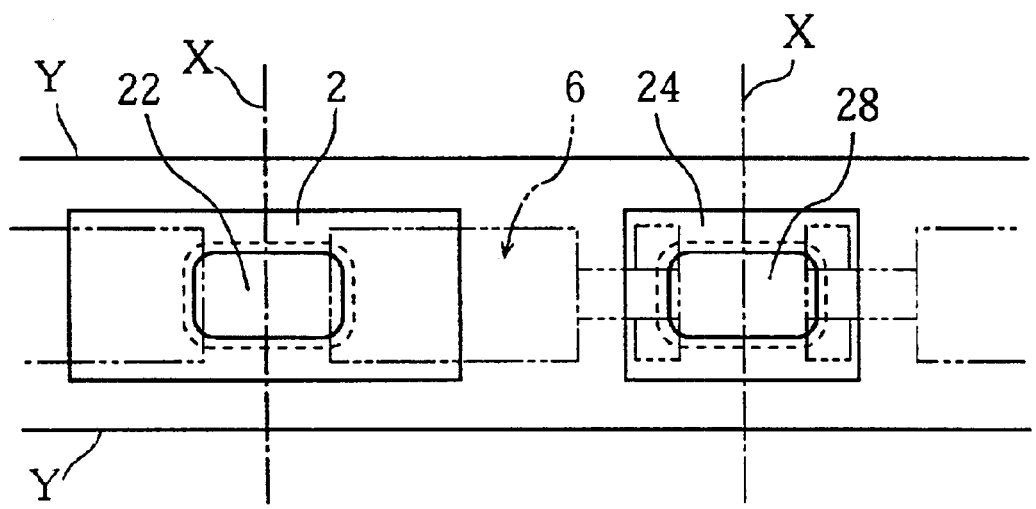
Figure 141:
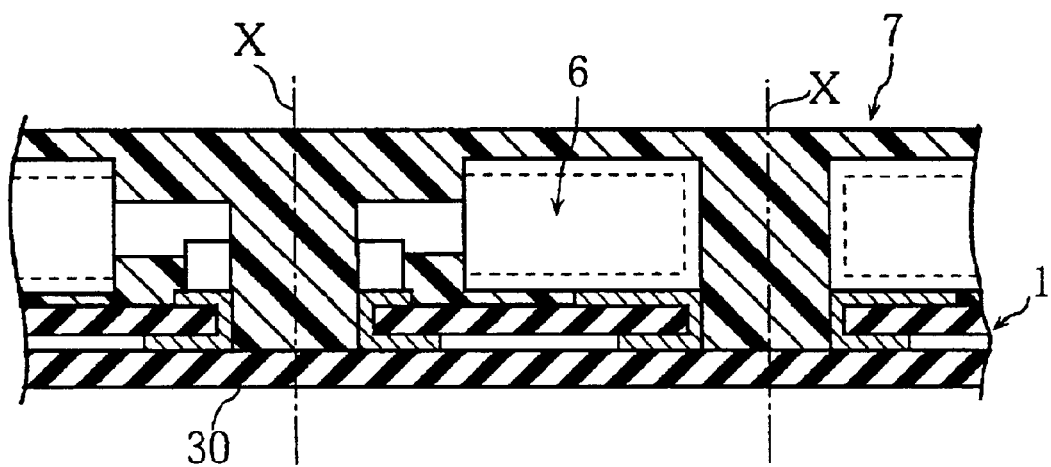
Figure 142:
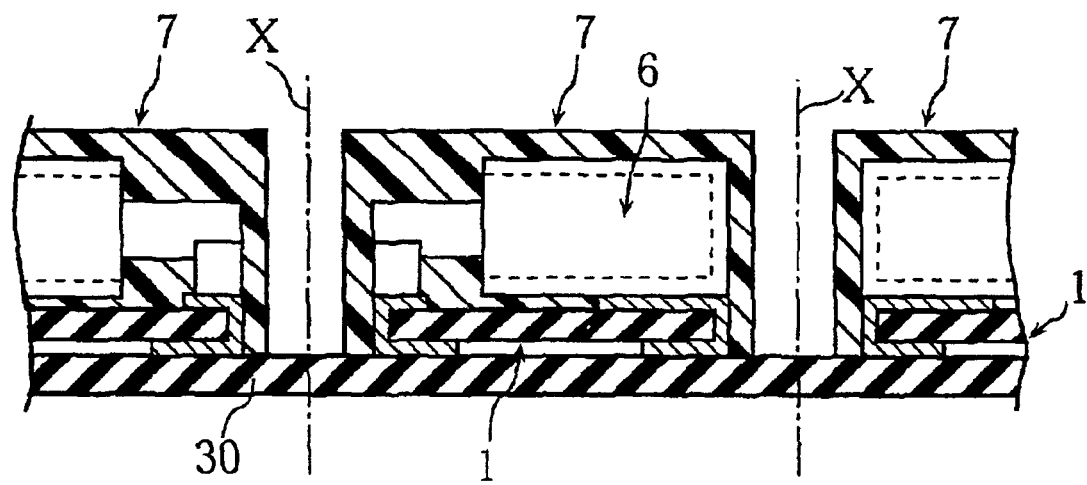
Figure 143:
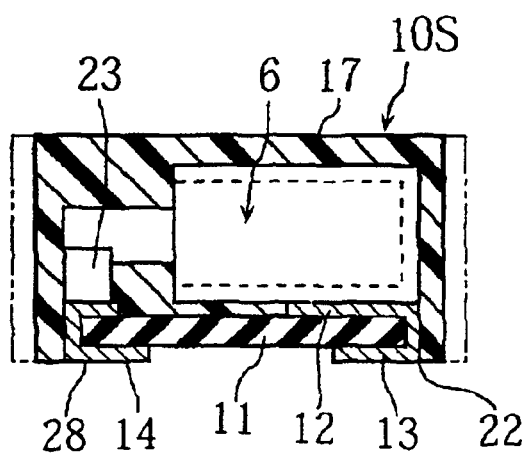
Figure 144:
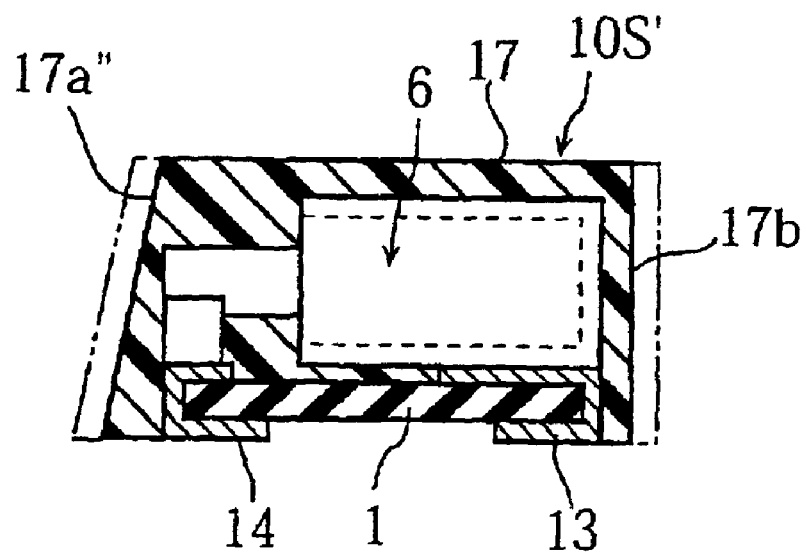
Figure 145:
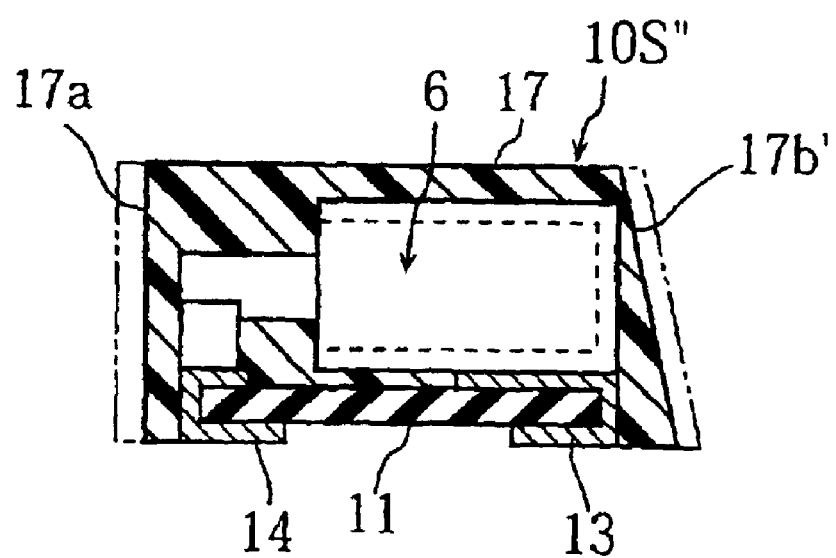
Figure 146:
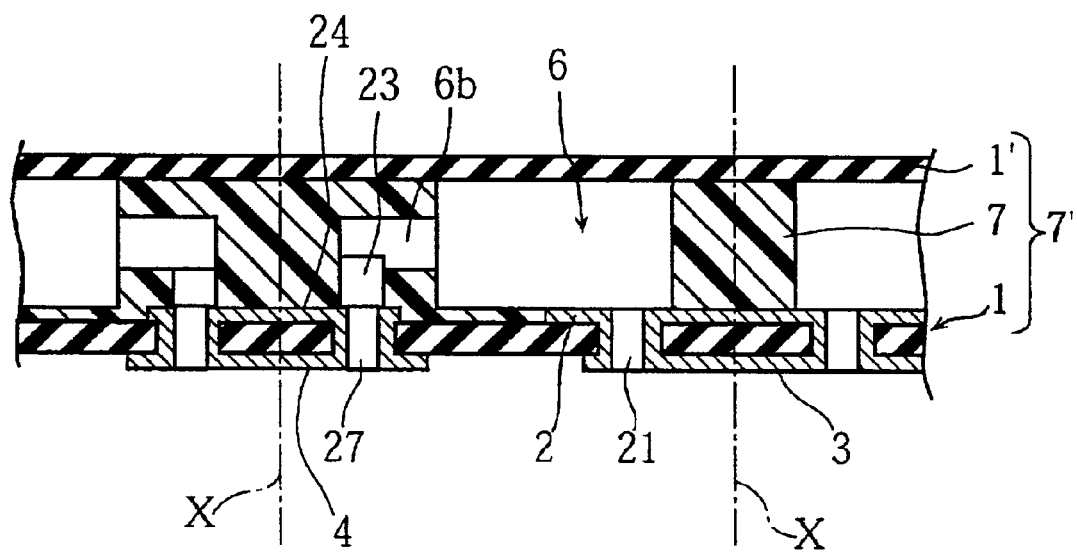
Figure 147:
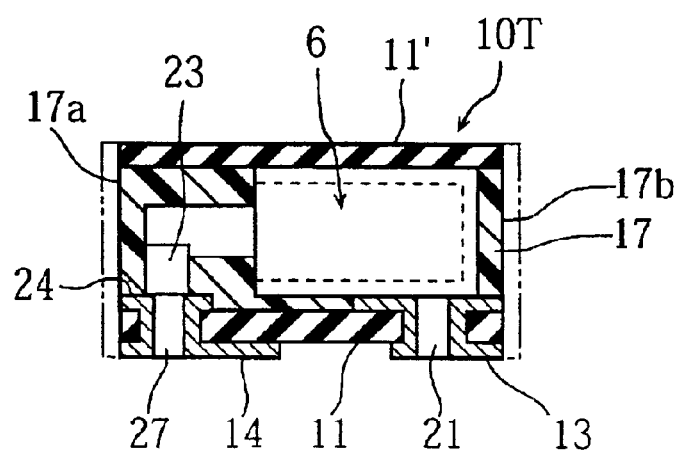
Figure 148:
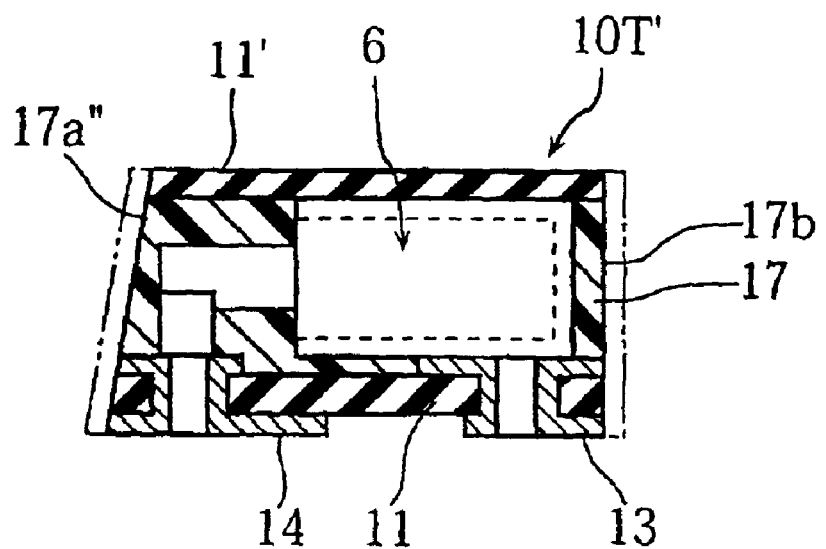
Figure 149:
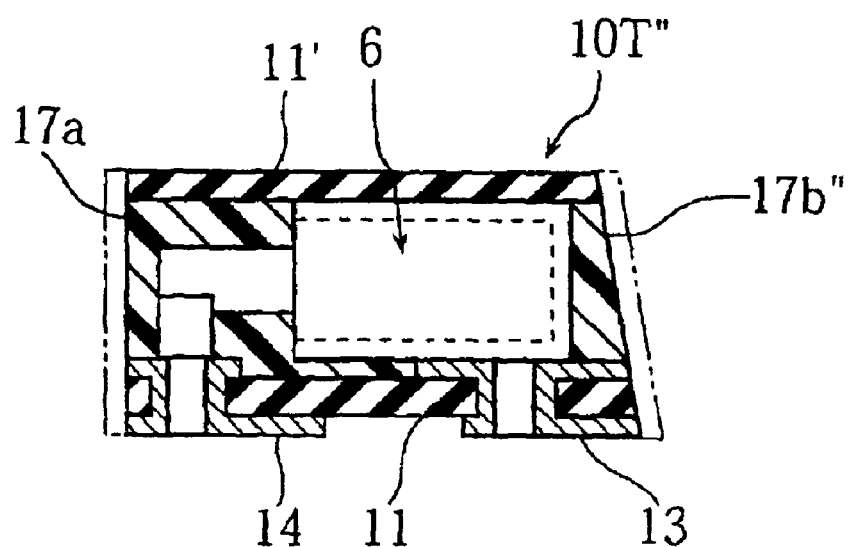
Figure 150:
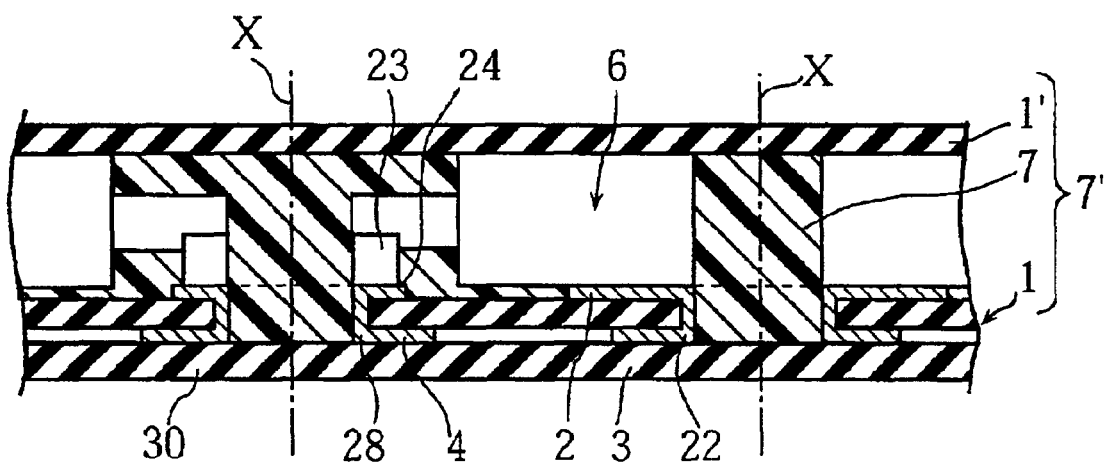
Figure 151:
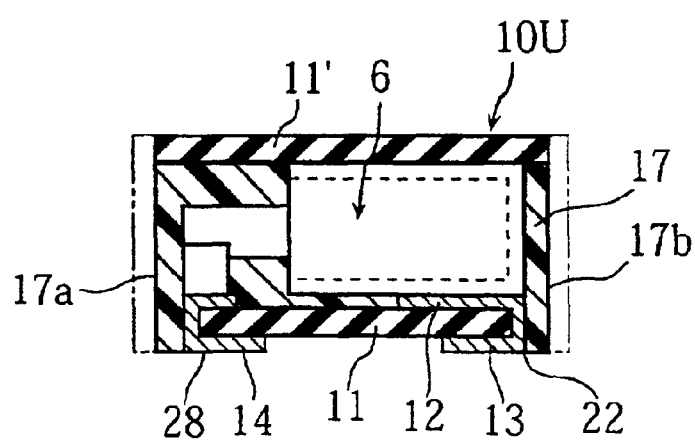
Figure 152:
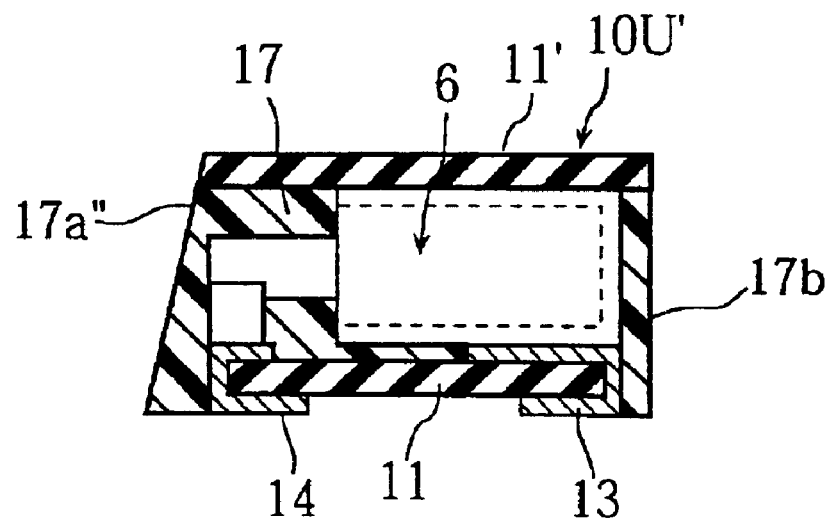
Figure 153:
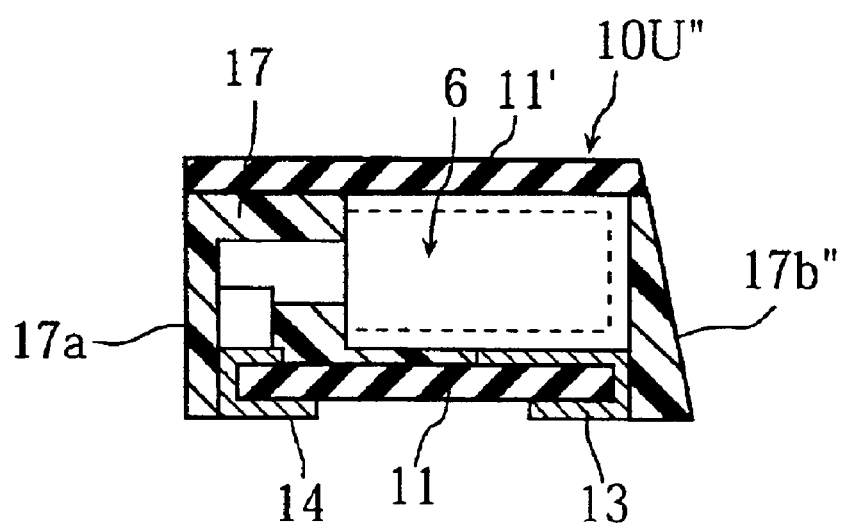
Figure 154:
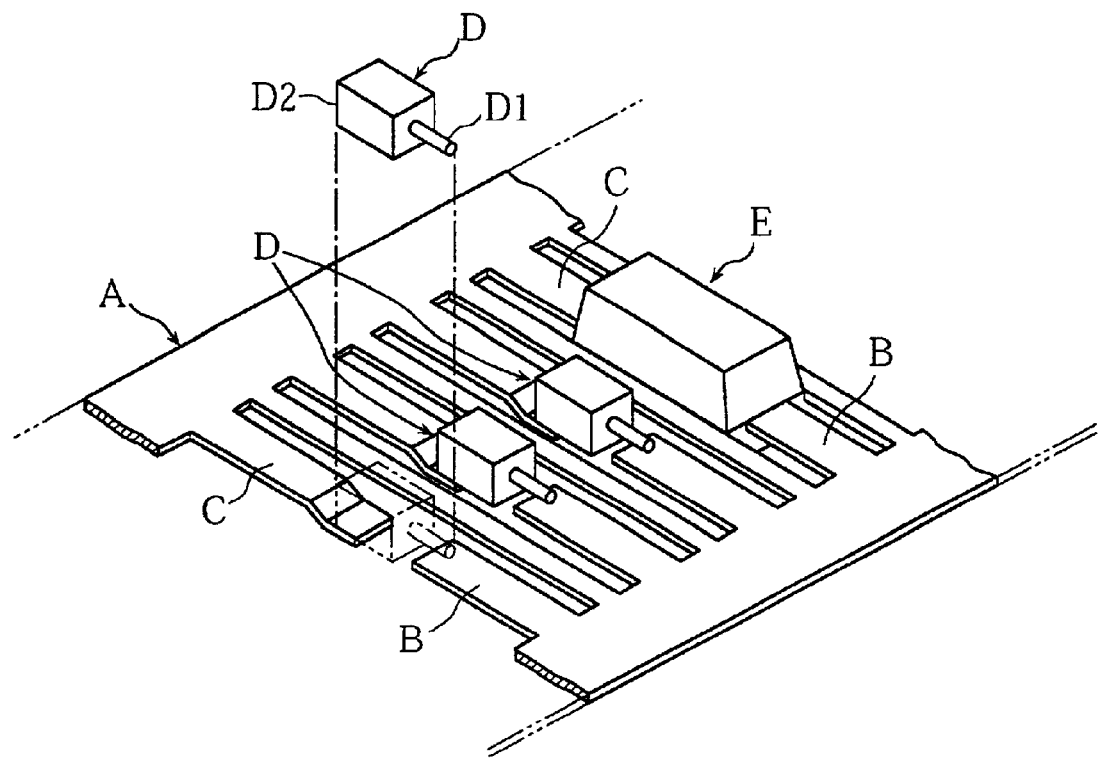
Figure 155:
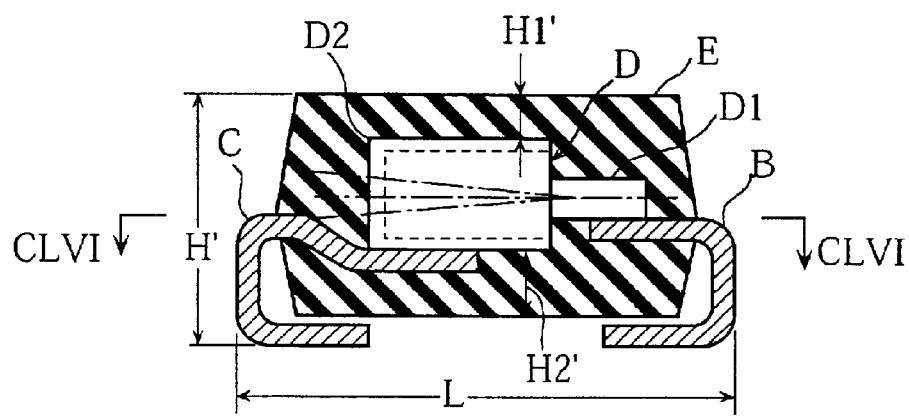
Figure 156:
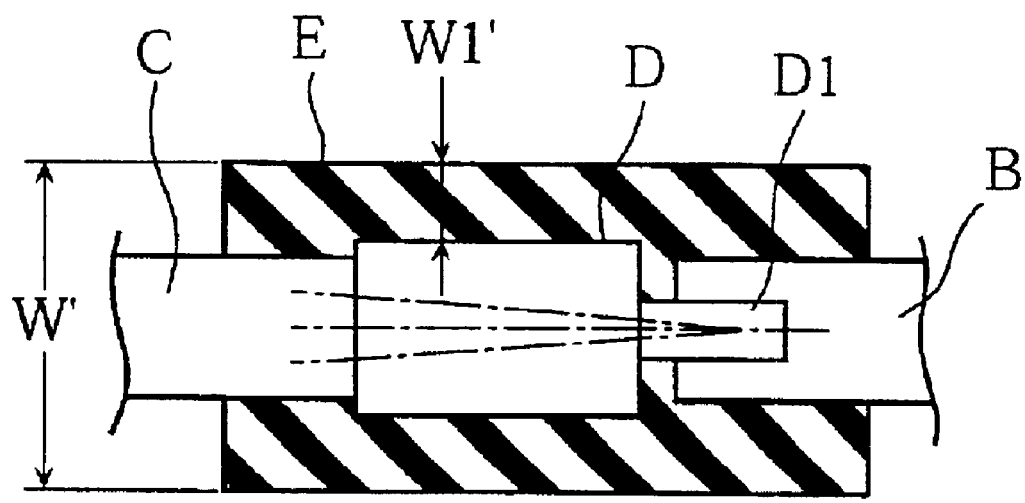

FIG. 132 is a sectional view showing another type of solid electrolytic capacitor according to the twelfth embodiment;

FIG. 133 is a sectional view showing one step of a fabrication method according to a thirteenth embodiment of the present invention, in which capacitor elements are mounted on a sheet member;

FIG. 134 is a sectional view showing a resin plate formed according to the thirteenth embodiment of the present invention;

FIG. 135 is a sectional view showing the resin plate of FIG. 134 with several cuts made therein;

FIG. 136 is a sectional view showing a solid electrolytic capacitor made by the fabrication method of the thirteenth embodiment;

FIG. 137 is a sectional view showing a different type of solid electrolytic capacitor according to the thirteenth embodiment;

FIG. 138 is a sectional view showing another type of solid electrolytic capacitor according to the thirteenth embodiment;

FIG. 139 is a sectional view showing one step of a fabrication method according to a fourteenth embodiment of the present invention, in which capacitor elements are mounted on a sheet member;

FIG. 140 a plan view showing how the capacitor elements are mounted on the sheet member;

FIG. 141 is a sectional view showing a resin plate formed on the sheet member;

FIG. 142 is a sectional view showing the resin plate of FIG. 141 with several cuts made therein;

FIG. 143 is a sectional view showing a solid electrolytic capacitor obtained by the fabrication method of the fourteenth embodiment;

FIG. 144 is a sectional view showing a different type of solid electrolytic capacitor obtained according to the fourteenth embodiment;

FIG. 145 is a sectional view showing another type of solid electrolytic capacitor obtained according to the fourteenth embodiment;

FIG. 146 is a sectional view showing a plate assembly made by a fabrication method according to a fifteenth embodiment of the present invention;

FIG. 147 is a sectional view showing a solid electrolytic capacitor made by the fabrication method of the fifteenth embodiment;

FIG. 148 is a sectional view showing a different type of solid electrolytic capacitor according to the fifteenth embodiment;

FIG. 149 is a sectional view showing another type of solid electrolytic capacitor according to the fifteenth embodiment;

FIG. 150 is a sectional view showing a plate assembly made by a fabrication method according to a sixteenth embodiment of the present invention;

FIG. 151 is a sectional view showing a solid electrolytic capacitor made by the fabrication method of the sixteenth embodiment;

FIG. 152 is a sectional view showing a different type of solid electrolytic capacitor obtained by the fabrication method of the sixteenth embodiment;

FIG. 153 is a sectional view showing another type of solid electrolytic capacitor obtained by the fabrication method of the sixteenth embodiment;

FIG. 154 is a perspective view showing one step of a conventional fabrication method;

FIG. 155 is a sectional view showing a solid electrolytic capacitor obtained by the conventional method; and FIG. 156 is a sectional view taken along lines CLVI—CLVI in FIG. 155.

DETAILED DESCRIPTION OF THE PREFERRED EMBODIMENTS

The preferred embodiments of the present invention will be described below with reference to the accompanying drawings. Hereinbelow, the present invention is described as applicable to fabrication of various kinds of tantalum solid electrolytic capacitors. It is clear, however, that the present invention is not limited to this application but can be applied to making other devices.

Reference is first made to FIGS. 1–13 illustrating a fabrication method according to a first embodiment of the present invention. This fabrication method may include the following steps.

Figure 1:
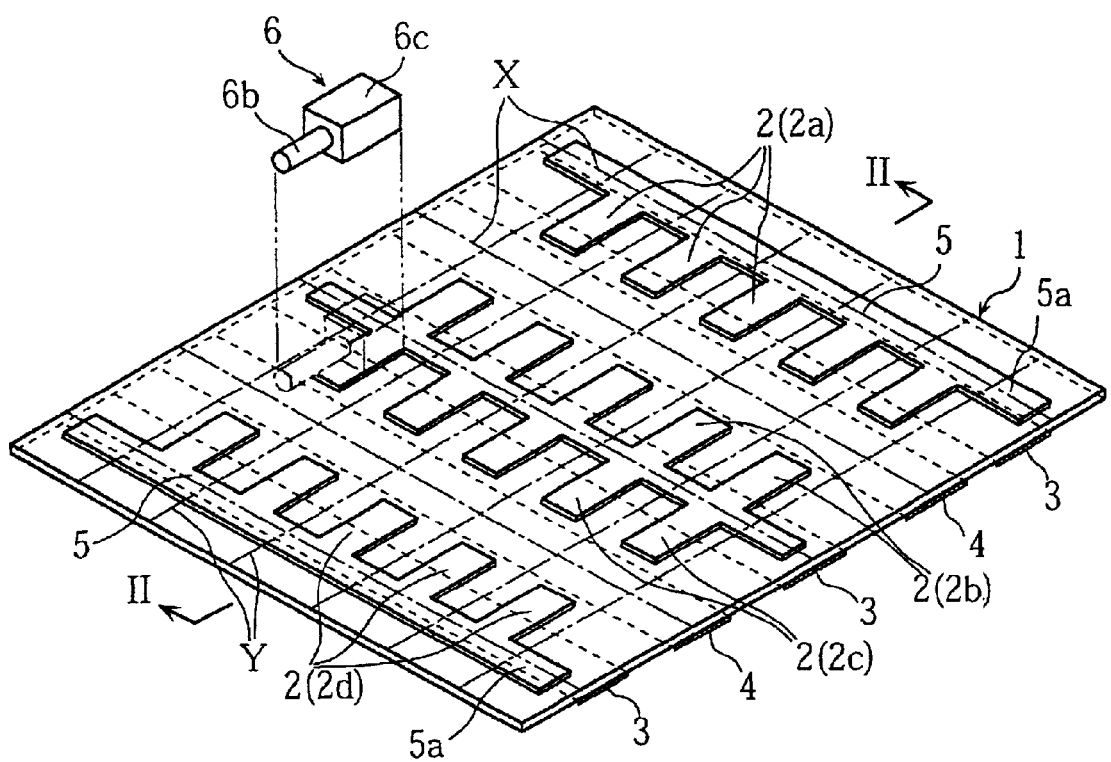
FIG. 1 is a perspective view showing a sheet member used for implementing a fabrication method according to a first embodiment of the present invention.
Figure 2:
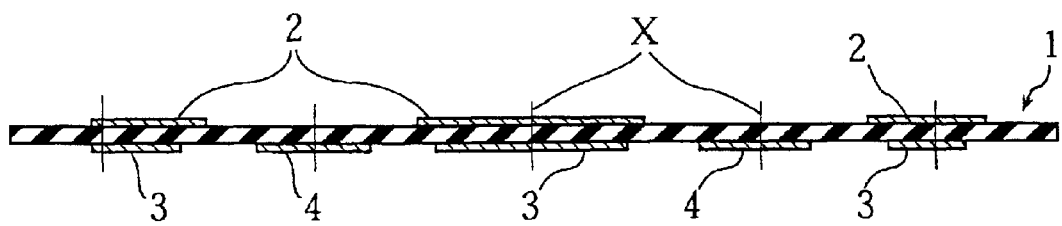
FIG. 2 is an enlarged sectional view taken along lines II—II in FIG. 1.

First, as shown in FIGS. 1 and 2, a sheet member 1 having an appropriate thickness is prepared. The sheet member 1 may be made of a soft or rigid synthetic resin material. The obverse (or upper) surface of the sheet member 1 is formed with a plurality of cathode connection layers 2. In the illustrated embodiment, the cathode connection layers 2 are arranged in four rows. Specifically, the cathode connection layers 2 are divided into a first row of cathode connection layers 2a, a second row of cathode connection layers 2b, a third row of cathode connection layers 2c and a fourth row of cathode connection layers 2d. All the cathode connection layers 2 belonging to the same row are electrically connected to an elongated, common connection layer 5. These cathode connection layers 2 are disposed at regular intervals in the longitudinal direction of the common connection layer 5.

The reverse (or lower) surface of the sheet member 1 is formed with elongated cathode electrode layers 3 extending in parallel to the common connection layers 5. As best shown in FIG. 2, the cathode electrode layers 3 are disposed below the cathode connection layers 2. The reverse surface of the sheet member 1 is also formed with elongated anode electrode layers 4 extending in parallel to the cathode electrode layers 3. The anode terminals layers 4 are arranged between the cathode electrode layers 3.

Figure 3:
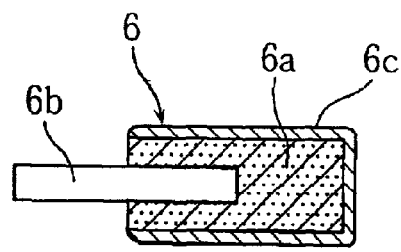
FIG. 3 is a sectional view showing a capacitor element used for implementing the fabrication method.

Referring to FIG. 3, a capacitor element 6 used for the fabrication method of the first embodiment is shown in section. As illustrated, the capacitor element 6 is provided with a porous body 6a, a bar-like anode 6b projecting from an end surface of the body 6a, and a cathode layer 6c formed on the body 6a. The porous body 6a is made of tantalum (valve metal) powder, which is compacted into a generally rectangular form and baked thereafter. Thought not illustrated, a dielectric layer of e.g. tantalum pentoxide and an solid electrolytic layer are formed on the surface of the packed tantalum powder. The anode 6b may also be made of tantalum.

Figure 4:
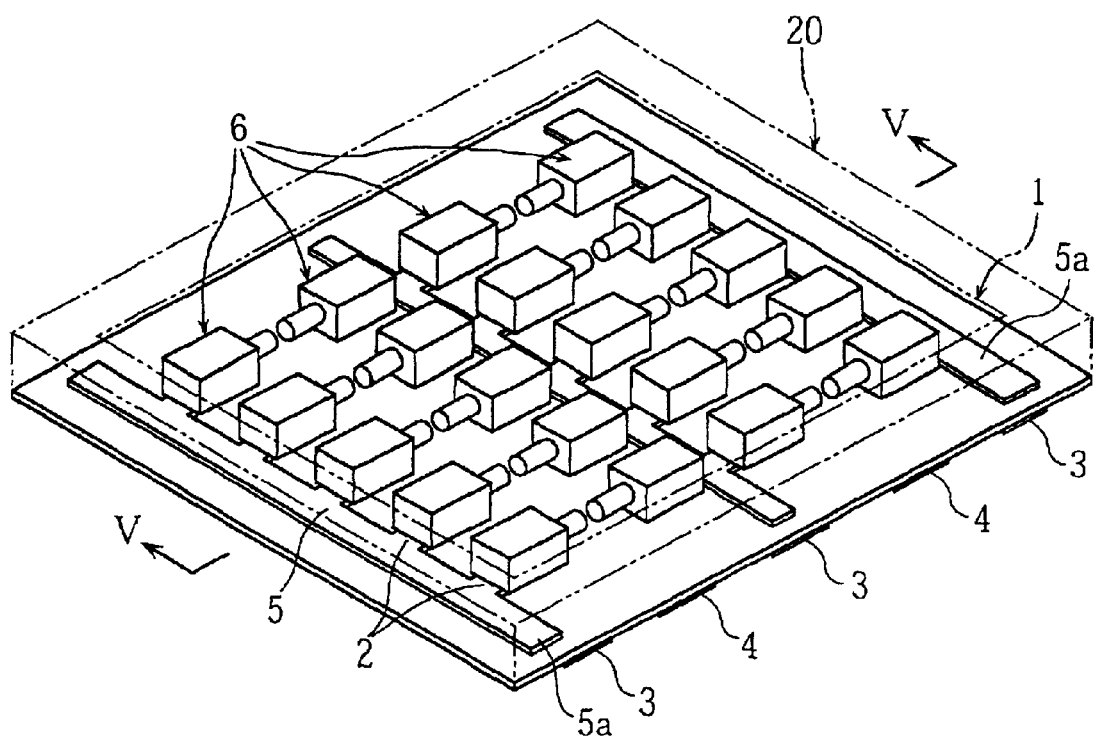
FIG. 4 is a perspective view showing the sheet member carrying capacitor elements mounted thereon.
Figure 5:
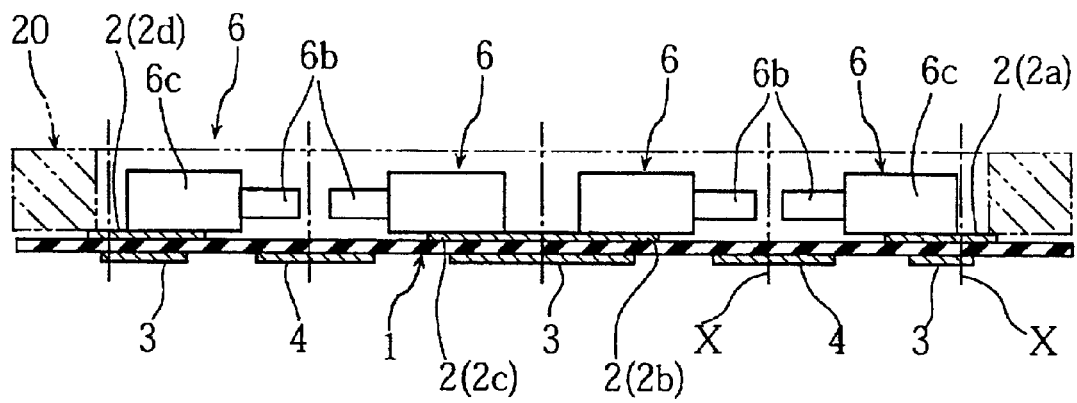
FIG. 5 is an enlarged sectional view taken along lines V—V in FIG. 4.

As shown in FIGS. 4 and 5, a predetermined number of capacitor elements 6 having the above-described structure are mounted on the sheet member 1. Specifically, each of the capacitor elements 6 is mounted on a respective one of the cathode connection layers 2, with its anode 6b extending horizontally. As best shown in FIG. 5, the anodes 6b of the capacitor elements 6 mounted on the first-row cathode connection layers 2a are held in facing relation to the anodes 6b of the capacitor elements 6 mounted on the second-row cathode connection layers 2b. Likewise, the anodes 6b of the capacitor elements 6 mounted on the third-row cathode connection layers 2c are held in facing relation to the anodes 6b of the capacitor elements 6 mounted on the fourth-row cathode connection layers 2d. The cathode layers 6c of the respective capacitor elements 6 are fixed to the cathode connection layers 2 via an electrically conductive adhesive (not shown).

Then, as indicated by double-dot chain lines in FIGS. 4 and 5, a frame member 20 is placed on the obverse surface of the sheet member 1. The frame member 20 is formed with a rectangular opening which is large enough to accommodate all of the capacitor elements 6 on the sheet member 1. As seen from FIG. 5, the depth of the rectangular opening of the frame member 20 is greater than the thickness (or height) of the capacitor elements 6.

Figure 6:
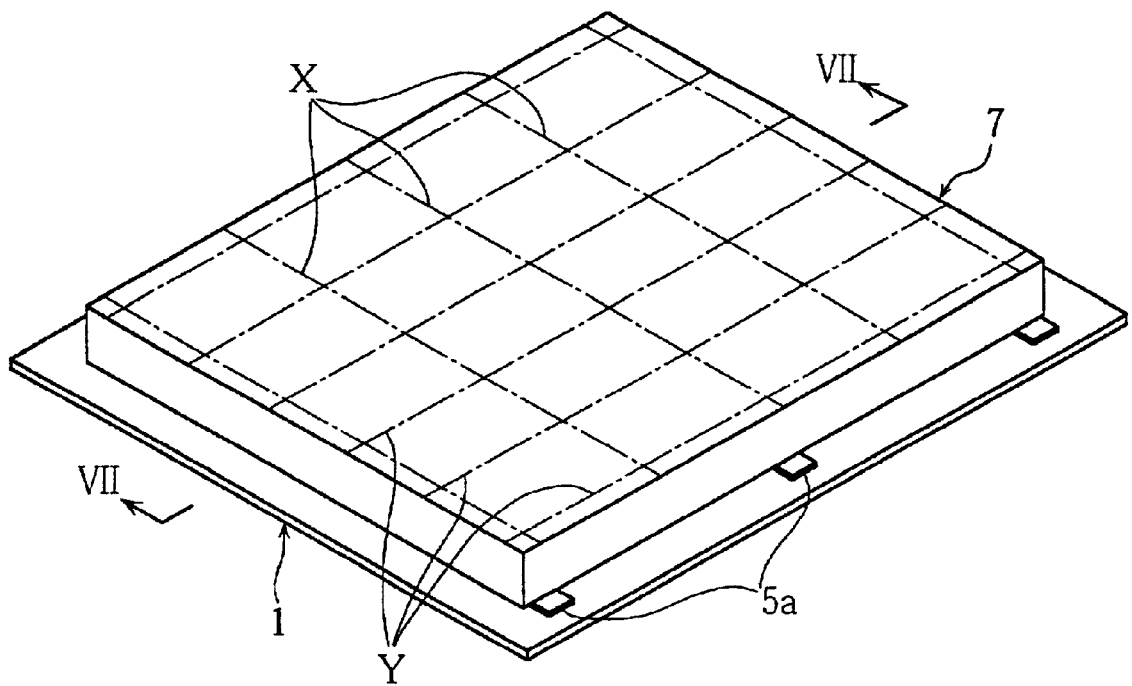
FIG. 6 is a perspective view showing the sheet member with a synthetic resin plate formed thereon.
Figure 7:
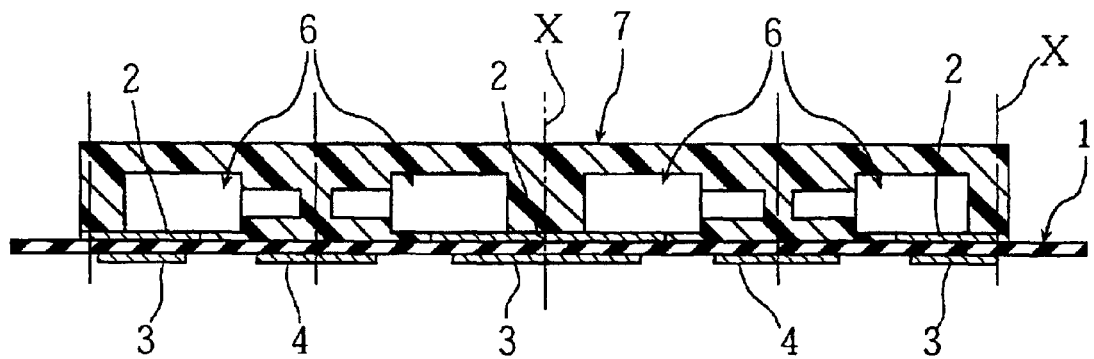
FIG. 7 is an enlarged sectional view taken along lines VII—VII in FIG. 6.

After the frame member 20 is placed on the sheet member 1, a synthetic resin material in a liquid state is poured into the rectangular opening of the frame member 20 so that the respective capacitor elements 6 are completely covered by the supplied resin material. Thereafter, the resin material is solidified to form a rectangular resin plate (or holder) 7 embedding the capacitor elements 6, as shown in FIGS. 6 and 7. The end portions 5a of the respective common connection layers 5 are exposed to the exterior, as shown in FIG. 6.

Figure 8:
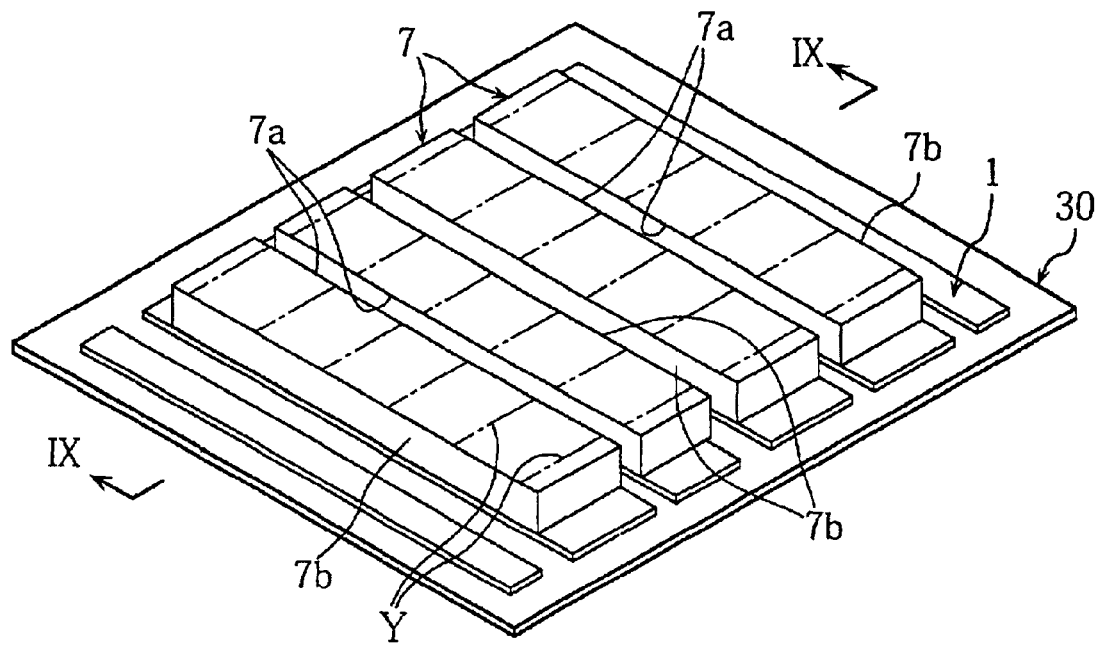
FIG. 8 is a perspective view showing the resin plate with several cuts made therein.
Figure 9:
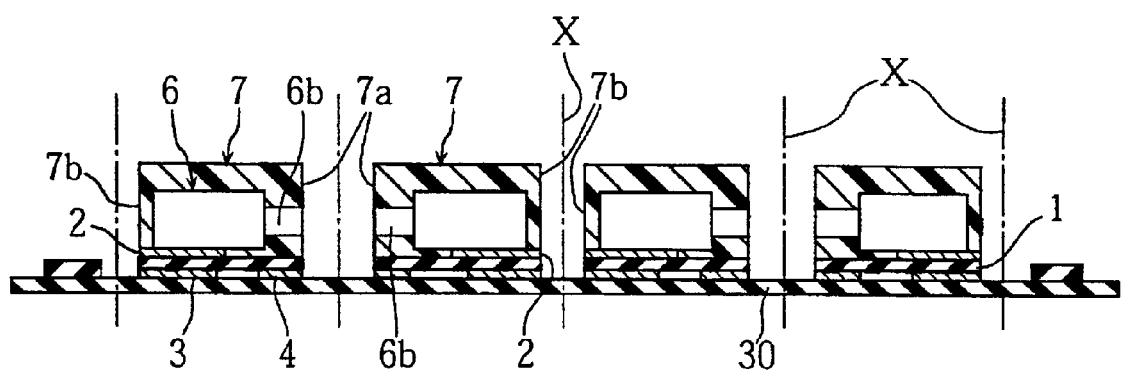
FIG. 9 is an enlarged sectional view taken along lines IX—IX in FIG. 8.

Then, as shown in FIGS. 8 and 9, an expansion sheet 30 made of a synthetic resin is attached to the reverse surface of the sheet member 11. Thereafter, the resin plate 7 together with the sheet member 1 are cut along cutting lines X (see FIGS. 6 and 7) by a dicing cutter for example. The cutting lines X extend in the longitudinal direction of the common electrode layers 5 (see FIG. 6) without crossing the capacitor elements 6 (see FIG. 7).

The above cutting step generates first cut surfaces 7a and second cut surfaces 7b in the resin plate 7. At the first cut surfaces 7a, the anodes 6b of the capacitor elements 6 and the anode electrode layers 4 are exposed to the exterior, as shown in FIG. 9. At the second cut surfaces 7b, on the other hand, the cathode connection layers 2 and the cathode electrode layers 3 are exposed to the exterior.

Instead of completely cutting the sheet member 1 (together with the resin plate 7) as shown in FIGS. 8 and 9, the sheet member 1 may only be superficially cut by the cutting tool or may not be cut at all. This is advantageous for preventing the expansion sheet 30 from being unduly stretched while the resin plate 7 is being cut. To improve this expansion-preventing effect, preferably the sheet member 1 may be made of a hard resin material. After only the resin plate 7 is cut by the cutting tool, the sheet member 1 may be mechanically bent to snap at the cutting lines X.

Figure 10:
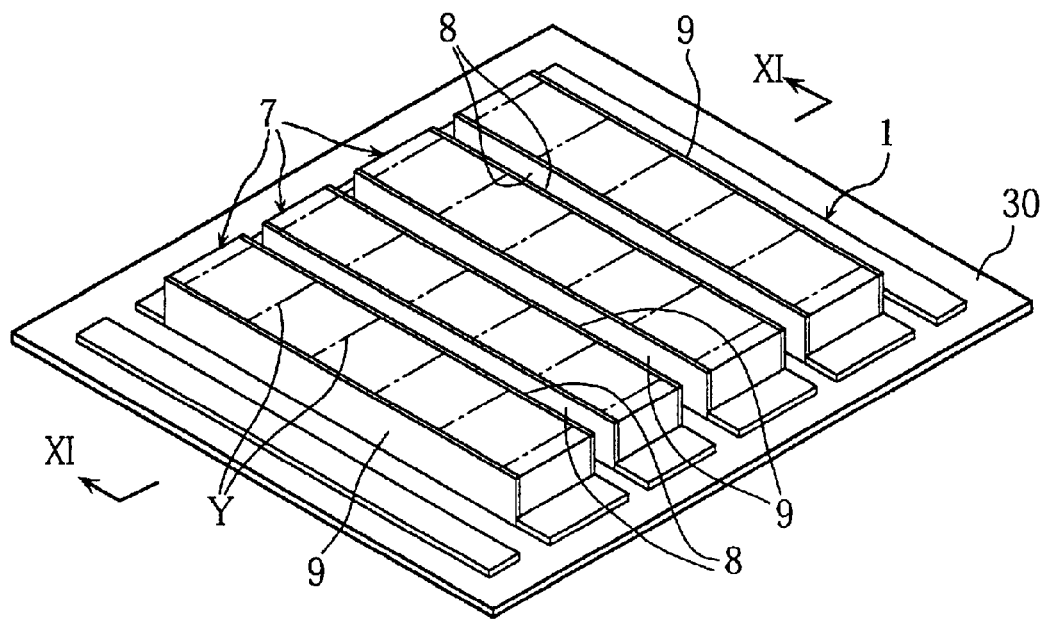
FIG. 10 is a perspective view showing the divided resin plate in which terminal electrode layers are formed on the exposed cut surfaces of the plate.
Figure 11:
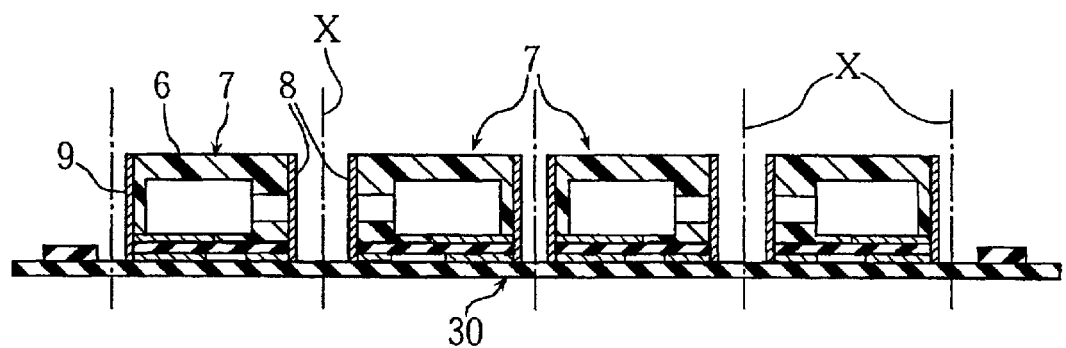
FIG. 11 is an enlarged sectional view taken along lines XI—XI in FIG. 10.

Then, as shown in FIGS. 10 and 11, the first cut surfaces 7a may be subjected to electroless plating with silver or nickel for example. Thus, the first cut surfaces 7a are formed with anode terminal layers 8 electrically connected to the anodes 6b and to the anode electrode layers 4. For forming the anode terminal layers 8, use may be made of a conductive paste. The conductive paste may be applied to the first cut surfaces 7a, dried and baked. In the same manner (i.e., by electroless plating or by application of conductive paste), cathode terminal layers 9 are formed on the second cut surfaces 7b to be electrically connected to the cathode connection layers 2 and to the cathode electrode layers 3.

Referring back to FIG. 9, when the resin plate 7 is divided along the cutting lines X to produce the first cut surfaces 7a, the exposed tips of the anodes 6b will instantly be covered by oxide films since the anodes 6b are made of tantalum, which is readily oxidized. Thus, without taking any countermeasures, the anodes 6b may fail to be properly connected to the anode terminal layers 8 (FIG. 11) to be formed on the first cut surfaces 7a (FIG. 9).

Figure 12:
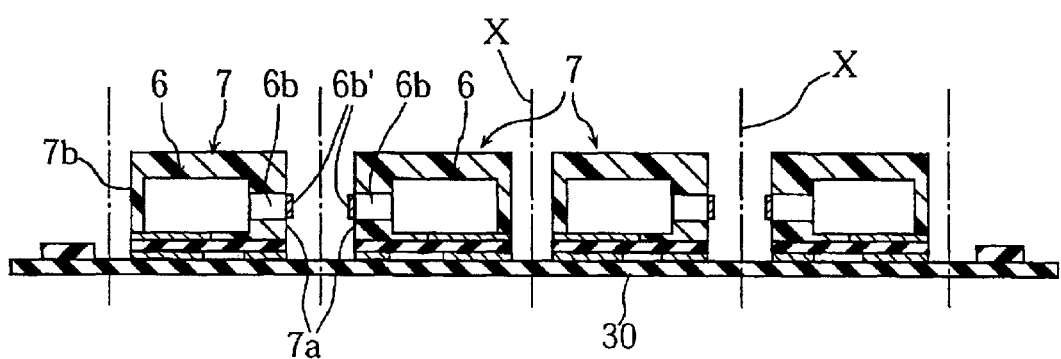
FIG. 12 is an enlarged sectional view showing the capacitor elements whose anode tips are covered by anode bumps.

In light of the above-mentioned oxidation, each of the exposed tips of the anodes 6b may be covered, prior to the formation of the anode terminal layers 8, with an anode bump 6b', as shown in FIG. 12. The anode bump 6b' is made of an oxidation-resistant material. For instance, the anode bumps 6b' may be made of an alloy of tantalum with any one of nickel, palladium, rhodium and platinum.

The anode bumps 6b' may be formed by using an electrode rod made of any one of nickel, palladium, rhodium and platinum. Specifically, the electrode rod is positioned close to the exposed tip of a selected one of the anodes 6b, and then an appropriate voltage is applied across the electrode rod and the selected anode 6b. Thus, an electrical discharge is caused to occur between the exposed tip of the selected anode 6b and the electrode rod. (More accurately, the predetermined voltage is applied across the end portion 5a of the common connection layer 5 and the electrode rod.) In this manner, while the oxide film on the exposed tip of the anode 6b is being constantly removed, an anode bump 6b' will be formed on the exposed tip of the selected anode 6b.

Alternatively, the anode bump 6b' may be formed in the following manner. First, a palladium paste or platinum paste is applied to the exposed tip of the selected anode 6b. Then, the paste-covered anode tip is subjected to laser irradiation. Consequently, an anode bump 6b' is formed on the exposed tip of the selected anode 6b, while the oxide film on the exposed tip of the anode 6b is being constantly removed. The obtained anode bump 6b' is made of an alloy of tantalum with palladium or platinum.

After the anode bumps 6b' are formed on the exposed tips of the respective anodes 6b, the first cut surfaces 7a are covered by the anode terminal layers 8, as shown in FIG. 11. Due to the anode bumps 6b', the anodes 6b are properly connected to the anode terminal layers 8. This is advantageous for minimizing the number of defective capacitors to be produced.

Figure 13:
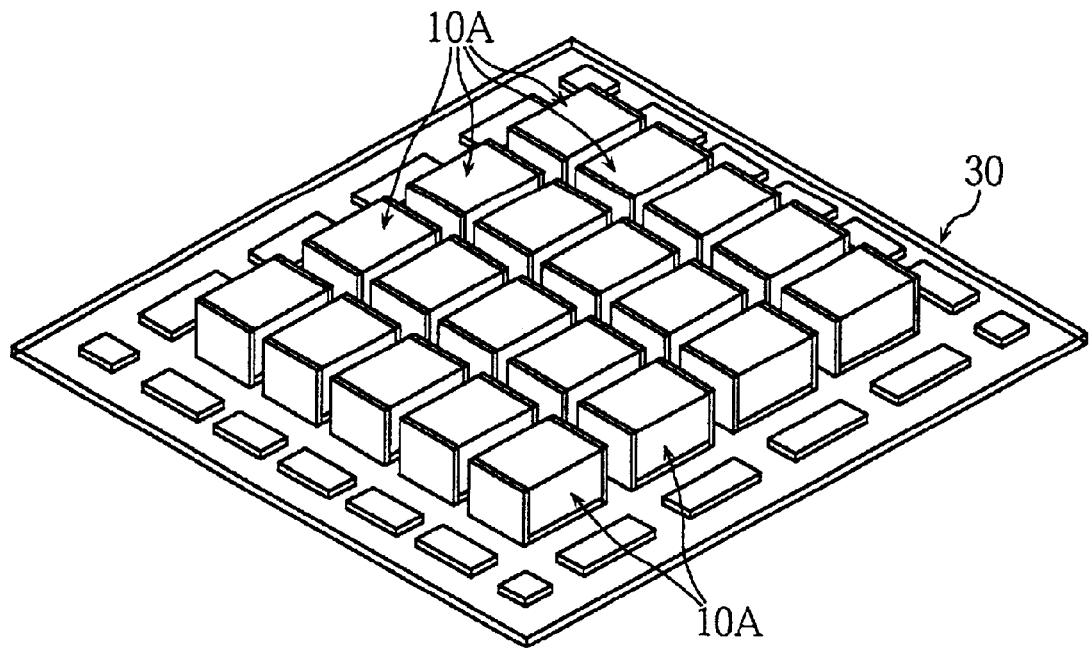
FIG. 13 is a perspective view showing the sheet member and the resin plate which are divided into a number of chips.

After the anode terminal layers 8 and the cathode terminal layers 9 are formed (FIG. 11), the resin plate 7 and the sheet member 1 are cut along the cutting lines Y (see FIG. 10) by e.g. a dicing cutter. Consequently, as shown in FIG. 13, the resin plate 7 is divided into a predetermined number of smaller chips (capacitors) 10A which are still attached to the expansion sheet 30. Finally, the chips 10A are removed from the expansion sheet 30. Thus, a plurality of tantalum solid electrolytic capacitors are obtained collectively.

Figure 14:
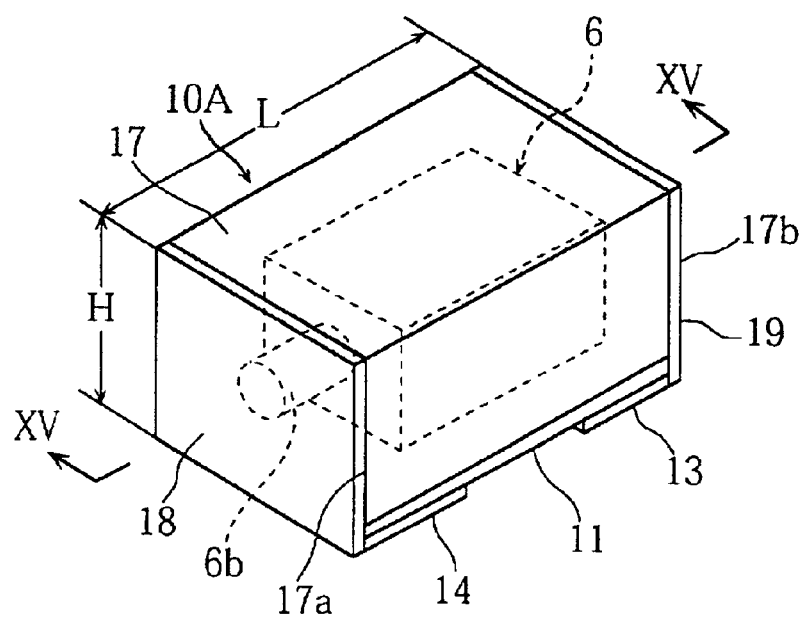
FIG. 14 is a perspective view showing a solid electrolytic capacitor made by the fabrication method of the first embodiment.
Figure 15:
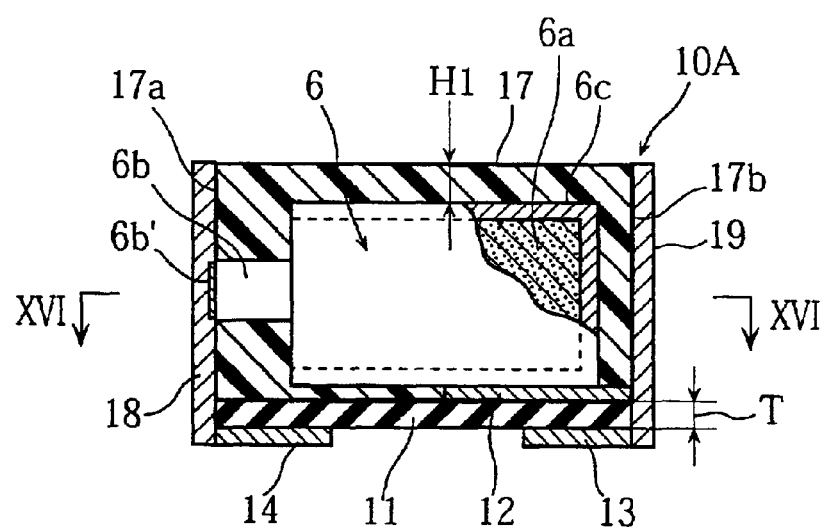
FIG. 15 is a sectional view taken along lines XV—XV in FIG. 14.
Figure 16:
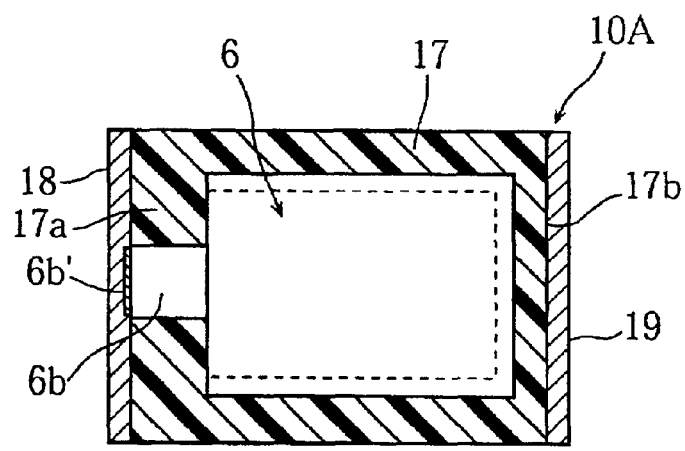
FIG. 16 is a sectional view taken along lines XVI—XVI in FIG. 15.

FIGS. 14–16 show the basic structure of a tantalum solid electrolytic capacitor obtained by the above-described fabrication method. The illustrated capacitor 10A includes a capacitor element 6 and a synthetic resin base 11 supporting the capacitor element 6. The capacitor element 6 is provided with a cathode 6c (FIG. 15) and an anode 6b. As shown in FIG. 15, the obverse surface of the resin base 11 is formed with a cathode connection layer 12 connected to the cathode 6c of the capacitor element 6.

The capacitor 10A also includes a protection package 17 formed on the resin base 11 to enclose the capacitor element 6. However, the anode 6b is exposed at a side surface 17a of the package 17, while the cathode connection layer 12 is exposed at another side surface 17b opposite to the side surface 17a. The first-mentioned side surface 17a is covered by an anode terminal layer 18 connected to the anode 6b, while the opposite side surface 17b is covered by a cathode terminal layer 19 connected to the cathode connection layer 12.

The capacitor 10A further includes a cathode electrode layer 13 and an anode electrode layer 14 both of which are formed on the reverse surface of the resin base 11. As shown in FIG. 15, the cathode electrode layer 13 is located at the right side of the resin base 11 to be connected to the cathode terminal layer 19. The anode electrode layer 14 is located at the left side of the resin base 11 to be connected to the anode terminal layer 18.

In the solid electrolytic capacitor 10A, the capacitor element 6 is mounted on the resin base 11 and enclosed by the protection package 17. Thus, the lower side of the capacitor element 6 is advantageously shielded by the resin base 11. In addition, the conventional problem of the vertical deviation of the capacitor element 6 (see FIG. 155) is overcome since the capacitor element 6 is placed on the flat resin base 11. Thus, the thickness H1 of the upper portion of the package 17 above the capacitor element 6 is rendered smaller than the conventional thickness H1' (FIG. 155). It is also possible to make the thickness T of the resin base 11 smaller than the conventional thickness H2' (FIG. 155). Thus, according to the present invention, the overall height H (FIG. 14) of the capacitor 10A is rendered smaller than is conventionally possible.

Still further, the capacitor 10A of the present invention does not need to use an elongated lead connected to the anode 6b or cathode 6c, as opposed to the conventional capacitor (155). Hence, the overall length L (FIG. 14) and weight of the capacitor 10A is advantageously small. Still further, in the capacitor 10A, the cathode electrode layer 13 and the anode electrode layer 14 are formed on the reverse surface of the resin base 11 in addition to the upright anode and cathode terminal layers 18, 19. Thus, the capacitor 10A may be soldered to e.g. a printed circuit board more firmly and reliably than when no such electrode layers are provided.

Figure 17:
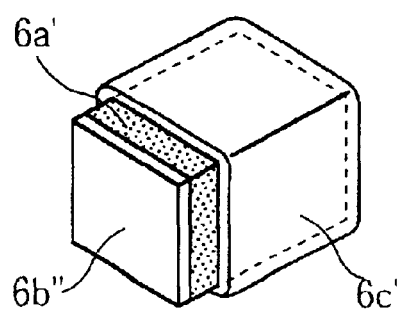
FIG. 17 is a perspective view showing a different type of capacitor element used for implementing the fabrication method of the first embodiment.

For implementing the fabrication method of the first embodiment, use may be made of a capacitor element as shown in FIG. 17 in place of the capacitor element 6 as shown in FIG. 3. The capacitor element of FIG. 17 includes a porous body 6a', a film-like anode 6b" and a cathode 6c'. The porous body 6a' may be made of valve metal powder which is packed and baked. Thought not illustrated, a dielectric layer and an solid electrolytic layer are formed on the packed and baked valve metal powder. The anode 6b" and the cathode 6c' may also be made of valve metal.

Figure 18:
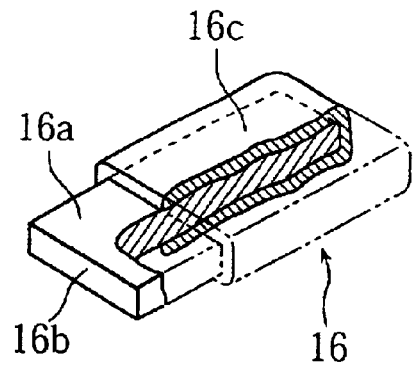
FIG. 18 is a perspective view showing another type of capacitor element used for implementing the fabrication method of the first embodiment.

FIG. 18 shows another type of capacitor element 16 usable for implementing the fabrication method of the first embodiment. The capacitor element 16 includes a main body 16a and a cathode layer 16c partially enclosing the main body 16a. The main body 16a may be made of an aluminum plate or aluminum foil. The main body 16a has an end surface 16b serving as anode. Except for the end surface 16b, the other surfaces of the main body 16a are subjected to e.g. etching to be roughened. Though not illustrated, an dielectric layer and a solid electrolytic layer are formed on the roughened surfaces of the main body 16a. The cathode layer 16c is also formed over the roughened surfaces of the main body 16a.

Figure 19:
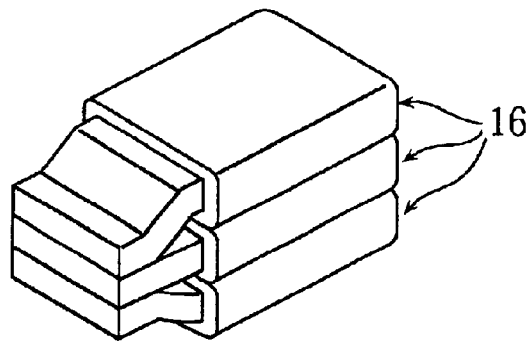
FIG. 19 is a perspective view showing still another type of capacitor element used for implementing the fabrication method of the first embodiment.

FIG. 19 shows another type of capacitor element usable for implementing the fabrication method of the first embodiment. As readily seen, this capacitor element is made up of three capacitor elements 16 (FIG. 18) vertically stacked.

Figure 20:
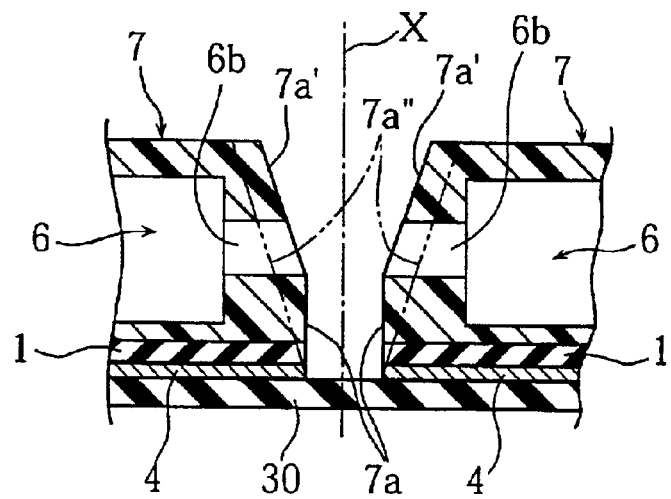
FIG. 20 is an enlarged sectional view showing a different manner in which the sheet member and the resin plate are cut according to the first embodiment.

Referring back to FIG. 9, the resin plate cutting step is depicted as being performed to produce upright cut surfaces 7a, 7b. However, the present invention is not limited to this. For instance, as shown in FIG. 20, the resin plate cutting step may be performed to cause each of the first cut surfaces 7a to be provided with an upper slanted portion 7a'. As proceeding upward, each slanted portion 7a' becomes more distant from the cutting line X.

Figure 21:
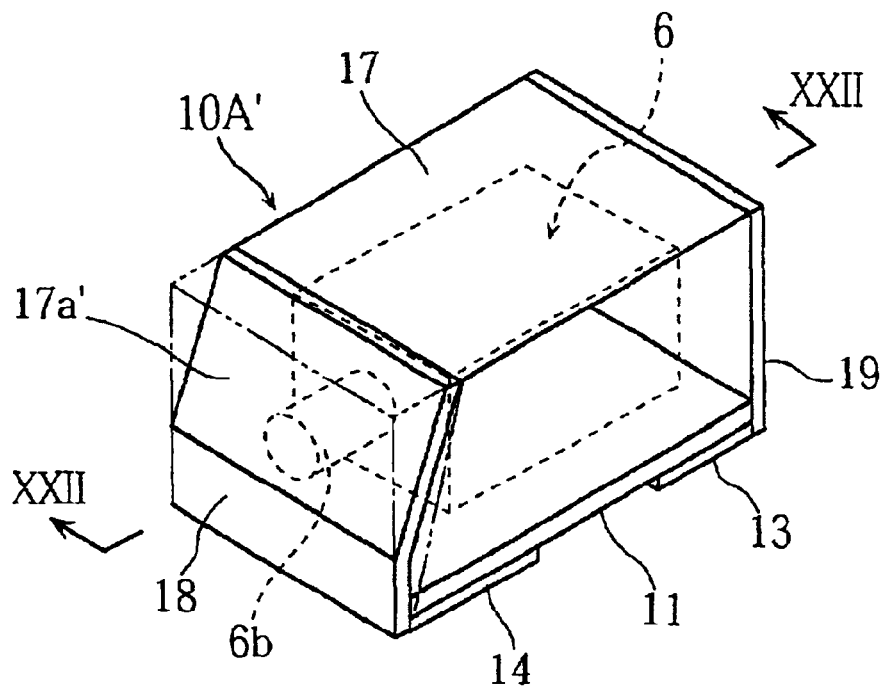
FIG. 21 is a perspective view showing a solid electrolytic capacitor resulting from the cutting manner of FIG. 20.
Figure 22:
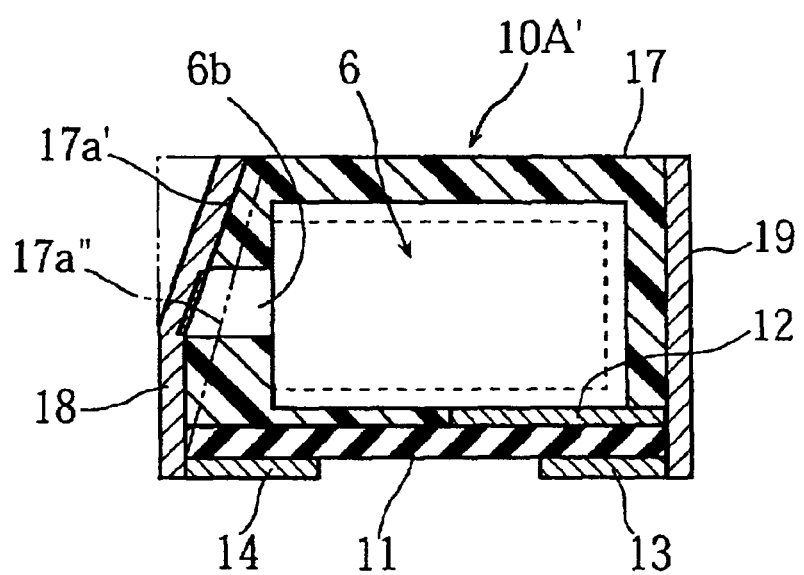
FIG. 22 is a sectional view taken along lines XXII—XXII in FIG. 21.

As a result of the slanted cutting manner of FIG. 20, a solid electrolytic capacitor 10A' as shown in FIGS. 21 and 22 is obtained. Specifically, the capacitor 10A' is provided with a chamfered (or partially slanted) portion 17a' adjacent to the anode 6b. The chamfered portion 17a' starts at the lower side of the bar-like anode, extends upward and terminates at the top surface of the capacitor 10A'. Due to the chamfered portion 17a', the anode terminal layer 18 of the capacitor 10A' is easily discerned from the cathode terminal layer 19.

Further, the slanting cut as shown in FIG. 20 serves to facilitate formation of the anode bumps 6b' (FIG. 12). Specifically, palladium or platinum paste to make the anode bumps 6b' is more easily applied to the exposed tips of the anodes 6b than when the upright cutting as shown in FIG. 12 is performed. Also, laser irradiation to the exposed tips of the anodes 6b is readily performed.

Instead of the partially slanted surfaces 7a', the respective first cut surfaces 7a may be formed as an entirely slanted surface. In this case, the resin plate 7 may be cut along the double-dot chain lines 7a" shown in FIG. 20.

Figure 23:
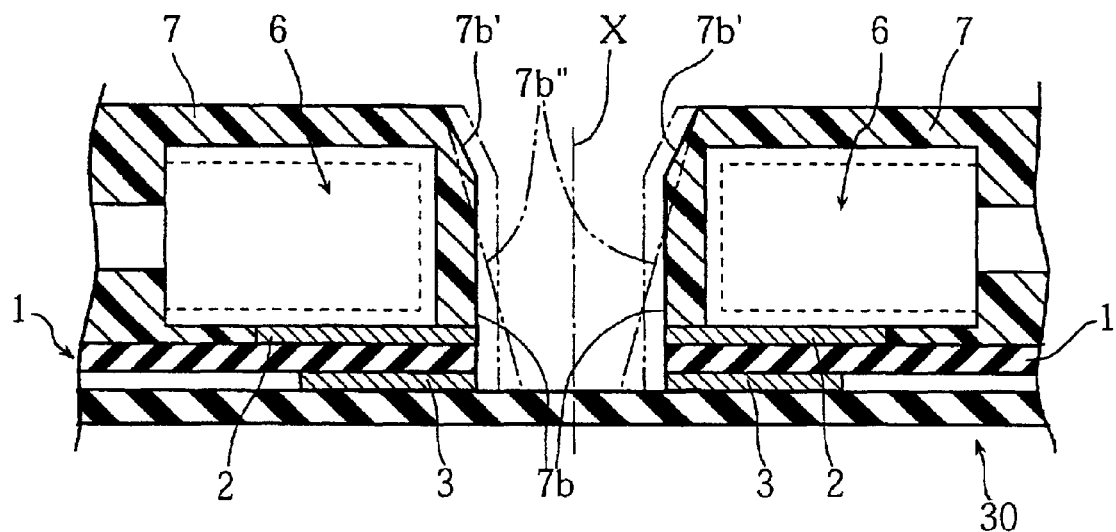
FIG. 23 is an enlarged sectional view showing another manner in which the sheet member and the resin plate are cut according to the first embodiment.
Figure 24:
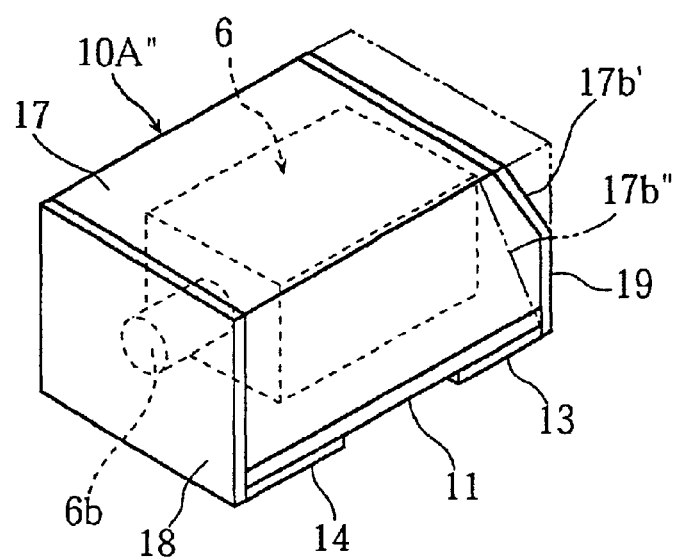
FIG. 24 is a perspective view showing a solid electrolytic capacitor resulting from the cutting manner of FIG. 23.

According to the present invention, as shown in FIG. 23, the cutting step of the resin plate 7 may be performed so that the second cut surfaces 7b are provided with a partially slanted portion 7b' or entirely slanted portion 7b". When the resin plate 7 is cut to provide partially slanted portions 7b', a capacitor 10A" as shown in FIG. 24 is obtained. The capacitor 10A" is basically the same as the capacitor 10A' of FIG. 21 except that the partially slanted portion 17b' is provided on the side opposite to the anode 6b.

Figure 25:
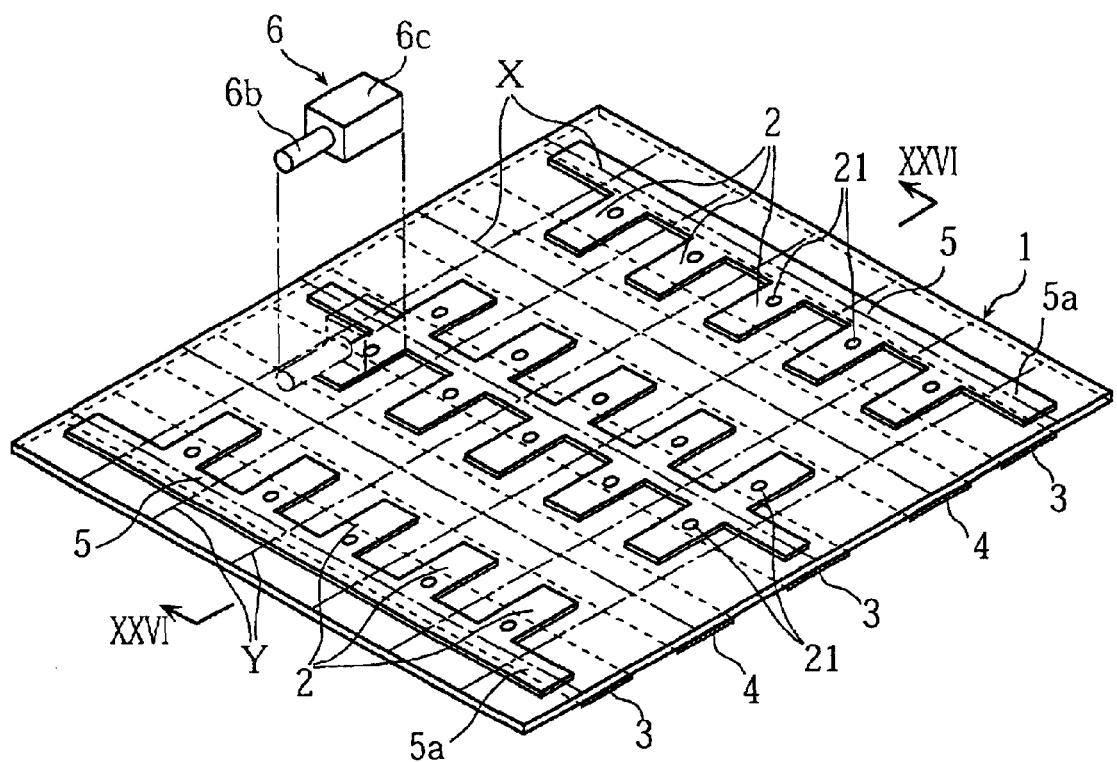
FIG. 25 is a perspective view showing a sheet member used for implementing a fabrication method according to a second embodiment of the present invention.
Figure 26:
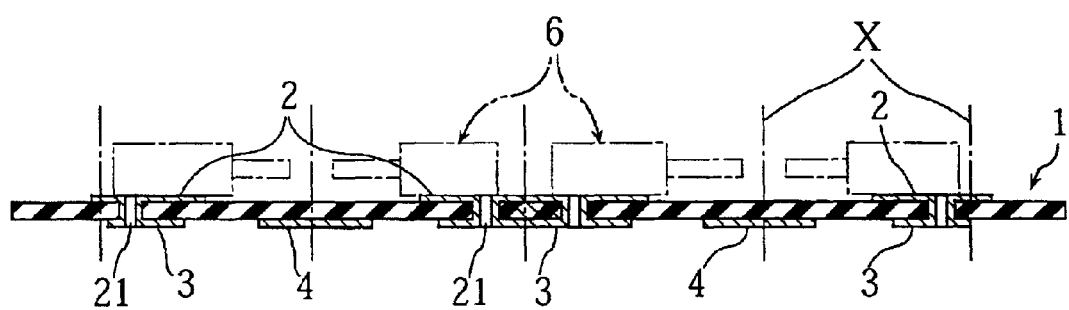
FIG. 26 is an enlarged sectional view taken along lines XXVI—XXVI in FIG. 25.

Reference is now made to FIGS. 25–26 illustrating a fabrication method according to a second embodiment of the present invention.

According to the second embodiment, first, a sheet member 1 as shown in FIG. 25 is prepared. As in the sheet member 1 of the first embodiment (FIG. 1), the sheet member 1 of the second embodiment has an obverse surface on which a plurality of cathode connection layers 2 are formed, and a reverse surface on which cathode electrode layers 3 and anode electrode layers 4 are formed. Differing from the sheet member 1 of the first embodiment, the sheet member 1 of the second embodiment is formed with a plurality of through-holes 21 corresponding in number and in position to the cathode connection layers 2, as shown in FIG. 25. As shown in FIG. 26, each through-hole 21 is disposed between two adjacent cutting lines X. The through-holes 21 are provided with conductors for electrically connecting the cathode connection layers 2 to the cathode electrode layers 3.

After the above-described sheet member 1 is prepared, a plurality of capacitor elements 6 are mounted on the cathode connection layers 2. As shown in FIGS. 25 and 26, each capacitor element 6 is placed on a corresponding one of the cathode connection layers 2. The subsequent procedures of the fabrication method of the second embodiment are similar to those of the first embodiment, whereby no explanation for them is given below. It should be noted, however, that according to the second embodiment, a cathode terminal layer-forming step may not be performed.

Figure 27:
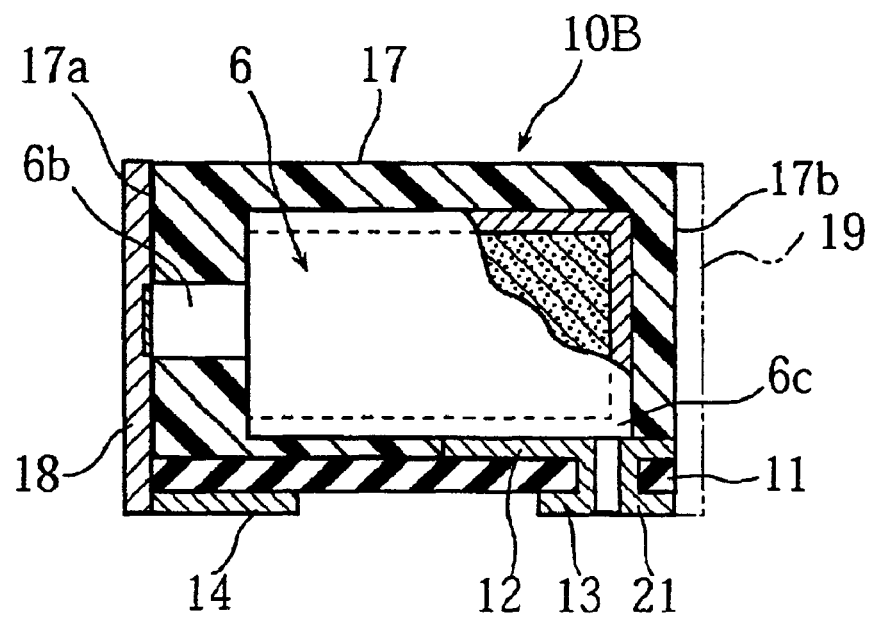
FIG. 27 is a sectional view showing a solid electrolytic capacitor made by the fabrication method of the second embodiment.

FIG. 27 shows the structure of a solid electrolytic capacitor 10B obtained by the fabrication method of the second embodiment. The illustrated capacitor 10B includes a capacitor element 6 having an anode 6b and a cathode 6c. The capacitor 10B also includes a synthetic resin base sheet 11 for mounting the capacitor element 6. The obverse surface of the base sheet 11 is provided with cathode connection layer 12 connected to the cathode 6c of the capacitor element 6. A synthetic resin package 17 is formed on the obverse surface of the base sheet 11 to enclose the capacitor element 6. The package 17 has a side surface 17a at which the tip of the anode 6b is exposed. The side surface 17a is covered by an anode terminal layer 18 which is electrically connected to the anode 6b. The package 17 has another side surface 17b which is opposite to the first-mentioned side surface 17a. As opposed to the capacitor 10A (FIG. 15) of the first embodiment, the capacitor 10B of the second embodiment is not provided with a cathode terminal layer 19 covering the side surface 17b.

As shown in FIG. 27, the reverse surface of the base sheet 11 is provided with a cathode electrode layer 13 and a anode electrode layer 14 spaced from the cathode electrode layer 13. The cathode electrode layer 13 is connected to the cathode connection layer 12 by a conductor arranged in the through-hole 21. The anode electrode layer 14 is connected to the anode terminal layer 18.

Figure 28:
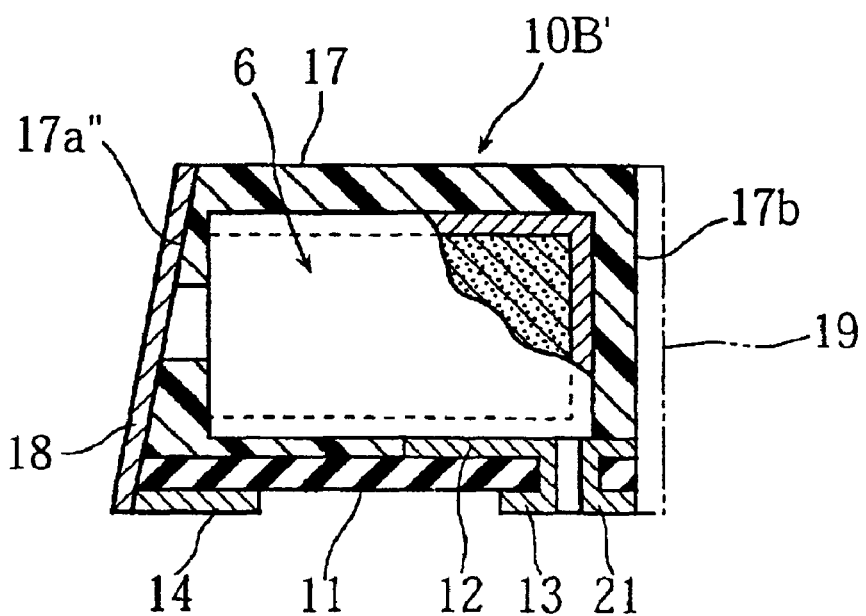
FIG. 28 is a sectional view showing a different type of solid electrolytic capacitor obtained by the fabrication method of the second embodiment.

FIG. 28 shows a modified version of the capacitor 10B of FIG. 27. The modified capacitor 10B' is basically the same as the capacitor 10B except that the first cut surface 17a" is entirely slanted. Accordingly, the anode terminal layer 18 is entirely slanted. Though not illustrated, the first cut surface 17a" may have a lower upright portion and an upper slanted portion arranged in the same manner as shown in FIG. 22.

Figure 29:
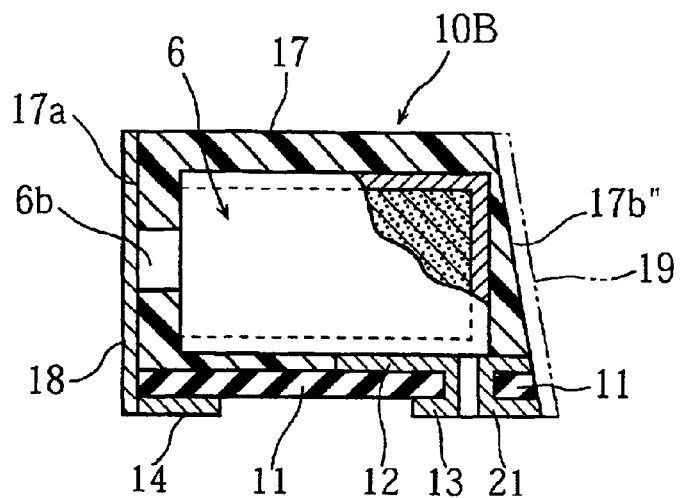
FIG. 29 is a sectional view showing another type of solid electrolytic capacitor obtained by the fabrication method of the second embodiment.

FIG. 29 shows another modified version of the capacitor 10B of FIG. 27. The modified capacitor 10B" includes a resin package 17 provided with a first cut surface 17a and a second cut surface 17b". The first cut surface 17a is upright, while the second cut surface 17b" is entirely slanted.

As shown in FIGS. 27–29, the capacitors 10B–10B" obtained by the method of the second embodiment do not need to be provided with a cathode terminal layer 19 indicated by double-dot chain lines. Thus, the weight and production costs of these capacitors are advantageously reduced. Wherever appropriate, a cathode terminal layer 19 may be formed on these capacitors.

Figure 30:
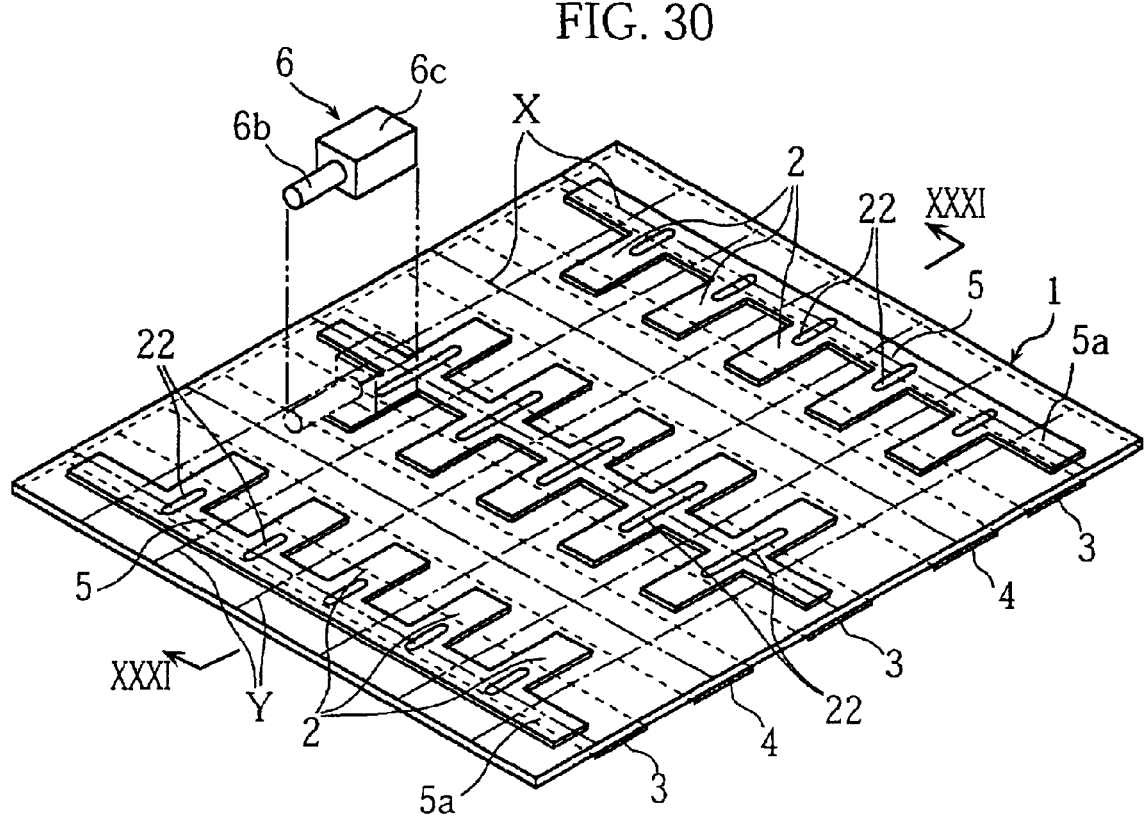
FIG. 30 is a perspective view showing a sheet member used for implementing a fabrication method according to a third embodiment of the present invention.
Figure 31:
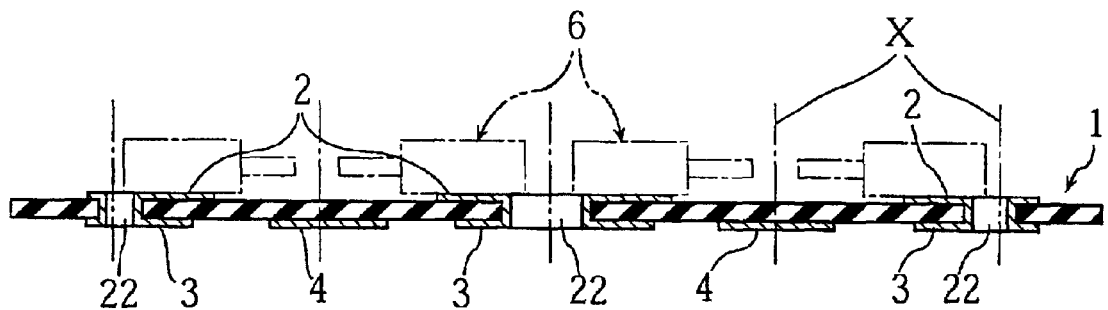
FIG. 31 is an enlarged sectional view taken along lines XXXI—XXXI in FIG. 30.

Reference is now made to FIGS. 30–31 illustrating a fabrication method according to a third embodiment of the present invention.

The fabrication method of the third embodiment is substantially the same as the method of the second embodiment except that the sheet members 1 to be used for these methods are slightly different from each other. Specifically, as shown in FIGS. 30 and 31, the through-holes 22 of of the sheet member 1 for the third embodiment are elongated, as opposed to the through-holes 21 of the second embodiment (see FIG. 25).

As best shown in FIG. 31, the elongated through-holes 22 are arranged to intersect every other cutting line X. Thus, no through-holes are provided along the particular cutting lines X intersecting the anode electrode layers 4.

After the sheet member 1 shown in FIG. 30 is prepared, a plurality of capacitor elements 6 are mounted on the cathode connection layers 2 (FIGS. 30 and 31). The subsequent procedures of the fabrication method of the third embodiment are the same as those of the first embodiment except that the third method may not include a cathode terminal layer-forming step.

Figure 32:
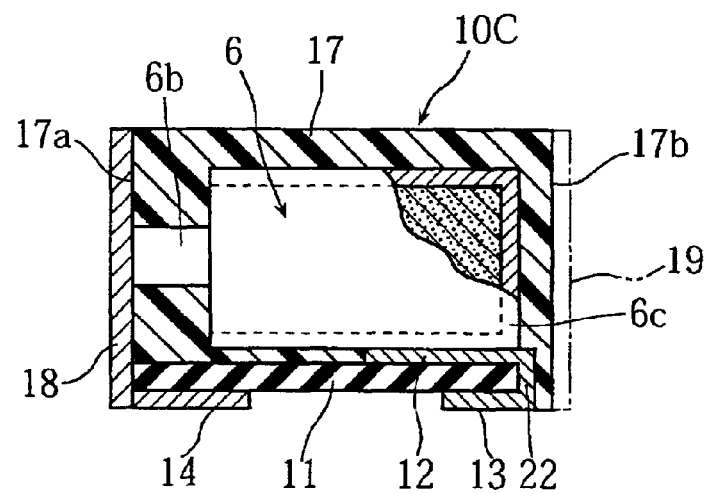
FIG. 32 is a sectional view showing a solid electrolytic capacitor made by the fabrication method of the third embodiment.

FIG. 32 shows a solid electrolytic capacitor 10C obtained by the fabrication method of the third embodiment. The illustrated capacitor 10C includes a capacitor element 6 having an anode 6b and a cathode 6c. The capacitor 10C also includes a base sheet 11 for mounting the capacitor element 6. The obverse surface of the base sheet 11 is formed with a cathode connection layer 12 electrically connected to the cathode 6c of the capacitor element 6. A synthetic resin package 17 is formed on the obverse surface of the base sheet 11 to enclose the capacitor element 6. The package 17 has a pair of opposing side surfaces 17a and 17b (or first cut surface 17a and second cut surface 17b). The tip of the anode 6b is exposed in the side surface 17a. An anode terminal layer 18 is formed on the side surface 17a to be connected to the anode 6b. The reverse surface of the base sheet 11 is formed with a cathode electrode layer 13 and an anode electrode layer 14. The cathode electrode layer 13 is electrically connected to the cathode connection layer 12 by a conductor provided at the through-hole (or ex-through-hole) 22. The anode electrode layer 14 is electrically connected to the anode terminal layer 18.

Figure 33:
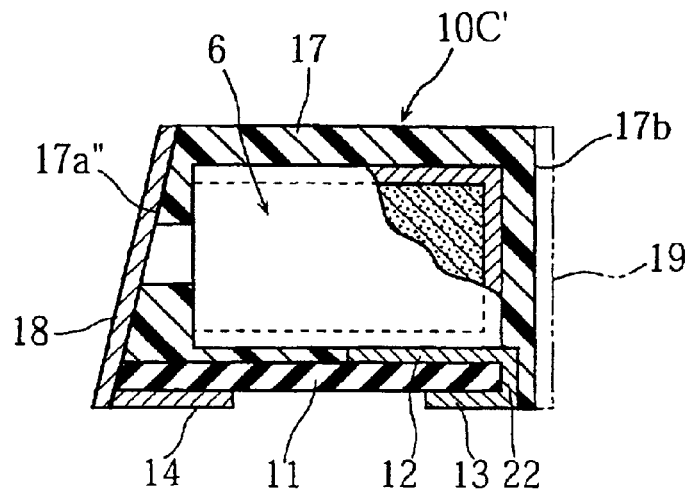
FIG. 33 is a sectional view showing a different type of solid electrolytic capacitor obtained by the fabrication method of the third embodiment.
Figure 34:
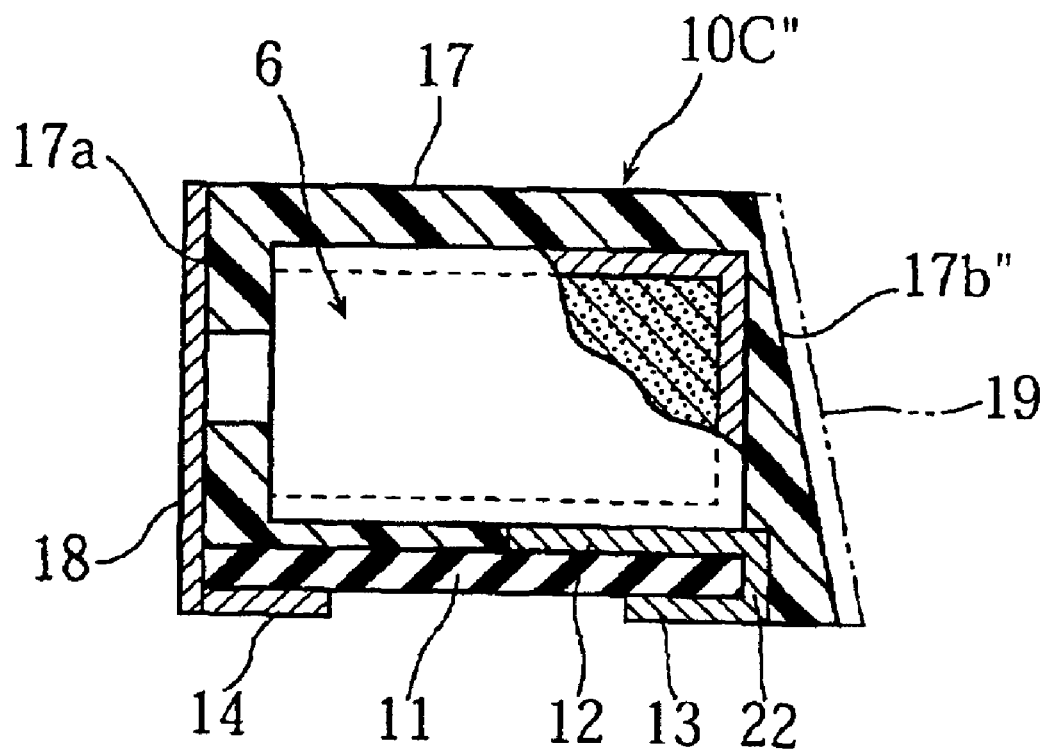
FIG. 34 is a sectional view showing another type of solid electrolytic capacitor obtained by the fabrication method of the third embodiment.

FIGS. 33 and 34 show modified versions of the capacitor 10C shown in FIG. 32. The modified capacitor 10C' of FIG. 33 has an entirely slanted side surface 17a" and an upright side surface 17b. On the other hand, the modified capacitor 10C" has an upright side surface 17a and an entirely slanted side surface 17b".

As in the capacitor 10A of the first embodiment (see FIG. 15), the capacitors 10C, 10C' and 10C" of the third embodiment may be provided with a cathode terminal layer 19, as indicated by double-dot chain lines in FIGS. 32, 33 and 34. The cathode terminal layer 19 may be electrically connected to the cathode connection layer 12 or cathode electrode layer 13 via a non-illustrated conductor. Alternatively, the cathode terminal layer 19 may be held in direct contact with the cathode connection layer 12 or cathode electrode layer 13.

Reference is now made to FIGS. 35A–39 illustrating a fabrication method according to a fourth embodiment of the present invention. The fabrication method of this embodiment is substantially the same as the method of the first embodiment except that capacitor elements to be used are different from those of the first embodiment.

Figure 35A:
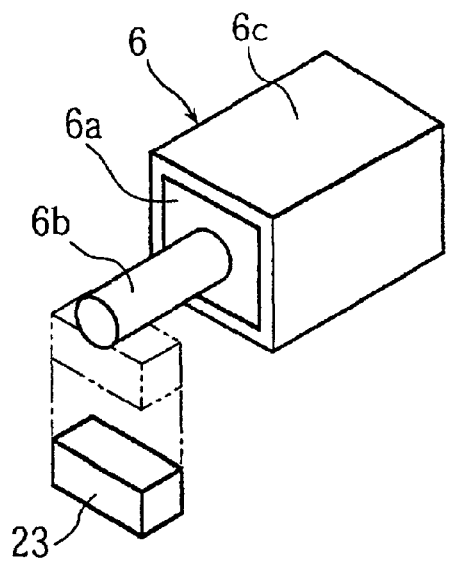
FIGS. 35A and 35B are perspective views showing a capacitor element used for implementing a fabrication method according to a fourth embodiment of the present invention.
Figure 35B:
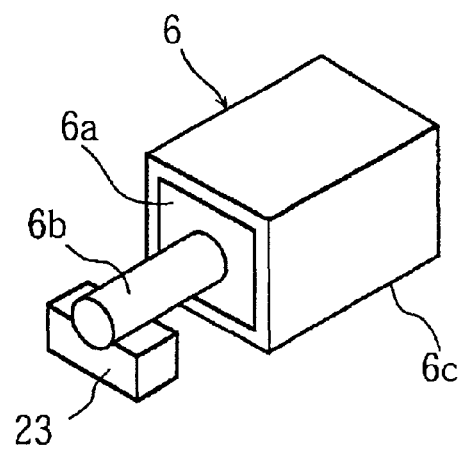

Specifically, as shown in FIGS. 35A and 35B, a capacitor element 6 used for implementing the fabrication method of the fourth embodiment includes a porous body 6a, a bar-like anode 6b projecting from the body 6a, and a cathode 6c formed on the body 6a. In addition, the capacitor element 6 includes a metal piece 23 attached to the anode 6b. The metal piece 23 may be made of a metal material which is weldable to the tantalum anode 6b.

Figure 36:
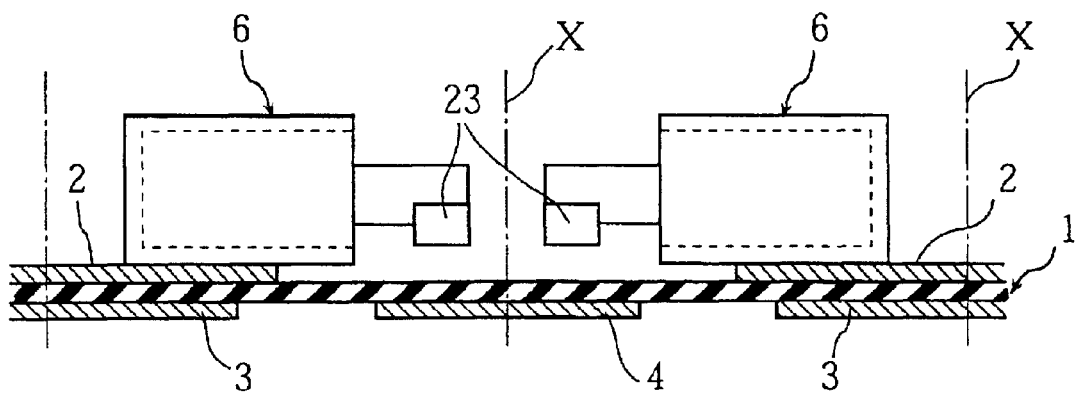
FIG. 36 is a partially sectional view showing the sheet member used for the fourth embodiment, which carries capacitor elements mounted thereon.

The fabrication method of the fourth embodiment includes the following steps. First, as shown in FIG. 36, a plurality of capacitor elements 6 as shown in FIG. 35B are mounted on a sheet member 1 prepared beforehand. The sheet member 1 of FIG. 36 is the same as that of FIG. 1 and includes cathode connection layers 2, cathode electrode layers 3 and anode electrode layers 4. The cathode 6c of each capacitor element 6 is connected to a corresponding one of the cathode connection layers 2 formed on the obverse surface of the sheet member 1.

Figure 37:
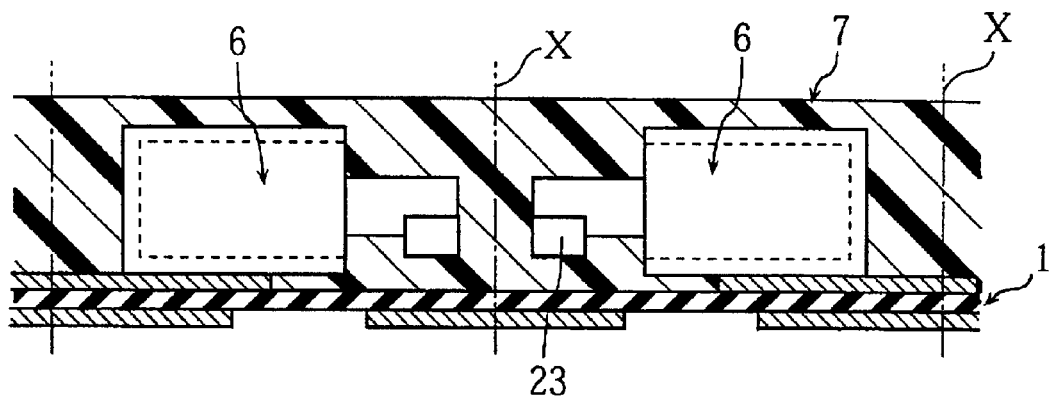
FIG. 37 is a sectional view showing the sheet member of FIG. 36 with a resin plate formed thereon.

Then, as shown in FIG. 37, a synthetic resin material is supplied onto the obverse surface of the sheet member 1 to immerse the respective capacitor elements 6. The resin material is then hardened to form as a resin plate or holder 7. Thereafter, an expansion sheet 30 (FIG. 30) is attached to the reverse surface of the sheet member 1.

Figure 38:
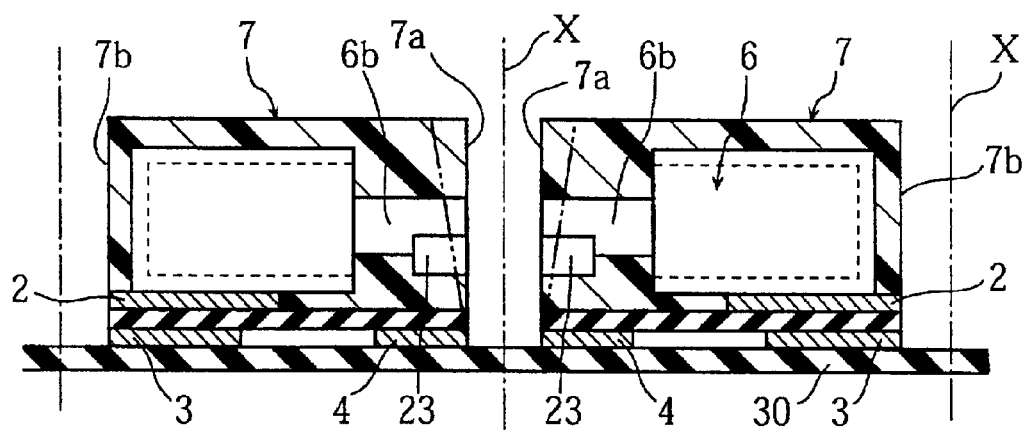
FIG. 38 is a sectional view showing the resin plate of FIG. 37 divided by cuts made in the plate.

Then, as shown in FIG. 38, the resin plate 7 is cut along the predetermined cutting lines X by e.g. a dicing cutter, so that upright first and second cut surfaces 7a and 7b are formed. In this cutting step, the expansion sheet 30 is left uncut. As a result of the cutting, the anodes 6b together with the associated metal pieces 23 are exposed at the first cut surfaces 7a. The anode electrode layers 4 are also exposed at the first cut surfaces 7a. At the second cut surfaces 7b, on the other hand, the cathode connection layers 2 and the cathode electrode layers 3 are exposed.

Figure 39:
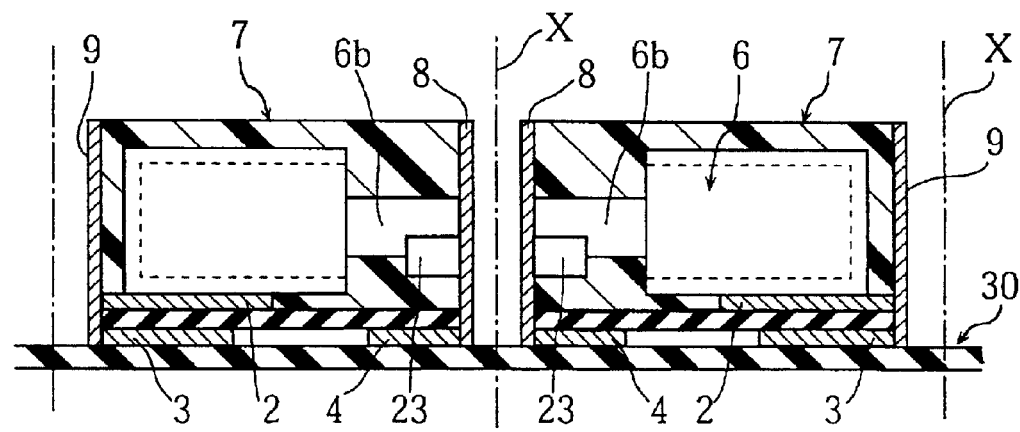
FIG. 39 is a sectional view showing the divided plate with terminal electrode layers formed on the exposed cut surfaces of the plate.

Then, as shown in FIG. 39, anode terminal layers 8 are formed on the first cut surfaces 7a to be connected to the anodes 6b, the metal pieces 23 and the anode electrode layers 4. Also, cathode terminal layers 9 are formed on the second cut surfaces 7b to be connected to the cathode connection layers 2 and the cathode electrode layers 3.

Then, though not illustrated, the resin plate 7 is cut along the other predetermined cutting lines (same as the cutting lines Y in e.g. FIG. 30) which are perpendicular to the cutting lines X. Thereafter, the expansion sheet 30 is removed.

Figure 40:
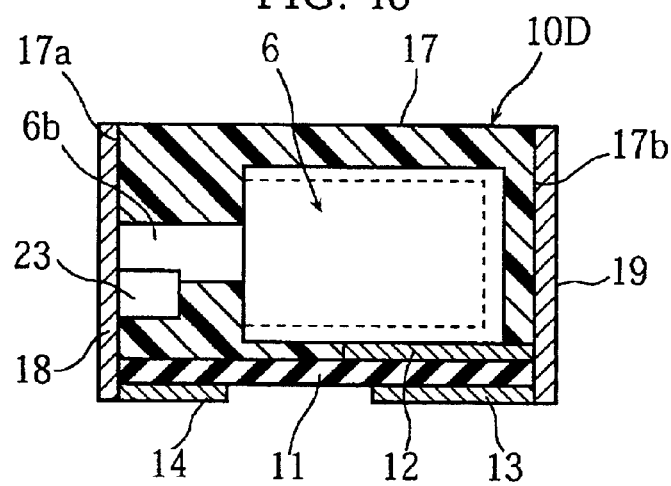
FIG. 40 is a sectional view showing a solid electrolytic capacitor made by the fabrication method of the fourth embodiment.

In the above manner, a desired number of solid electrolytic capacitors 10D shown in FIG. 40 are obtained collectively. As seen from FIG. 40, the capacitors 10D of the fourth embodiment are basically the same as those of the first embodiment (FIG. 15). The difference is that the capacitor 10D of the fourth embodiment includes a metal piece 23 which the capacitor 10A of the first embodiment does not have.

According to the fourth embodiment, as stated above, not only the anode 6b but also the associated metal piece 23 is exposed at the first cut surface 17a. This means that the exposed area on the anode side is increased than when only the anode 6b is provided. Thus, electrical connection between the anode terminal layer 18 and the capacitor element 6 is advantageously improved. Another advantage is that an anode bump (see reference 6b' in FIG. 12) is easily formed on the enlarged exposed area of the anode 6b and metal piece 23.

Preferably, the metal piece 23 may be made of copper (or an alloy of copper with other materials) so that the metal piece 23 is readily welded to the anode 6b. Using copper or an alloy of copper to make the metal piece 23 is also advantageous since such material is resistant to oxidation. Thus, the anode terminal layer 18 and the capacitor element 6 are properly connected to each other via the metal piece 23 without forming the above-mentioned anode bump on the anode 6b and the metal piece 23.

Figure 41:
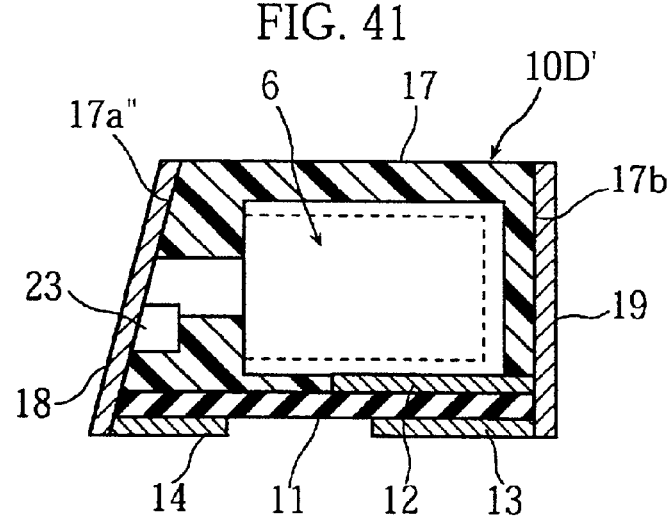
FIG. 41 is a sectional view showing a different type of solid electrolytic capacitor obtained by the fabrication method of the fourth embodiment.
Figure 42:
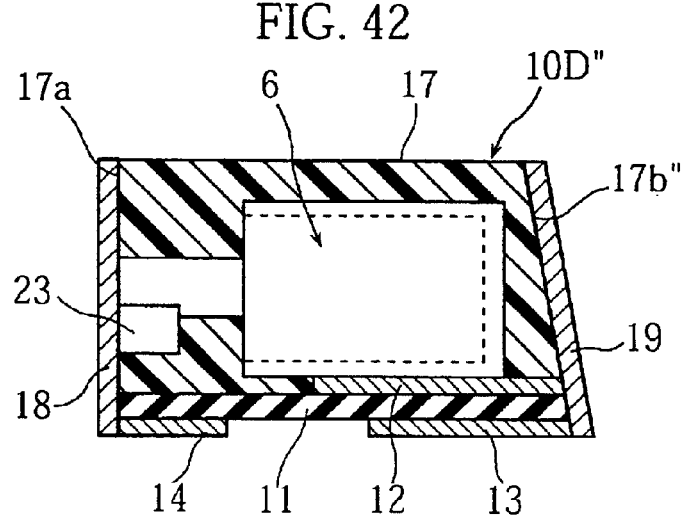
FIG. 42 is a sectional view showing another type of solid electrolytic capacitor obtained by the fabrication method of the fourth embodiment.

FIGS. 41 and 42 show modified versions of the capacitor 10D of FIG. 40. The modified capacitor 10D' shown in FIG. 41 includes an entirely slanted first cut surface 17a" and an upright second cut surface 17b. On the other hand, the modified capacitor 10D" shown in FIG. 42 includes an upright first cut surface 17a and an entirely slanted second cut surface 17b".

Figure 43:
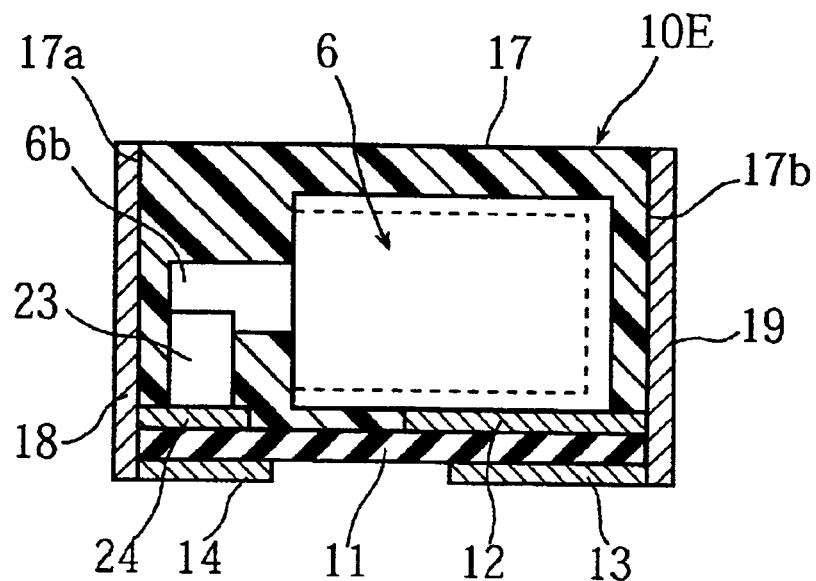
FIG. 43 is a sectional view showing a modified version of the capacitor of FIG. 40.

FIG. 43 shows another modified version of the capacitor 10D of FIG. 40. In the modified capacitor 10E, the anode 6b and the metal piece 23 are not exposed at the first cut surface 17a but entirely enclosed by the package 17. For establishing electrical connection between the anode terminal layer 18 and the capacitor element 6, an anode connection layer 24 is provided on the obverse surface of the sheet base 11. As illustrated, the anode connection layer 24 is exposed at the first cut surface 17a to be connected to the anode terminal layer 18, while also being connected to the metal piece 23 within the package 17.

Figure 44:
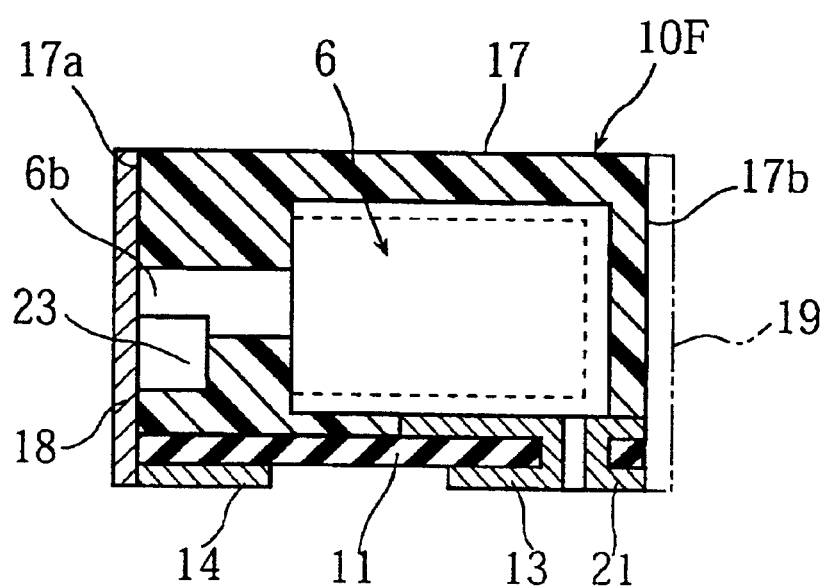
FIG. 44 is a sectional view showing a modified version of the capacitor of FIG. 27.

FIG. 44 shows a modified version of the capacitor 10B of FIG. 27. The modified capacitor 10F is basically the same as the capacitor 10B except that a metal piece 23 is attached to the anode 6b to be electrically connected to the anode terminal layer 18.

Figure 45:
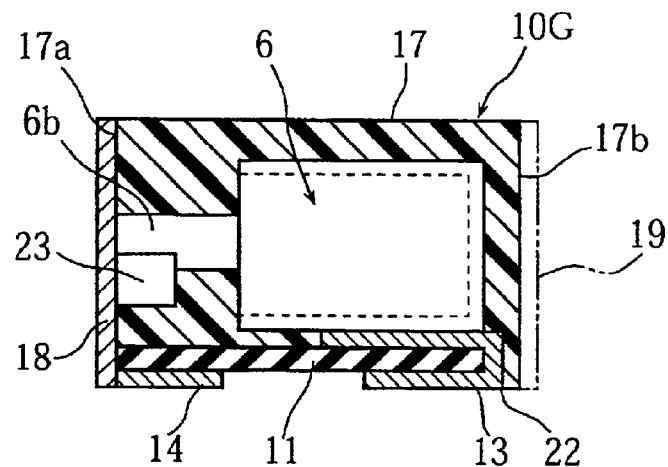
FIG. 45 is a sectional view showing a modified version of the capacitor of FIG. 32.

FIG. 45 shows a modified version of the capacitor 10C of FIG. 32. The modified capacitor 10G is basically the same as the capacitor 10C except that a metal piece 23 is attached to the anode 6b to be electrically connected to the anode terminal layer 18.

In the modified versions shown in FIGS. 43–45, their first cut surface 17a and second cut surface 17b are depicted as upright. Clearly these cut surfaces may be slanted, as shown in FIGS. 41 and 42 for example.

Reference is now made to FIGS. 46–57 illustrating a fabrication method according to a fifth embodiment of the present invention. Basically, the fabrication method of this embodiment includes the following steps.

Figure 46:
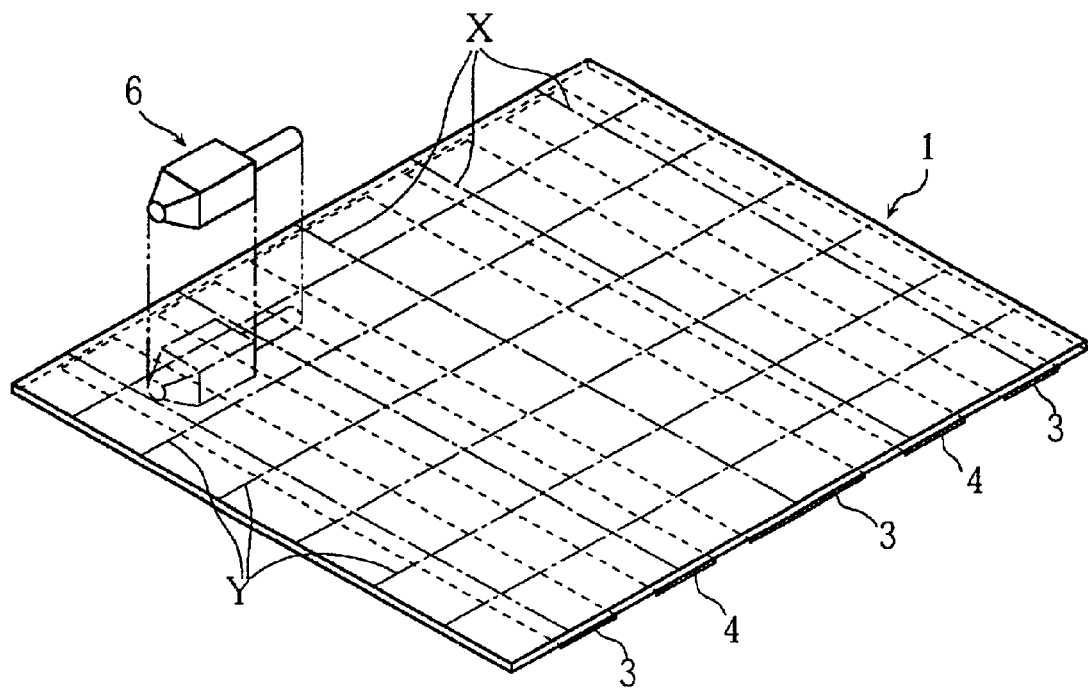
FIG. 46 is a perspective view showing a sheet member used for implementing a fabrication method according to a fifth embodiment of the present invention.

First, as shown in FIG. 46, a sheet member 1 having an appropriate thickness is prepared. The sheet member 1 may be made of a soft (flexible) or hard (rigid) synthetic resin material. The reverse (lower) surface of the sheet member 1 is provided with three elongated cathode electrode layers 3 and two elongated anode electrode layers 4. As seen from FIG. 46, the electrode layers 3 and 4 extend in the same direction and are alternately arranged.

Figure 47:
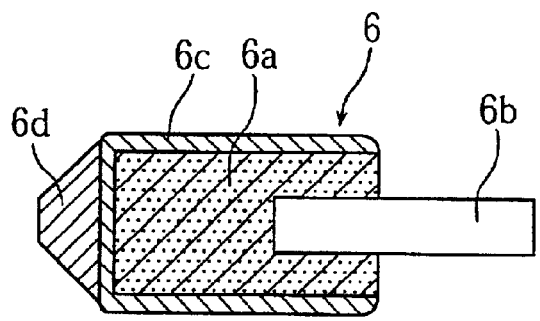
FIG. 47 is a sectional view showing a capacitor element used for implementing the fabrication method of the fifth embodiment.

FIG. 47 shows, in section, a capacitor element 6 used for implementing the fabrication method of the fifth embodiment. The illustrated capacitor 6 includes a porous body 6a, an anode 6b partially embedded in the body 6a, a cathode 6c, and a cathode bump 6d. The porous body 6a may be made of a valve metal such as tantalum. Specifically, tantalum powder is compacted into a lump and then baked. Then, the surface of the compacted tantalum powder is coated by a dielectric layer made of e.g. tantalum pentoxide and a solid electrolytic layer. The anode 6b may be made of a valve metal such as tantalum. The cathode bump 6d may be made of a silver paste for example. The illustrated cathode bump 6d tapers to the left, while the anode 6b protrudes from the body 6a to the right.

Figure 48:
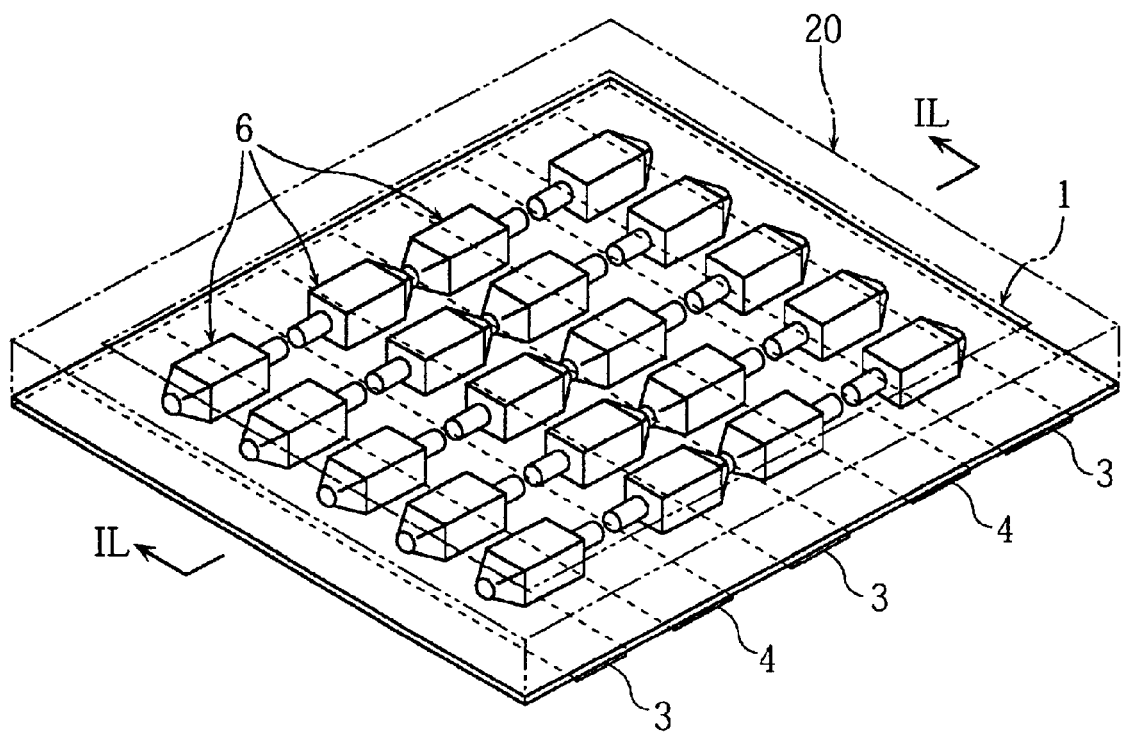
FIG. 48 is a perspective view showing the sheet member of FIG. 46 which carries capacitor elements mounted thereon.
Figure 49:
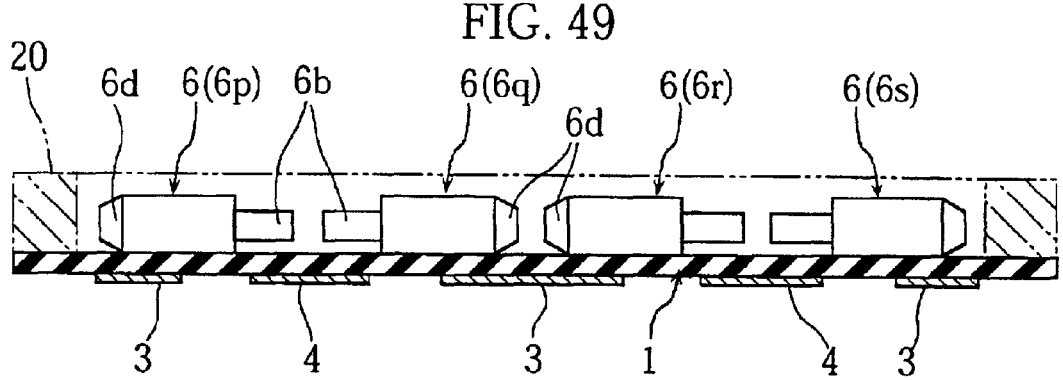
FIG. 49 is an enlarged sectional view taken along lines IL—IL in FIG. 48.

After the sheet member 1 of FIG. 46 is prepared, a predetermined number of capacitor elements 6 are mounted on the obverse surface of the sheet member 1, as shown in FIGS. 48 and 49. The capacitor elements 6 on the sheet member 1 are arranged in first to fourth rows. Each row extends longitudinally of the cathode electrode layers 3 (hence the anode electrode layers 4) and consists of five capacitor elements 6. As shown in FIG. 49, the first-row capacitors 6p and the second-row capacitors 6q are arranged on the sheet member 1 so that their anodes 6b come into facing relation to each other. Likewise, the anodes 6b of the third-row capacitors 6r are held in facing relation to the anodes 6b of the fourth-row capacitors 6s. All the capacitors 6 may be fixed to the sheet member 1 by e.g. adhesive (not shown).

Then, as indicated by double-dot chain lines in FIGS. 48 and 49, a frame member 20 is placed on the sheet member 1, as in the first embodiment. Thereafter, a synthetic resin material in a liquid state is supplied into the opening of the frame member 20, until the respective capacitor elements 6 are immersed in the resin. Then, the supplied resin material is hardened and the frame member 20 is removed.

Figure 50:
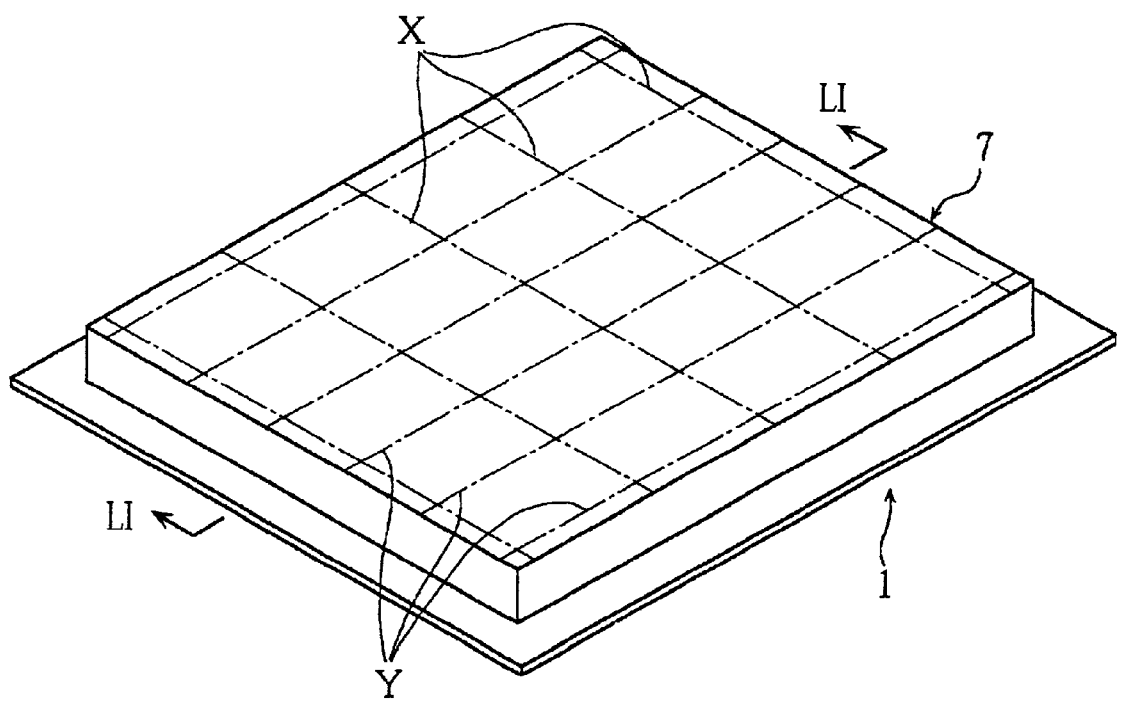
FIG. 50 is a perspective view showing the sheet member of FIG. 49 with a resin plate formed thereon.
Figure 51:
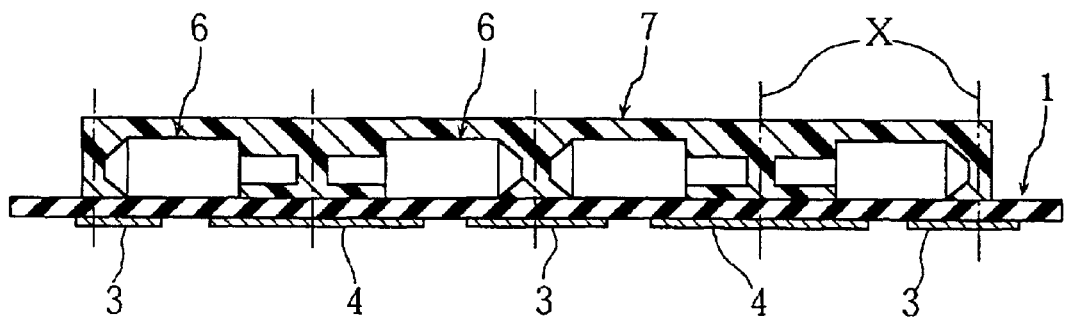
FIG. 51 is an enlarged sectional view taken along lines LI—LI in FIG. 50.

In the above manner, a resin plate 7 shown in FIG. 50 is obtained. The respective capacitor elements 6 are enclosed by the hardened resin plate 7, as shown in FIGS. 50 and 51. Then, an expansion sheet 30 (see FIG. 52) is attached to the reverse surface of the sheet member 1.

Figure 52:
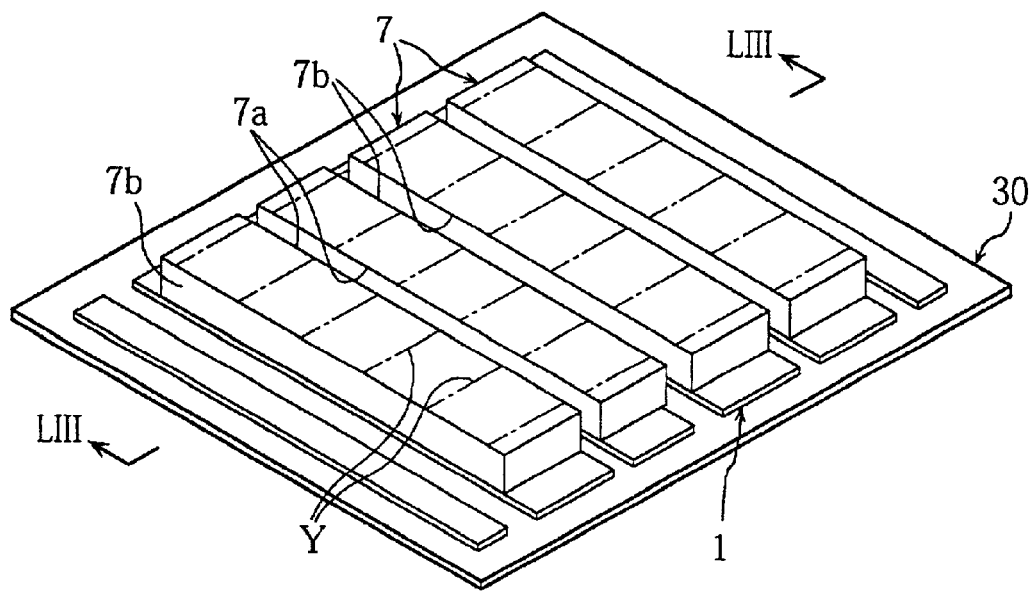
FIG. 52 is a perspective view showing a manner in which several cuts are made in the sheet member and the resin plate of FIG. 50.
Figure 53:
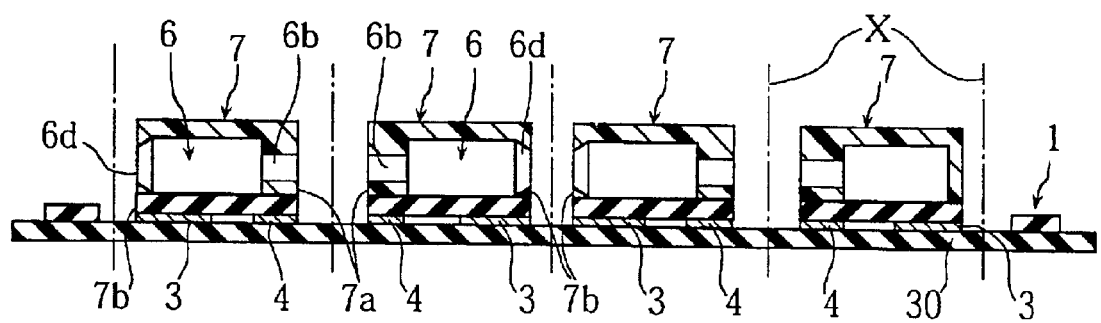
FIG. 53 is an enlarged sectional view taken along lines LIII—LIII in FIG. 52.

Then, as shown in FIGS. 52 and 53, the resin plate 7 together with the sheet member 1 is cut by e.g. a dicing cutter along cutting lines X (see FIG. 50). It should be noted that the expansion sheet 30 remains to be uncut in this cutting process. As shown in FIG. 53, the cutting along the lines X generates upright first and second cut surfaces 7a, 7b in the resin plate 7. The anodes 6b and the anode electrode layers 4 are exposed at the first cut surfaces 7a, while the cathode bumps 4d and the cathode electrode layers 3 are exposed at the second cut surfaces 7b.

Figure 54:
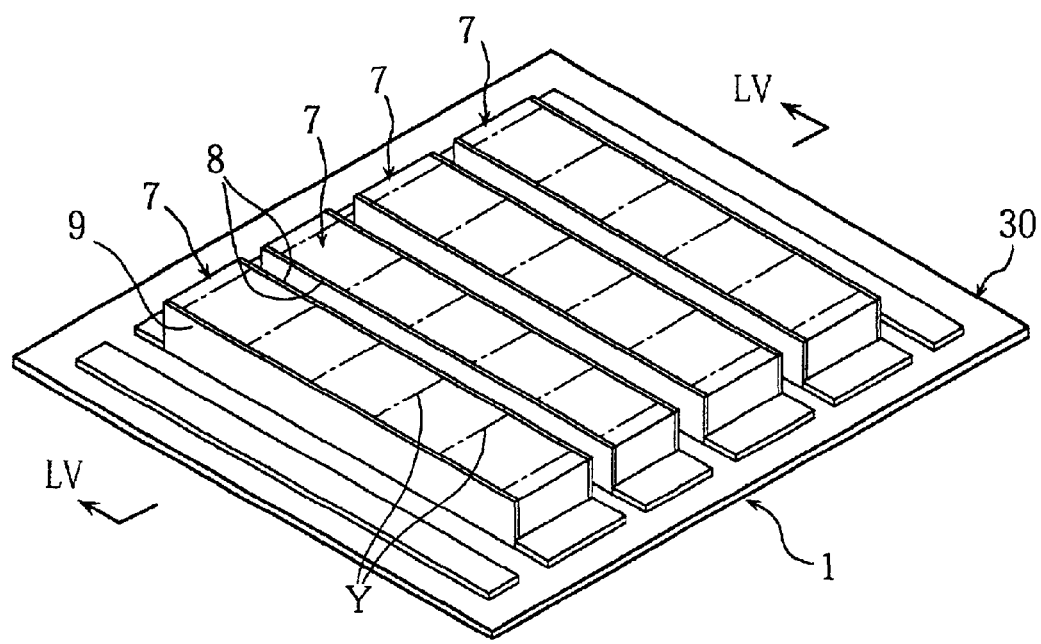
FIG. 54 is a perspective view showing the divided resin plate of FIG. 52 with terminal electrode layers formed on the exposed cut surfaces of the plate.
Figure 55:
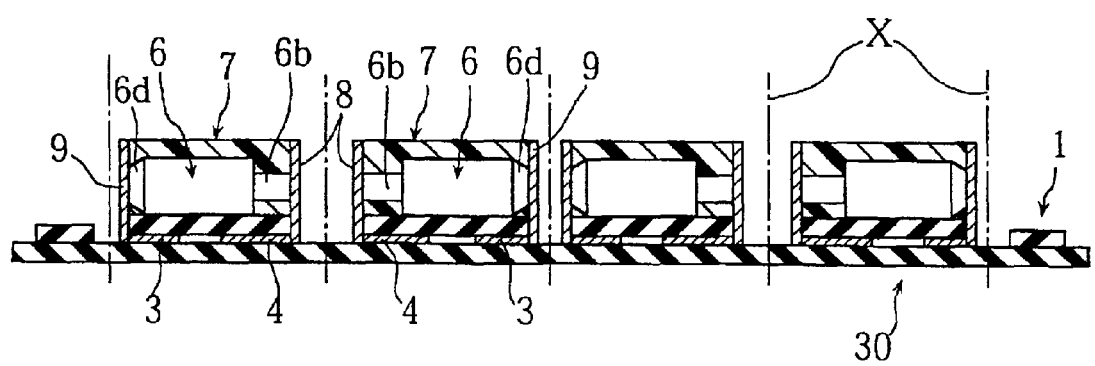
FIG. 55 is a sectional view taken along lines LV—LV in FIG. 54.

Then, as shown in FIGS. 54 and 55, anode terminal layers 8 are formed on the first cut surfaces 7a, while cathode terminal layers 9 are formed on the second cut surfaces 7b. These terminal layers 8, 9 may be made by the same manner as described in connection with the first embodiment (see FIGS. 10 and 11). The anode terminal layers 8 are connected to the anodes 6b and the anode electrode layers 4, whereas the cathode terminal layers 9 are connected to the cathode bumps 9d and the cathode electrode layers 3.

Figure 56:
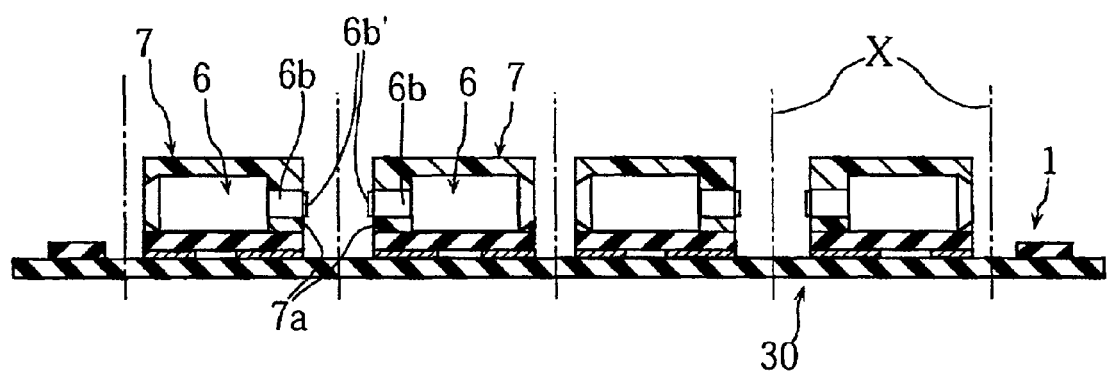
FIG. 56 is an enlarged sectional view showing capacitor elements whose exposed anode tips are covered by anode bumps.

According to the fifth embodiment, as shown in FIG. 56, anode bumps 6b' may be formed on the exposed tips of the respective anodes 6b prior to the formation of the anode terminal layers 8. The anode bumps 6b' are resistant to oxidation. These anode bumps 6b' may be made by the same manner as described in connection with the first embodiment (see FIG. 12). Due to the anode bumps 6b', the anode terminal layers 8 are properly connected to the anodes 6b of the respective capacitor elements 6.

Figure 57:
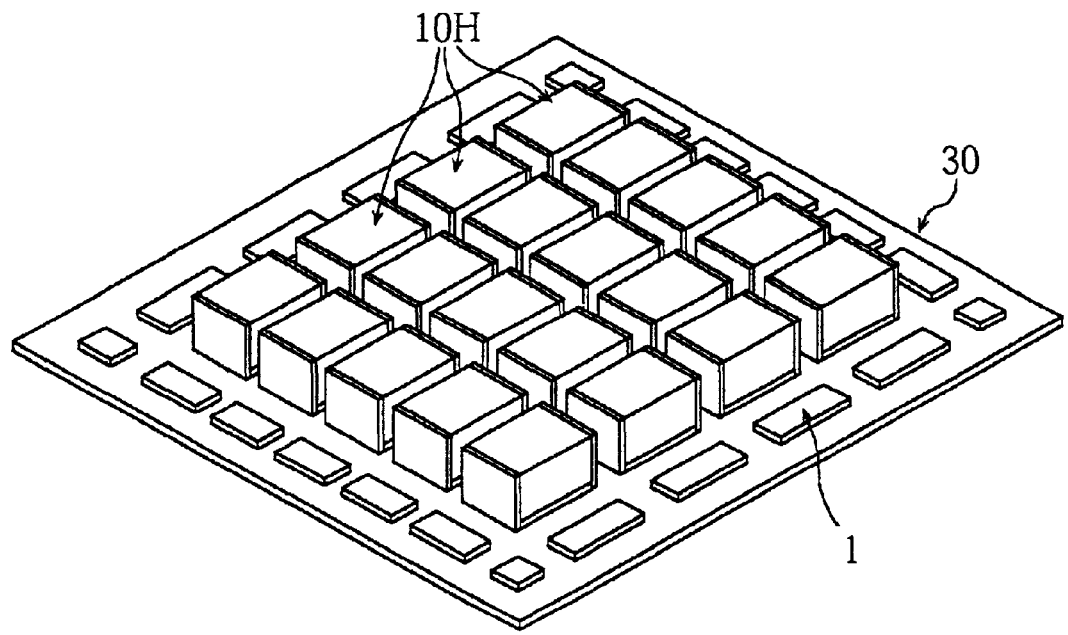
FIG. 57 is a perspective view showing the resin plate divided into a number of chips.

Then, the resin plate 7 together with the sheet member 1 is cut by e.g. a dicing cutter along cutting lines Y (see FIG. 54). Consequently, as shown in FIG. 57, the resin plate 7 is divided into a plurality of chips (or solid electrolytic capacitors) 10H. Finally, each chip 10H is removed from the expansion sheet 30. In this manner, a desired number of capacitors 10H are obtained collectively.

Figure 58:
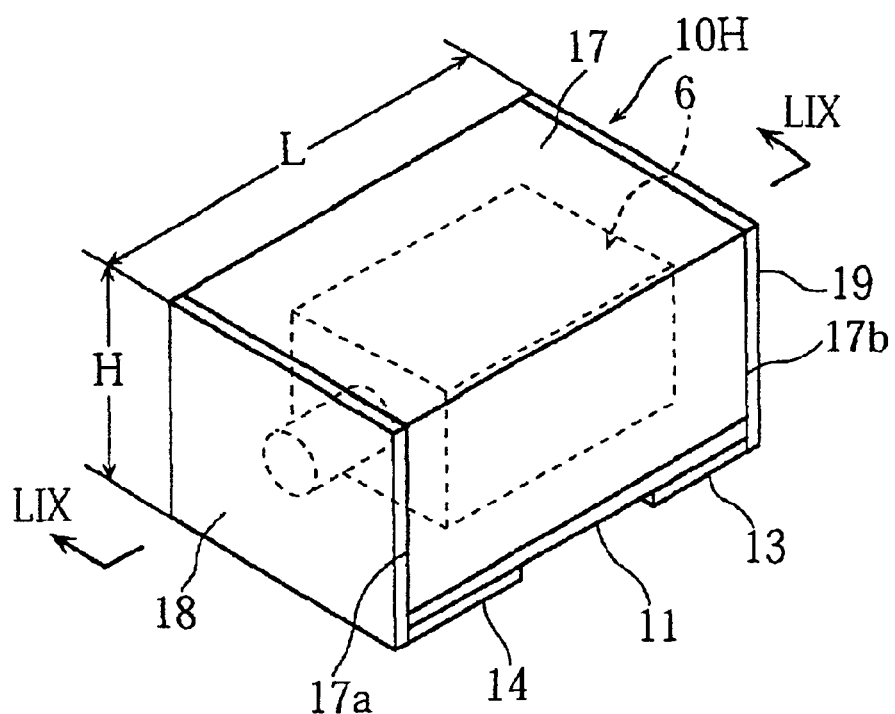
FIG. 58 is a perspective view showing a solid electrolytic capacitor made by the fabrication method of the fifth embodiment.
Figure 59:
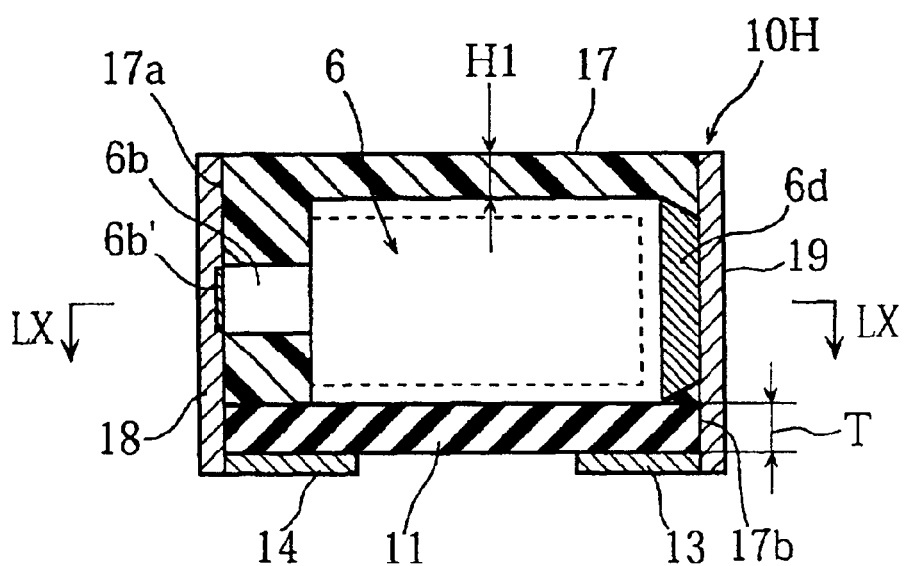
FIG. 59 is a sectional view taken along lines LIX—LIX in FIG. 58.
Figure 60:
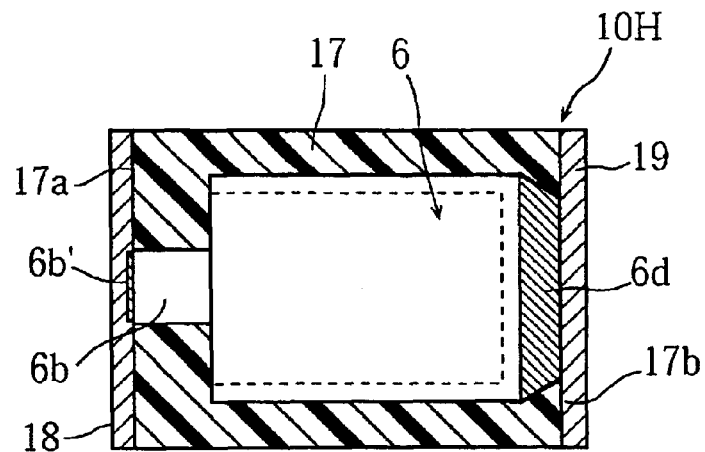
FIG. 60 is a sectional view taken along lines LX—LX in FIG. 59.

FIGS. 58–60 show the structure of the capacitor 10H obtained by the fabrication method of the fifth embodiment. Specifically, the capacitor 10H includes a capacitor element 6 as shown in FIG. 47, a base sheet 11 of a synthetic resin for mounting the capacitor element 6, and a synthetic resin package 17 formed on the base sheet 11. The package 17 has a pair of opposing side surfaces 17a and 17b. As shown in FIGS. 59 and 60, the anode 6b is exposed at the side surface 17a, while the cathode bump 6d is exposed at the other side surface 17b. The exposed anode 6b is connected to an anode terminal layer 18 formed on the first-mentioned side surface 17a, while the exposed cathode bump 6d is connected to a cathode terminal layer 19 formed on the other side surface 17b. As shown in FIG. 59, the reverse (lower) surface of the base sheet 11 is provided with a cathode electrode layer 13 and an anode electrode layer 14 spaced from the cathode electrode layer 13. The cathode electrode layer 13 is connected to the cathode terminal layer 19, while the anode electrode layer 14 is connected to the anode terminal layer 18.

The above-described capacitor 10H is advantageous in the same respects as described in connection with the capacitor 10A (see FIGS. 14–16). Briefly, the capacitor 10H is reduced in height H (FIG. 58), as compared with the conventional capacitor (FIG. 155), since the capacitor element 6 is mounted on the base sheet 11 having an advantageously small thickness T (FIG. 59). The capacitor 10H is also reduced in length L (FIG. 58) and weight since no leads are used as opposed to the conventional capacitor.

Figure 61:
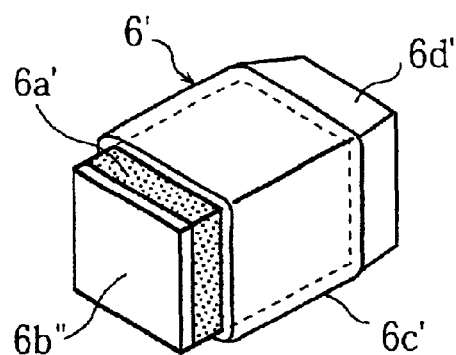
FIG. 61 is a perspective view showing a different type of capacitor element used for implementing the fabrication method of the fifth embodiment.

For implementing the fabrication method of the fifth embodiment, use may be made of a capacitor element 6' shown in FIG. 61 instead of the capacitor element 6 shown in FIG. 47. The capacitor element 6' of FIG. 61 is similar to the capacitor element shown in FIG. 17 except that the capacitor element 6' of FIG. 61 is provided with a cathode bump 6d'.

Figure 62:
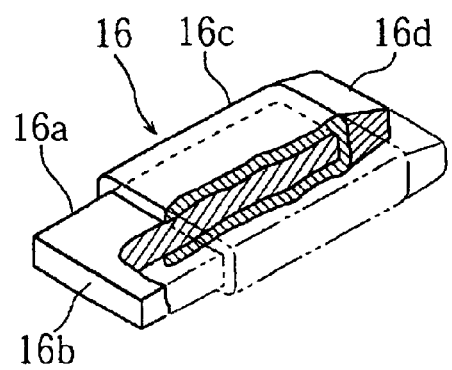
FIG. 62 is a perspective view showing another type of capacitor element used for implementing the fabrication method of the fifth embodiment.
Figure 63:
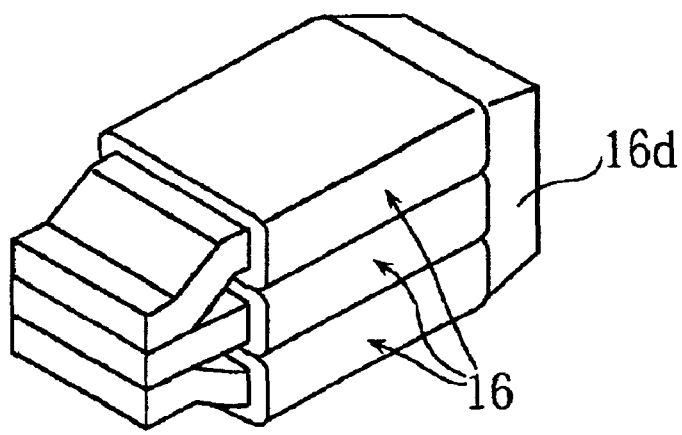
FIG. 63 is a perspective view showing still another type of capacitor element used for implementing the fabrication method of the fifth embodiment.

A capacitor element 16 shown in FIG. 62 and a capacitor element shown in FIG. 63 may also be used for implementing the fabrication method of the fifth embodiment. The capacitor element 16 of FIG. 62 is similar to the capacitor element shown in FIG. 18, whereas the capacitor element of FIG. 63 is similar to the capacitor element of FIG. 19. The difference is that the capacitor elements of FIGS. 62 and 63 have a cathode bump 16d added to the original structure of the respective capacitor elements of FIGS. 18 and 19.

Figure 64:
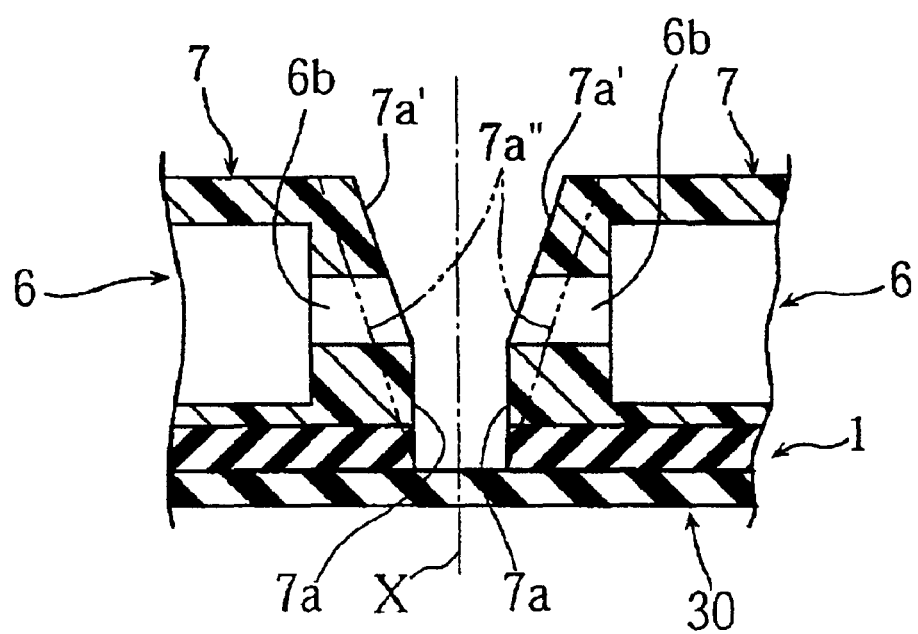
FIG. 64 is an enlarged sectional view showing a different manner for dividing the resin plate.
Figure 65:
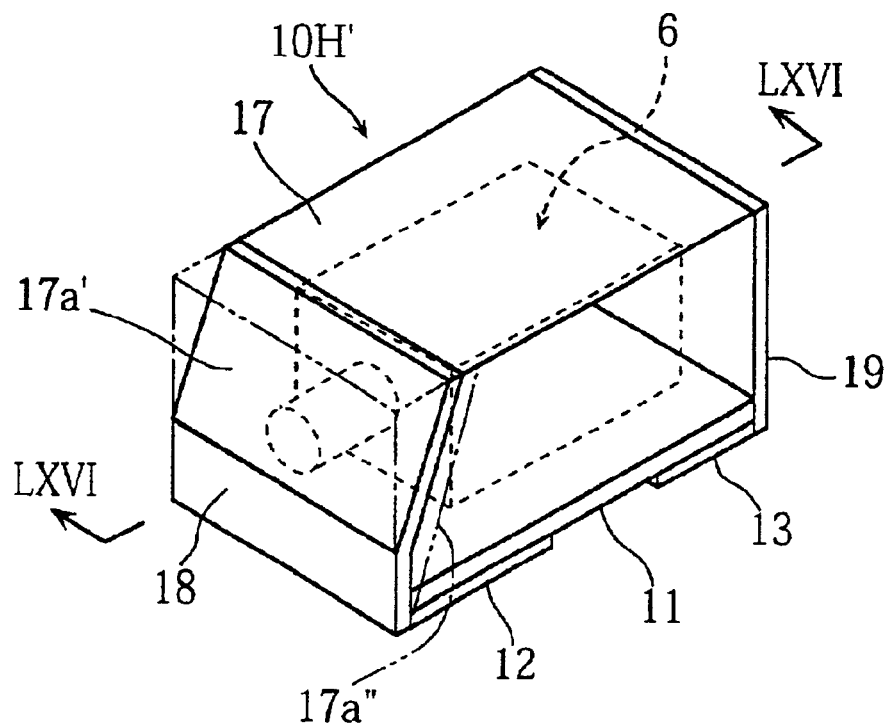
FIG. 65 is a perspective view showing a solid electrolytic capacitor resulting from the cutting manner shown in FIG. 64.
Figure 66:
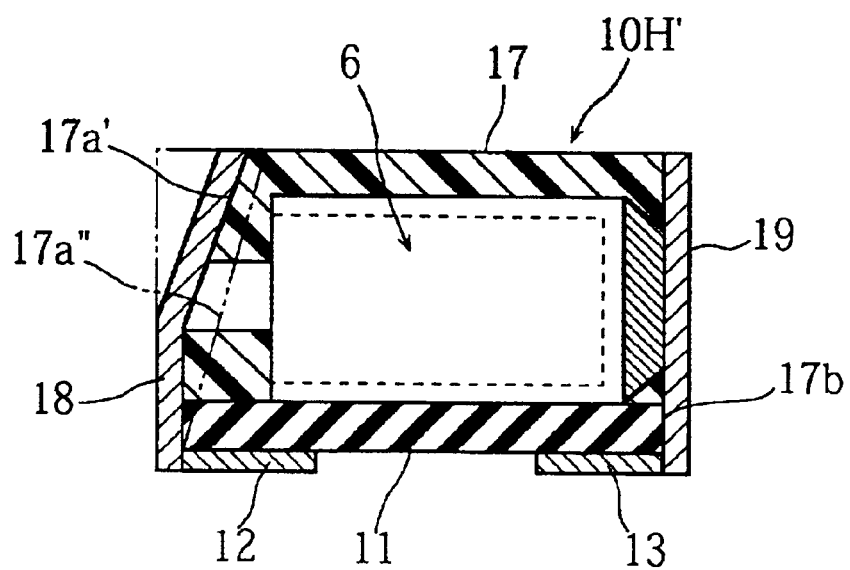
FIG. 66 is a sectional view taken along lines LXVI—LXVI in FIG. 65.
Figure 67:
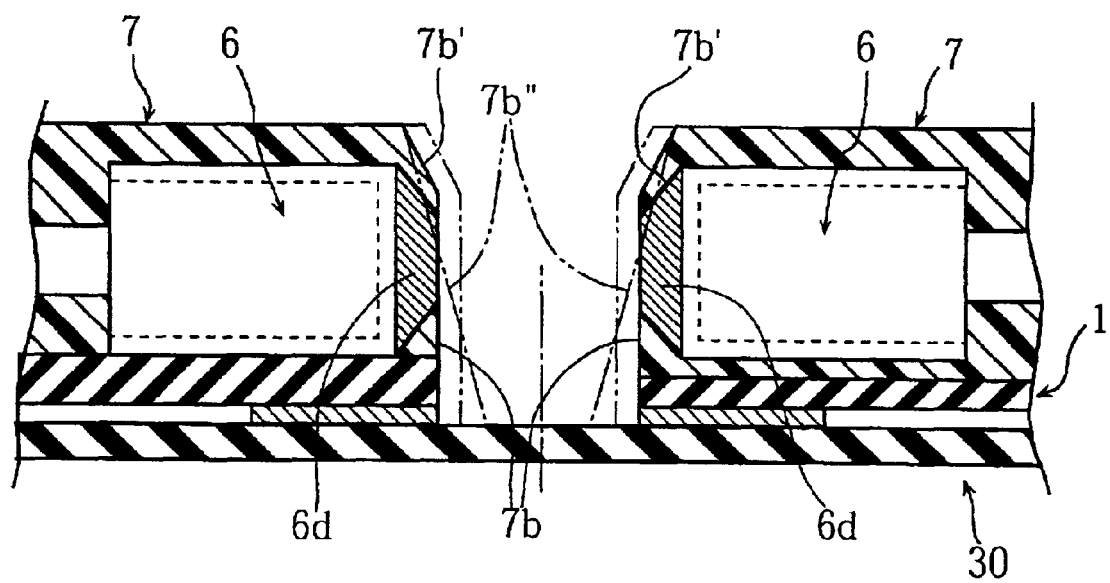
FIG. 67 is an enlarged sectional view showing another manner for dividing the resin plate.
Figure 68:
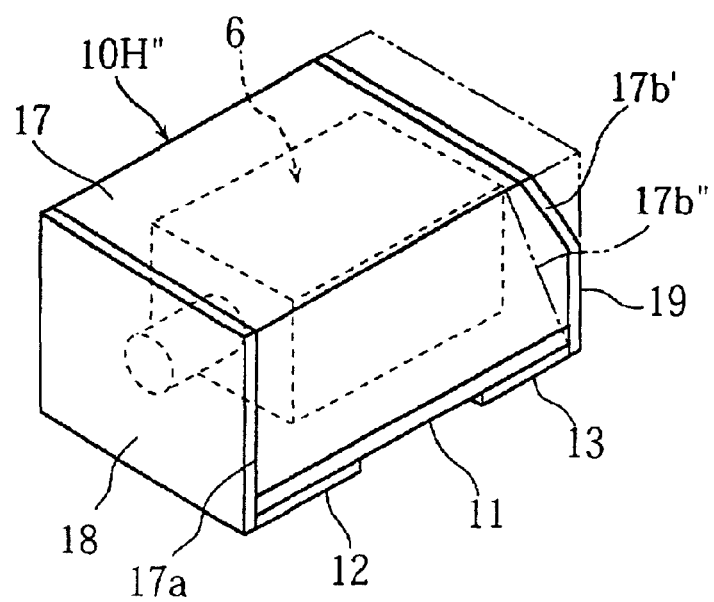
FIG. 68 is a perspective view showing a solid electrolytic capacitor resulting from the cutting manner shown in FIG. 67.

According to the fifth embodiment again, the resin plate 7 may be cut at the cutting lines X in a manner such that partially slanted portions 7a' or entirely slanted portions 7a" are to be formed, as shown in FIG. 64. As a result of such a cutting manner, a solid electrolytic capacitor 10H' shown in FIGS. 65 and 66 is obtained. Alternatively, as shown in FIGS. 67 and 68, partially slanted portions 7b' or entirely slanted portions 7b" may be formed in the second cut surfaces 7b of the resin plate 7.

Reference is now made to FIGS. 69–73 illustrating a fabrication method according to a sixth embodiment of the present invention.

Figure 69:
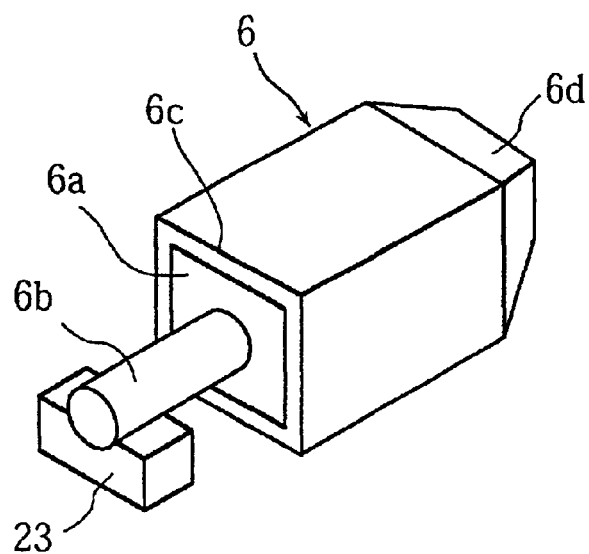
FIG. 69 is a perspective view showing a capacitor element used for implementing a fabrication method according to a sixth embodiment of the present invention.
Figure 70:
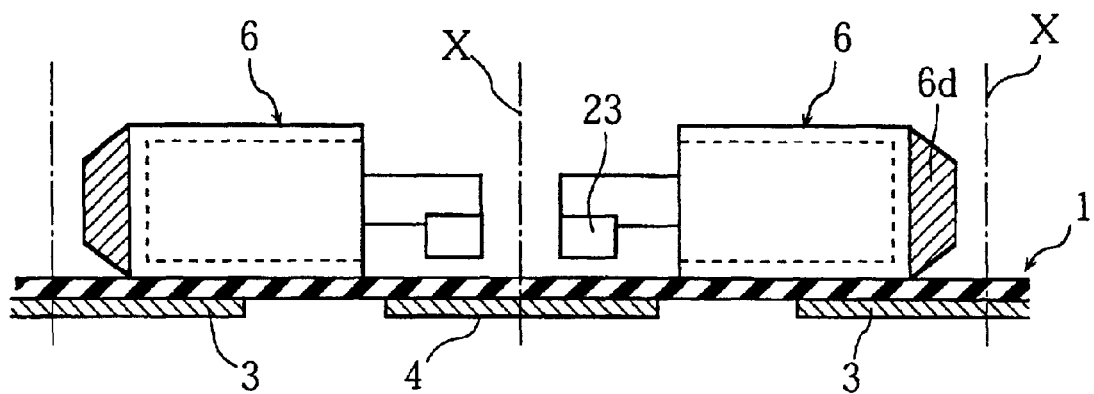
FIG. 70 is a partially sectional view showing a sheet member with capacitor elements of FIG. 69 mounted thereon.
Figure 71:
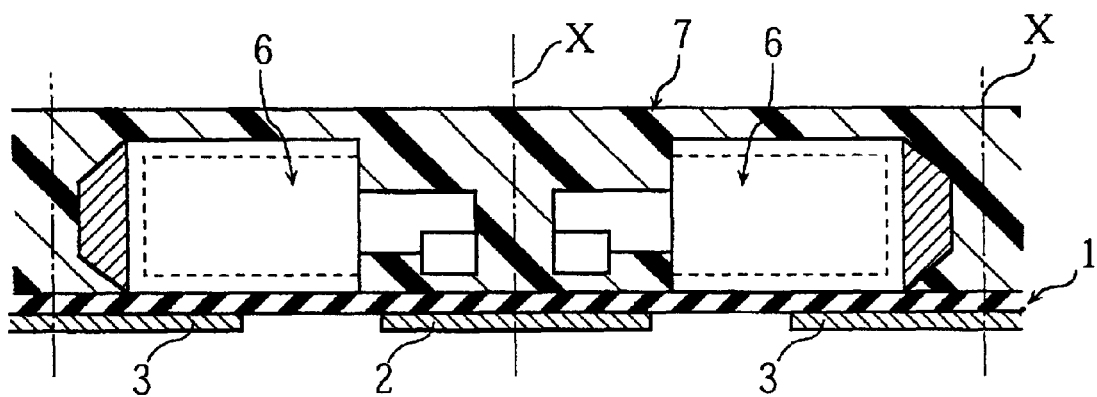
FIG. 71 is a sectional view showing the sheet member of FIG. 70 with a resin plate formed thereon.
Figure 72:
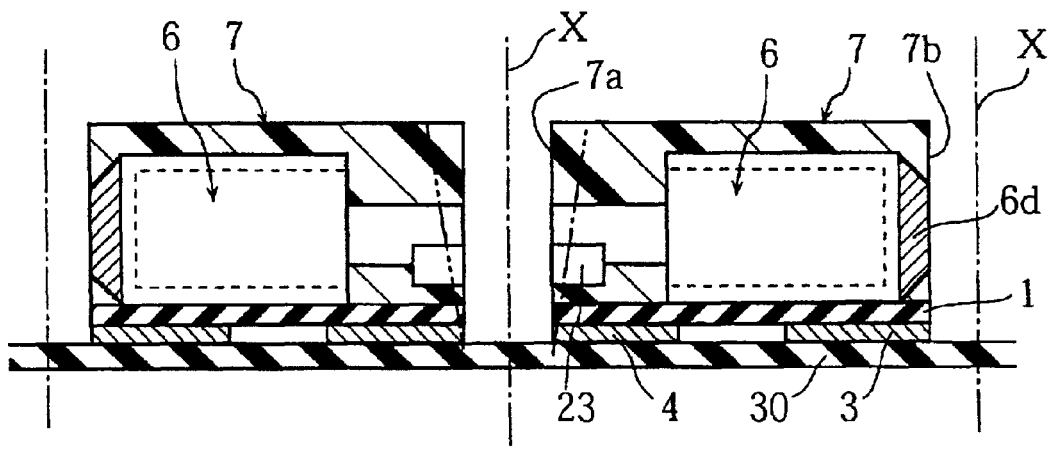
FIG. 72 is a sectional view showing the resin plate of FIG. 71 with several cuts made therein.

FIG. 69 shows a capacitor element 6 used for implementing the fabrication method of the sixth embodiment. The capacitor element 6 of FIG. 69 is the same as the capacitor element of FIG. 35B except that an additional cathode bump 6d is attached to the cathode 6c for electrical connection thereto.

Figure 73:
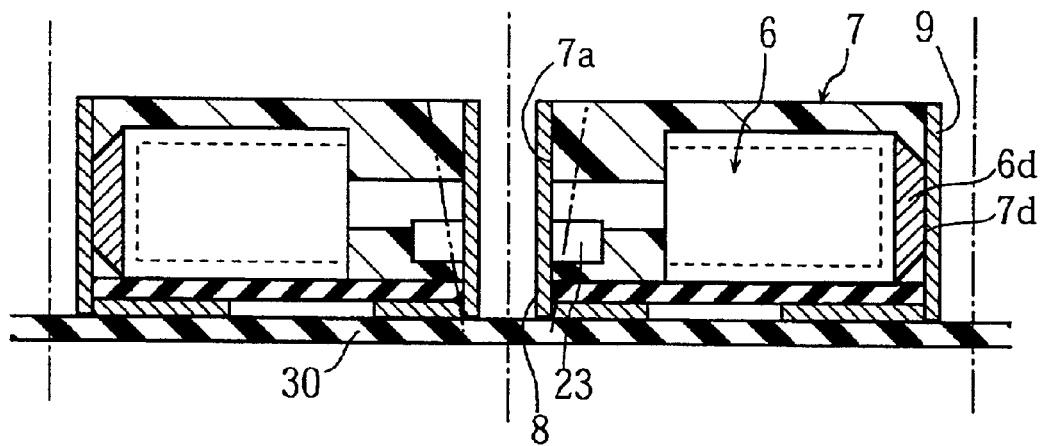
FIG. 73 is a sectional view showing the resin plate of FIG. 72 with terminal electrode layers formed on its exposed cut surfaces.

As seen from FIGS. 70–73, the fabrication method of the sixth embodiment is basically the same as that of the fifth embodiment (see FIGS. 48–55). Briefly, the method of the sixth embodiment includes the steps of: mounting a plurality of capacitor elements 6 (each having a metal piece 23 and a cathode bump 6d) on to a sheet member 1 (FIG. 70); forming a resin plate 7 to enclose the respective capacitor elements 6 (FIG. 71); dividing the resin plate 1 along the cutting lines X (FIG. 72); and forming anode terminal layers 7a and cathode terminal layers 7b (FIG. 73). Though not shown, the method of the sixth embodiment also includes the step of cutting the resin plate 7 along cutting lines perpendicular to the cutting lines X to provide product capacitors.

Figure 74:
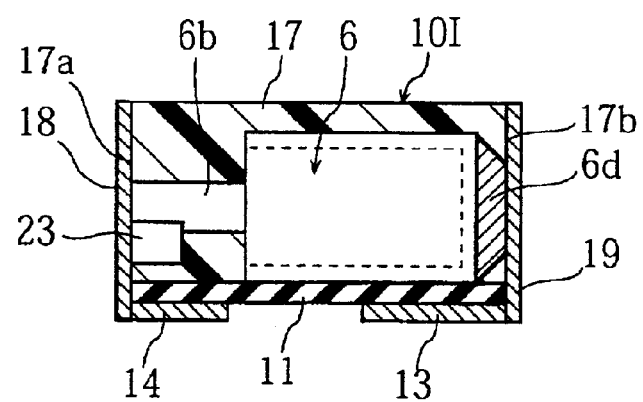
FIG. 74 is a sectional view showing a solid electrolytic capacitor obtained by the fabrication method of the sixth embodiment.

FIG. 74 shows a solid electrolytic capacitor 10I obtained by the fabrication method of the sixth embodiment. As readily seen, the illustrated capacitor 10I is similar to the capacitor 10H shown in FIG. 59. The difference is that the capacitor 10I of FIG. 74 is provided with a metal piece 23 welded to the anode 6b. As illustrated, the first and second cut surfaces 17a, 17b of the resin package 17 are upright.

Figure 75:
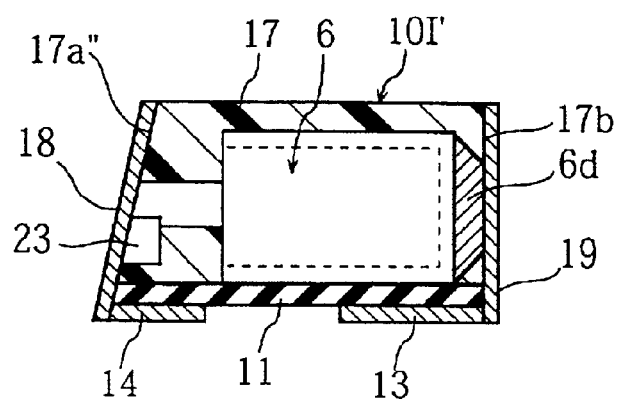
FIG. 75 is a sectional view showing a different type of solid electrolytic capacitor obtained by the fabrication method of the sixth embodiment.
Figure 76:
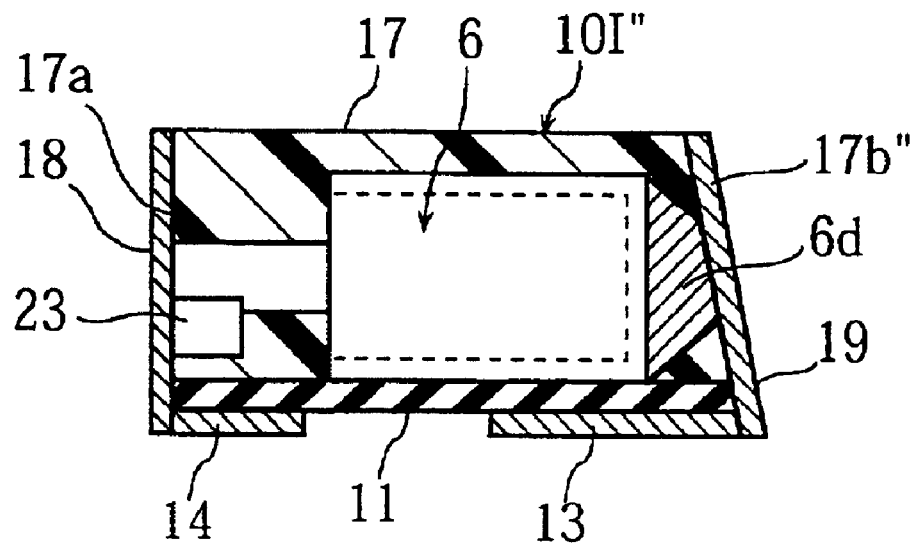
FIG. 76 is a sectional view showing another type of solid electrolytic capacitor obtained by the fabrication method of the sixth embodiment.

FIG. 75 shows a modified version of the capacitor 10I of FIG. 74. Differing from the capacitor 10I of FIG. 74, the modified capacitor 10I' has an entirely slanted first cut surface 17a". The slanted cut surface may be provided at the opposite end, as shown in FIG. 76. The capacitor 10I" of FIG. 76 has an upright first cut surface 17a and an entirely slanted second cut surface 17b" opposite to the first cut surface 17a.

Figure 77:
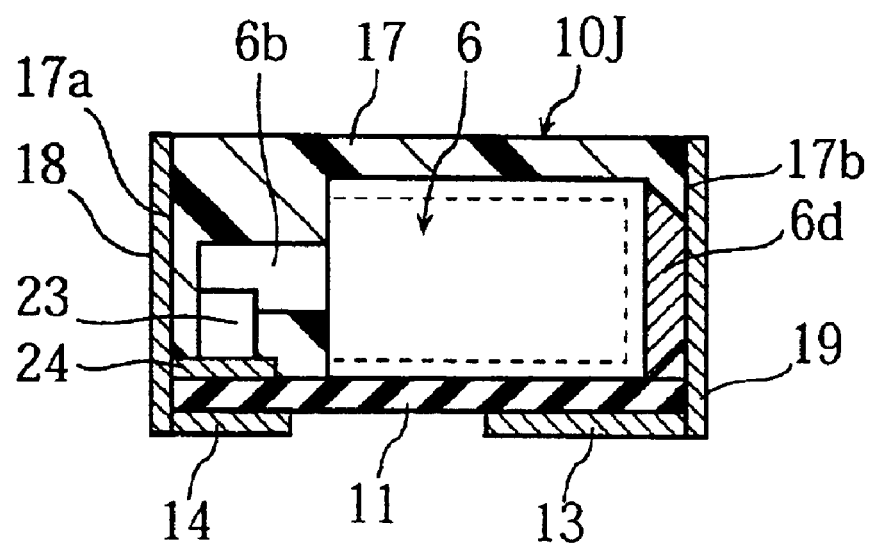
FIG. 77 is a sectional view showing a modified version of the capacitor shown in FIG. 74.

FIG. 77 is another modified version of the capacitor 10J shown in FIG. 74. In the modified capacitor 10J, neither the anode 6b nor the metal piece 23 is exposed at the first cut surface 17a to be directly connected to the anode terminal layer 18. Instead, the metal piece 23 is electrically connected to an anode connection layer 24 formed on the base sheet 11. Though not shown, the electrical connection between the metal piece 23 and the anode connection layer 24 may be established via a conductive paste. The anode connection layer 24 is exposed at the first cut surface 17a to be electrically connected to the anode terminal layer 18. In this manner, the anode 6b is indirectly connected to the anode terminal layer 18.

Reference is now made to FIGS. 78–91 illustrating a fabrication method according to a seventh embodiment of the present invention. The fabrication method of this embodiment includes the following steps.

Figure 78:
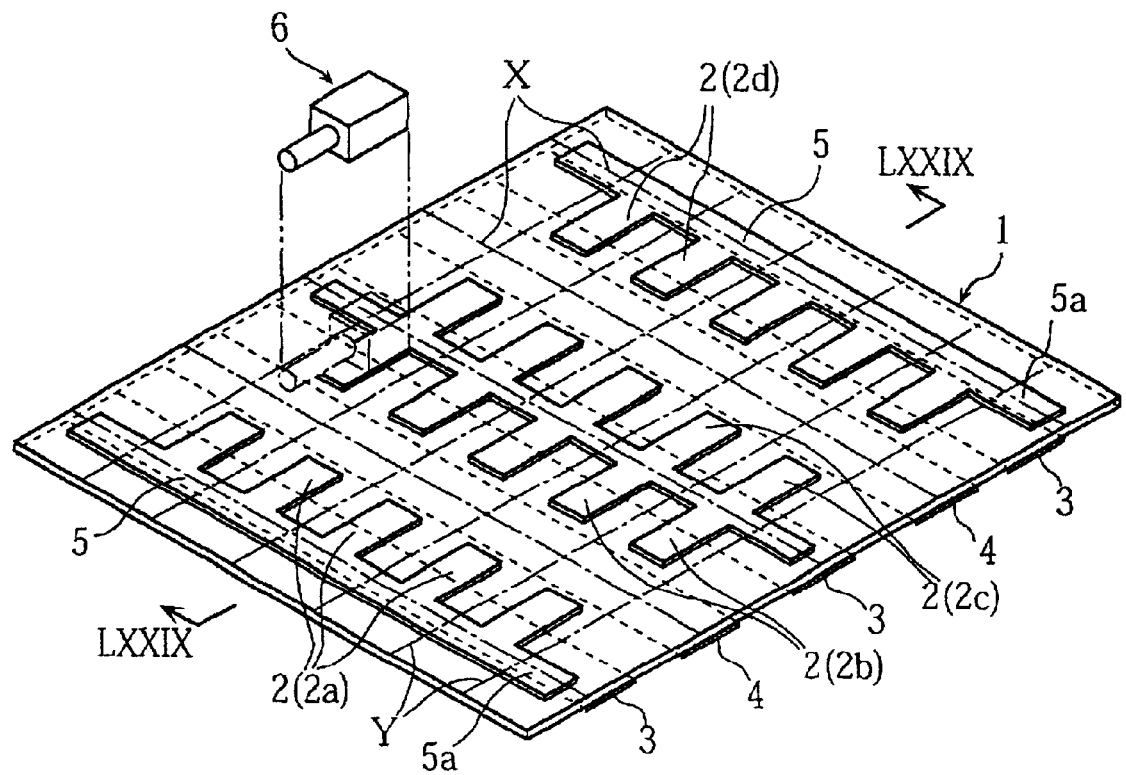
FIG. 78 is a perspective view showing a sheet member used for implementing a fabrication method according to a seventh embodiment of the present invention.
Figure 79:
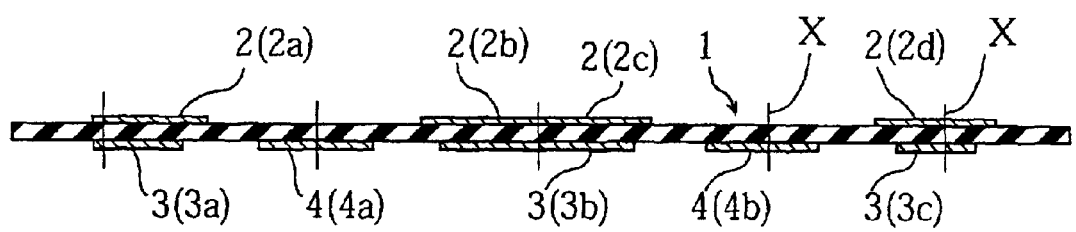
FIG. 79 is an enlarged sectional view taken along lines LXXIX—LXXIX in FIG. 78.

First, a sheet member 1 as shown in FIGS. 78 and 79 is prepared. The sheet member 1 used for the seventh embodiment is the same as the sheet member used for the first embodiment (see FIGS. 1 and 2). Specifically, the sheet member 1 shown in FIGS. 78 and 79 is made of a soft or rigid synthetic resin material and has a predetermined thickness. The obverse surface of the sheet member 1 is formed with a plurality of cathode connection layers 2 arranged in four rows. In each row, the cathode connection layers 2 are connected to an elongated, common connection layer 5. Each common connection layer 5 is provided with an end portion 5a, as shown in FIG. 78.

The reverse surface of the sheet member 1 is formed with three cathode electrode layers 3 extending longitudinally of the common connection layers 5. As shown in FIG. 79, the first (left) cathode electrode layer 3a is disposed below the first-row cathode connection layers 2a. Similarly, the second (middle) cathode electrode layer 3b is disposed below the second- and the third-row cathode connection layers 2b and 2c, while the third (right) cathode electrode layer 3c is disposed below the fourth-row cathode connection layer 2d. The reverse surface of the sheet member 1 is also formed with two anode electrode layers 4 extending in parallel to each cathode electrode layer 3. The first (left) anode electrode layer 4a is arranged between the first and the second cathode electrode layers 3a, 3b. The second (right) anode electrode layer 4b is arranged between the second and the third cathode electrode layers 3b, 3c.

Figure 80:
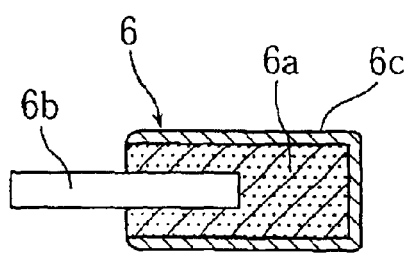
FIG. 80 is a sectional view showing a capacitor element used for implementing the fabrication method of the seventh embodiment.

FIG. 80 shows, in section, a capacitor element 6 used for implementing the fabrication method of the seventh embodiment. The illustrated capacitor element is the same as the capacitor element shown in FIG. 3.

Figure 81:
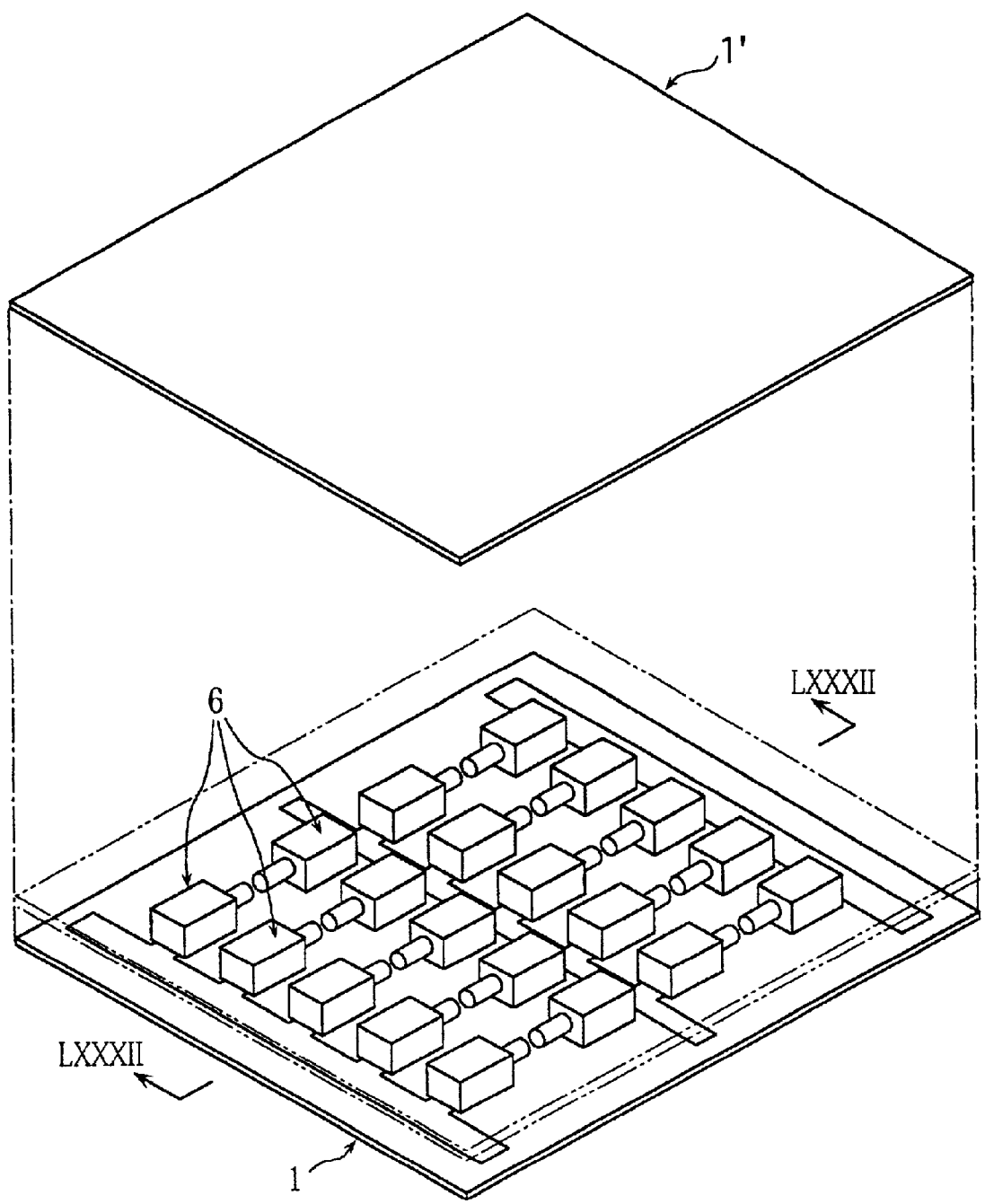
FIG. 81 is a perspective view showing the sheet member of FIG. 78 with a plurality of capacitor elements mounted thereon.
Figure 82:
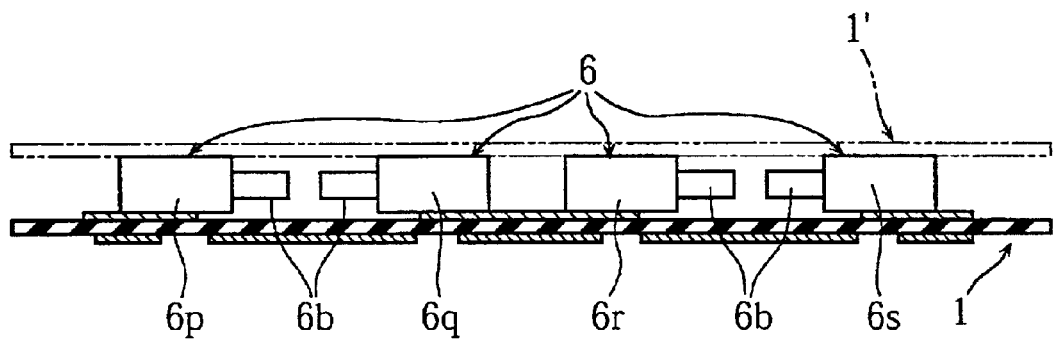
FIG. 82 is an enlarged sectional view taken along lines LXXXII—LXXXII in FIG. 81.

As shown in FIGS. 81 and 82, a predetermined number of capacitor elements 6 are mounted onto the cathode connection layers 2 (one capacitor element for a corresponding one of the cathode connection layers 2). Though not illustrated, the capacitor elements 6 are connected to the respective cathode connection layers 2 via conductive paste. As shown in FIG. 82, the anodes 6b of the first-row capacitor elements 6p are held in facing relation to the anodes 6b of the second-row capacitor elements 6q. Likewise, the anodes 6b of the third-row capacitor elements 6r are held in facing relation to the anodes 6b of the fourth-row capacitor elements 6s.

Then, as shown in FIGS. 81 and 82, an additional sheet member 1' (called "upper sheet member" hereinafter) is placed on the capacitor elements 6. The upper sheet member 1' may be made of a soft or rigid synthetic resin material and has a predetermined thickness.

Figure 83:
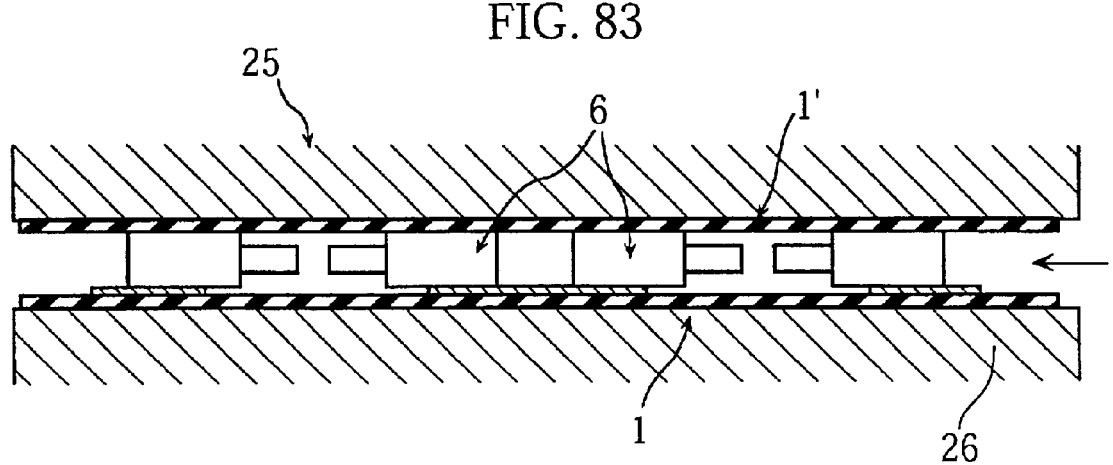
FIG. 83 is a sectional view illustrating how a resin material is supplied between two sheet members.

Then, as shown in FIG. 83, the lower sheet member 1, capacitor elements 6 and the upper sheet member 1' are held together between an upper molding member 25 and a lower molding member 26. Thereafter, a synthetic resin material in a liquid state is supplied into the space between the upper and the lower sheet members 1' and 1, as indicated by an arrow in FIG. 83. After the resin material has filled the space, it is hardened to form a resin plate 7 (see FIGS. 84 and 85).

At this stage, though not illustrated, the end portions 5a (FIG. 78) of the respective common connection layers 5 are exposed at a side surface of the resin plate 7.

Figure 84:
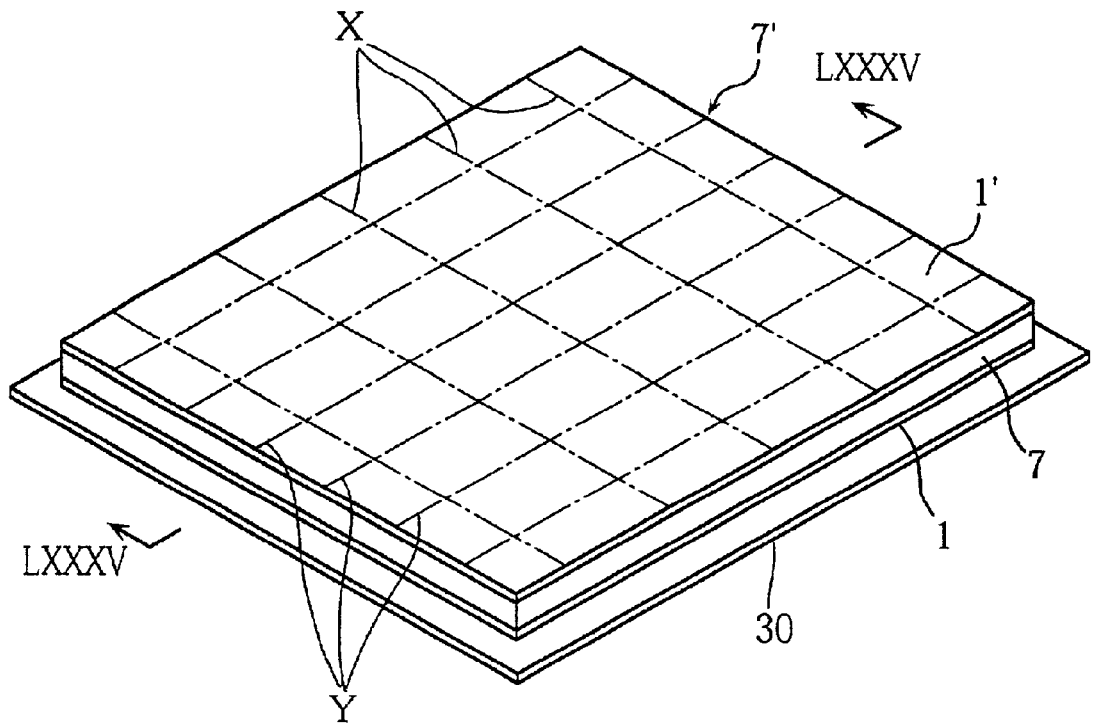
FIG. 84 is a perspective view showing an expansion sheet attached to the lower sheet member.
Figure 85:
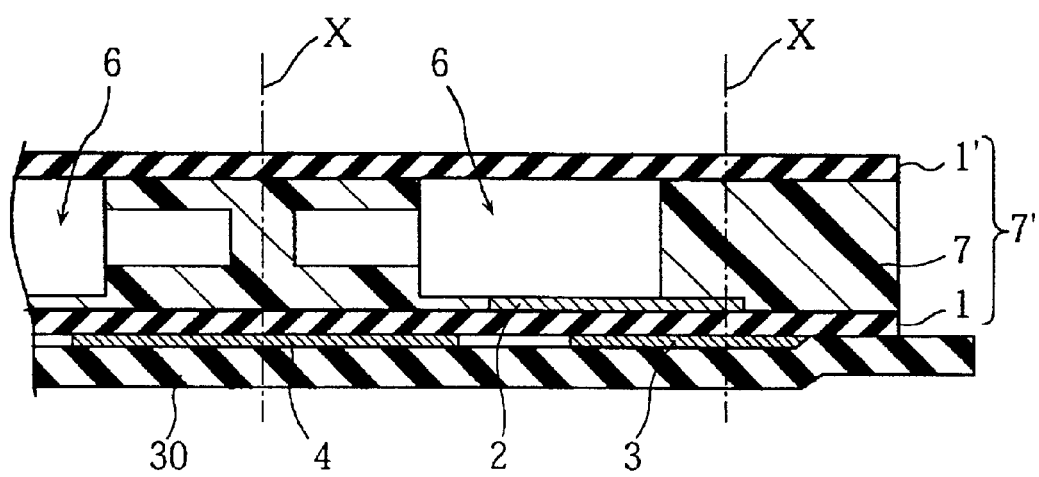
FIG. 85 is an enlarged sectional view taken along lines LXXXVI—LXXXVI in FIG. 84.

The solidified resin plate 7 and the two sheet members 1, 1' attached to the resin plate 7 constitute a plate assembly 7', as shown in FIGS. 84 and 85. The lower sheet member 1 of the plate assembly 7' is attached to an expansion sheet 30.

Figure 86:
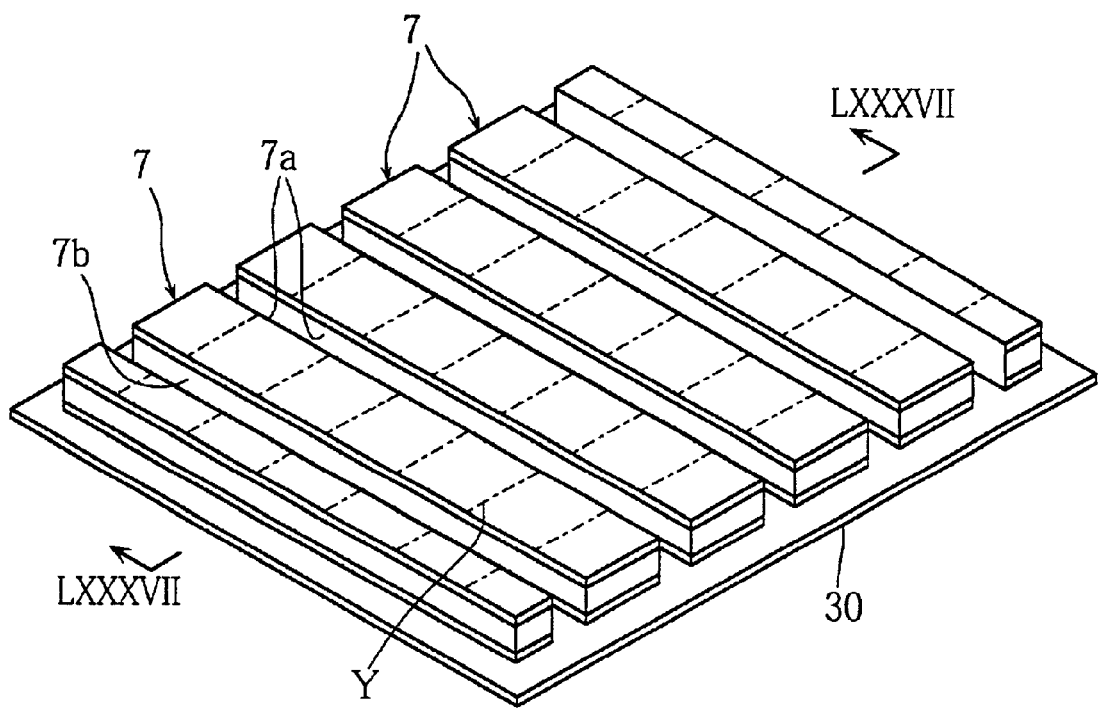
FIG. 86 is a perspective view showing the plate assembly of FIG. 84 with several cuts made therein.
Figure 87:
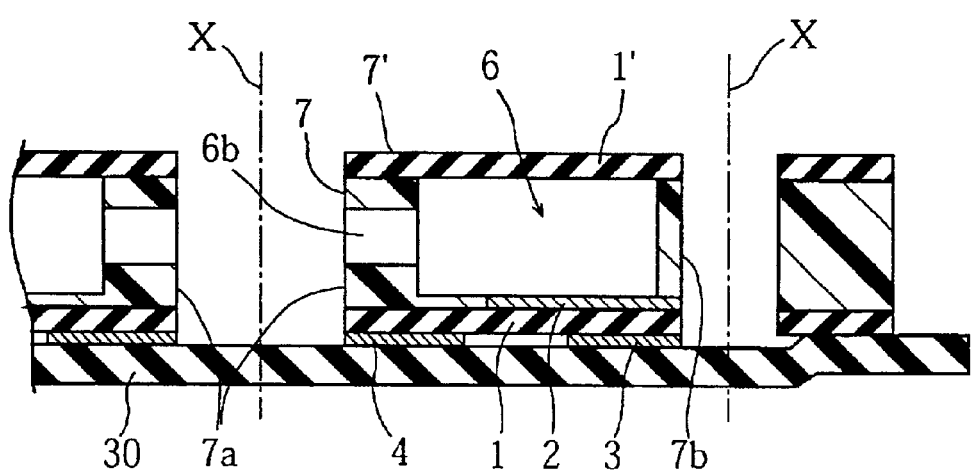
FIG. 87 is an enlarged sectional view taken along lines LXXXVII—LXXXVII in FIG. 86.

Then, as shown in FIGS. 86 and 87, the plate assembly 7' is cut by e.g. a dicing cutter along the predetermined cutting lines X (see also FIG. 84). Thus, first cut surfaces 7a and second cut surfaces 7b are produced in the plate assembly 7'. As shown in FIG. 87, the anodes 6b and the anode electrode layers 4 are exposed at the first cut surfaces 7a, while the cathode connection layers 2 and the cathode electrode layers 3 are exposed at the second cut surfaces 7b.

Figure 88:
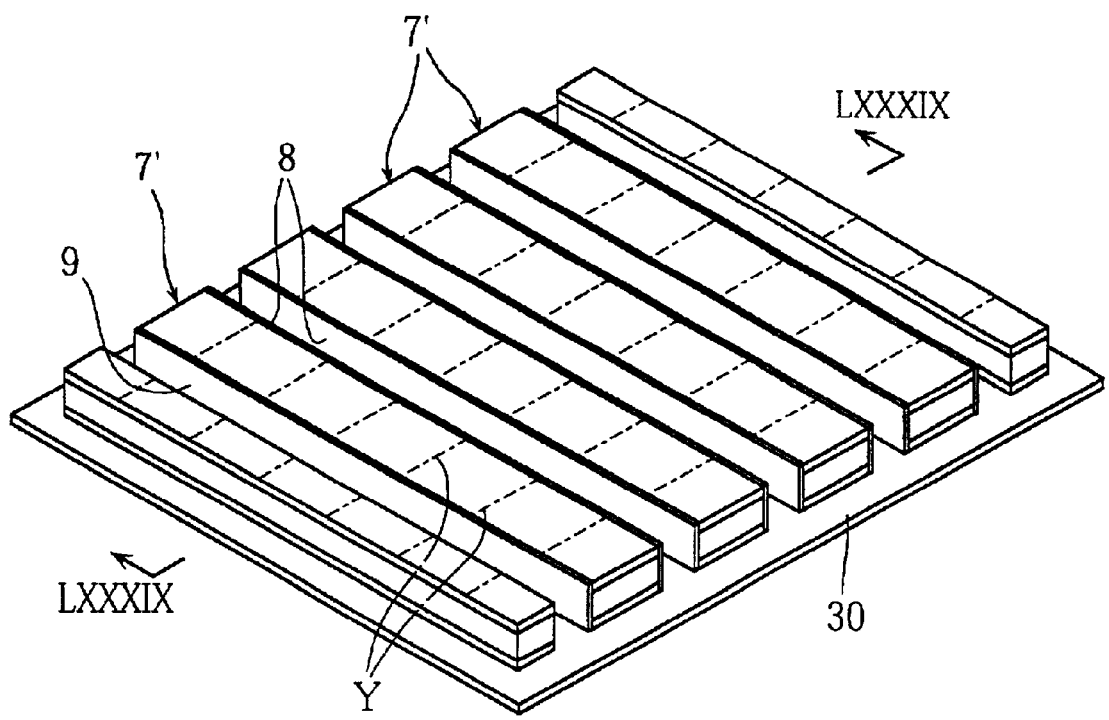
FIG. 88 is a perspective view showing the divided plate assembly of FIG. 86 with terminal electrode layers formed on its exposed cut surfaces.
Figure 89:
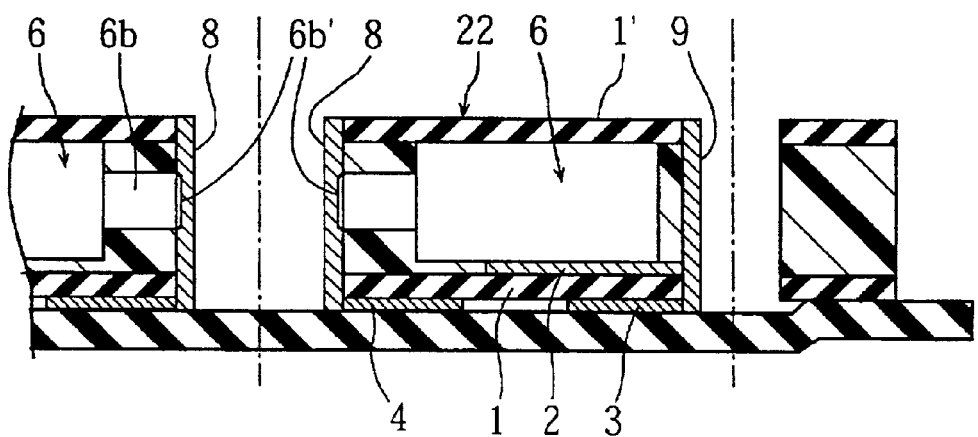
FIG. 89 is an enlarged sectional view taken along lines LXXXIX—LXXXIX in FIG. 88.
Figure 90:
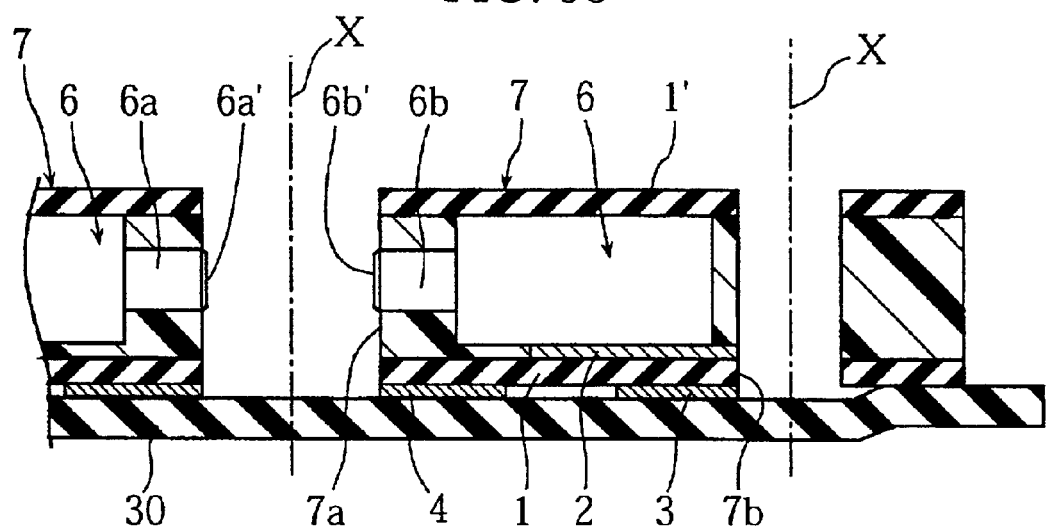
FIG. 90 is an enlarged sectional view showing capacitor elements with their exposed anode tips covered by anode bumps.

Then, as shown in FIGS. 88 and 89, anode terminal layers 8 are formed on the first cut surfaces 7a, while cathode terminal layers 9 are formed on the second cut surfaces 7b. These terminal layers 8, 9 can be made in the same manner as described in connection with the first embodiment. The anode terminal layers 8 are connected to the anodes 6b via anode bumps 6b' and also to the anode electrode layers 4. The cathode terminal layers 9 are connected to the cathode connection layers 2 and the cathode electrode layers 3. The anode bumps 6b', which are resistant to oxidation, may be made prior to the formation of the terminal layers 8 and 9, as shown in FIG. 90.

Figure 91:
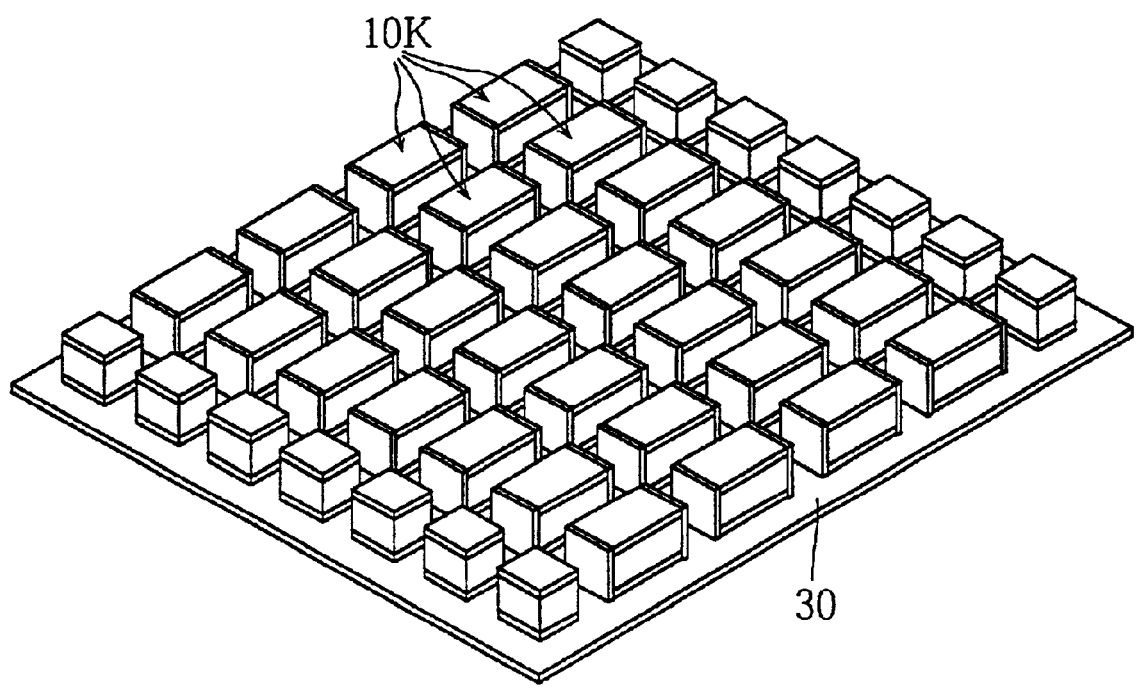
FIG. 91 is a perspective view showing the plate assembly of FIG. 88 divided into a plurality of chips.

After the terminal layers 8 and 9 are formed, the plate assembly 7' is cut along the predetermined cutting lines Y (see FIG. 88). Thus, as shown in FIG. 91, the plate assembly 7' is divided into a plurality of chips (capacitors) 10K. Finally, these chips 10K are removed from the expansion sheet 30. In this manner, a desired number of solid electrolytic capacitors 10K are obtained collectively.

Figure 92:
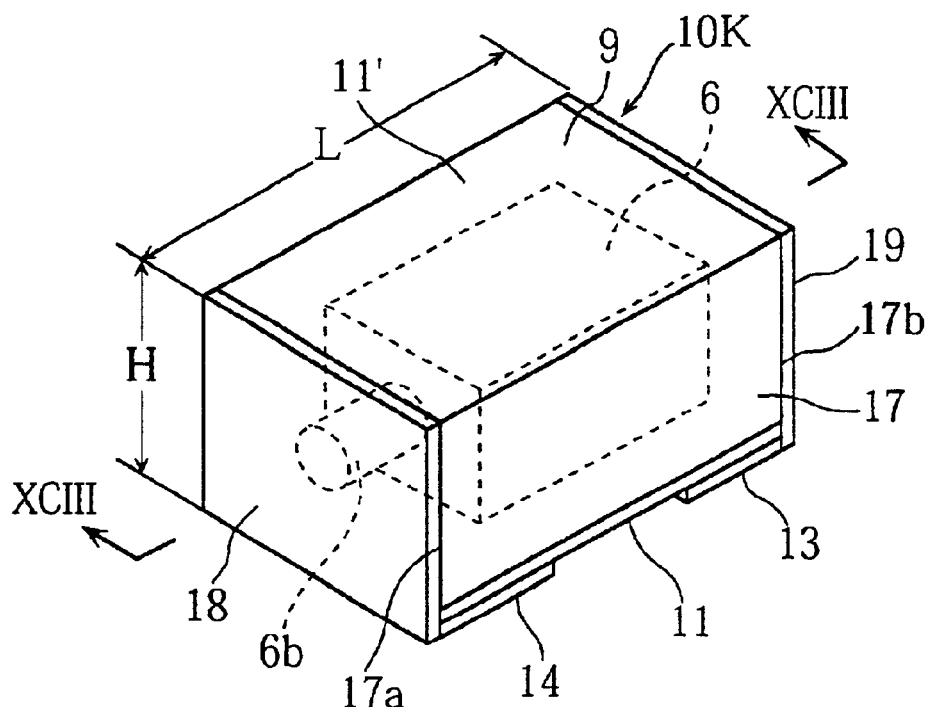
FIG. 92 is a perspective view showing a solid electrolytic capacitor obtained by the fabrication method of the seventh embodiment.
Figure 93:
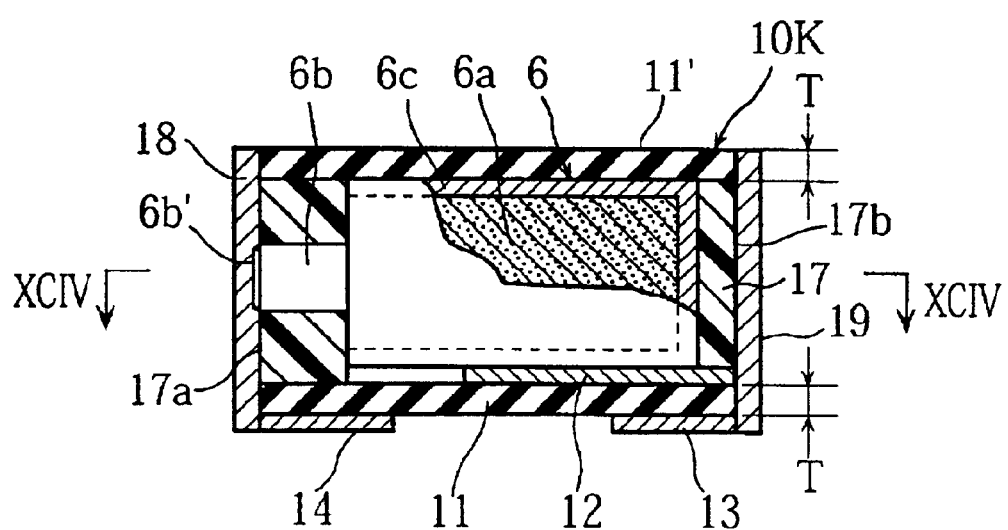
FIG. 93 is a sectional view taken along lines XCIII—XCIII in FIG. 92.
Figure 94:
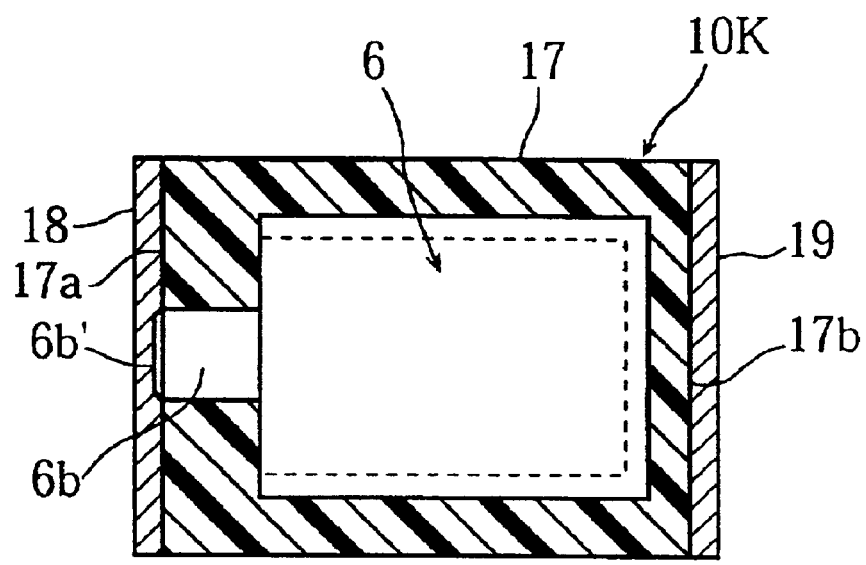
FIG. 94 is a sectional view taken along lines XCIV—XCIV in FIG. 93.

FIGS. 92–94 show the structure of a solid electrolytic capacitor 10K obtained by the fabrication method of the seventh embodiment. As best shown in FIG. 93, the capacitor 10K includes a capacitor element 6, upper and lower resin sheets 11, 11', and a resin package 17 enclosing the capacitor element 6.

The capacitor element 6 is shielded vertically by the lower and the upper resin sheets 11, 11'. The obverse surface of the lower resin sheet 11 is provided with a cathode connection layer 12, while its lower surface is provided with a cathode electrode layer 13 and an anode electrode layer 14. The cathode connection layer 12 is connected to the cathode 6c of the capacitor element 6.

The resin package 17 has a pair of opposing side surfaces 17a and 17b (hereinafter called "first side surface 17a" and "second side surface 17b", respectively). An anode terminal layer 18 is formed on the first side surface 17a. A cathode terminal layer 19 is formed on the second side surface 17b. The anode terminal layer 18 is connected to the anode 6b via an anode bump 6b' and to the anode electrode layer 14. The cathode terminal layer 19 is connected to the cathode connection layer 12 and the cathode electrode layer 13.

In the illustrated capacitor 10K again, the overall height H (FIG. 92) is advantageously reduced since the capacitor element 6 is vertically shielded by the two resin sheets 11, 11' each of which has a small thickness T. The overall length L and weight can also be reduced since the conventional connection leads are not necessary.

Figure 95:
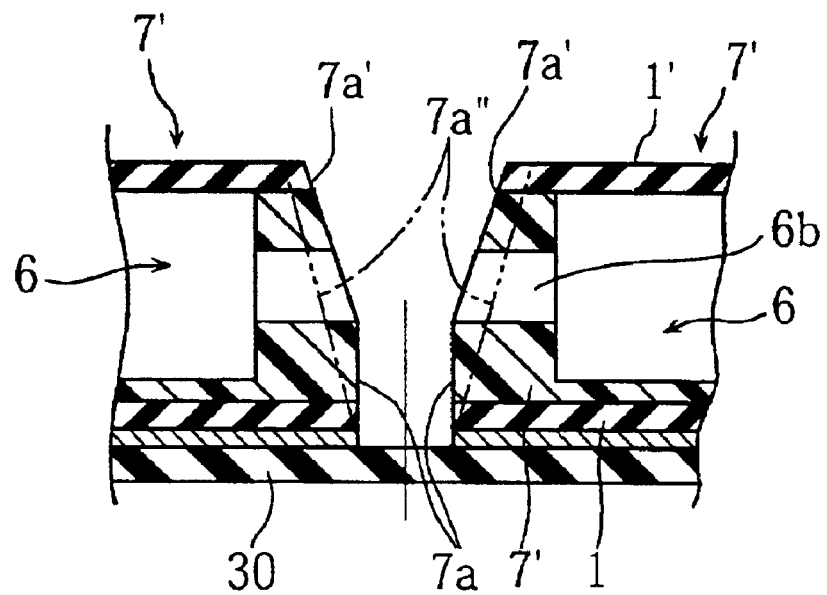
FIG. 95 is an enlarged sectional view showing a different manner for cutting the plate assembly according to the seventh embodiment.
Figure 96:
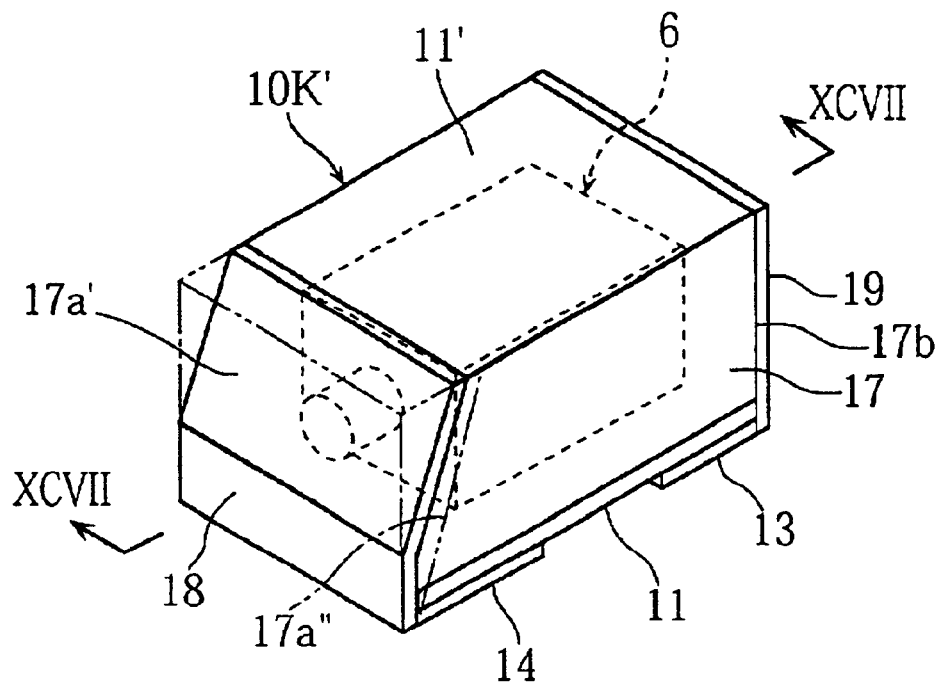
FIG. 96 is a perspective view showing a solid electrolytic capacitor resulting from the cutting manner shown in FIG. 95.
Figure 97:
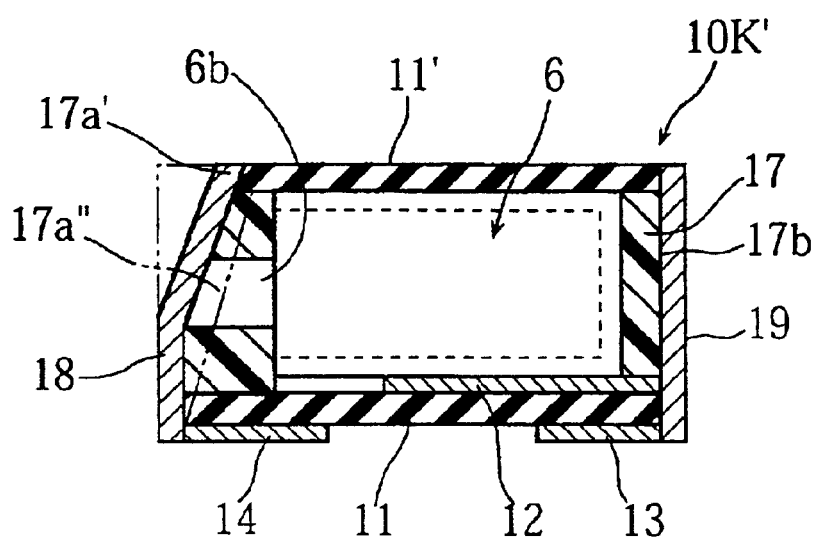
FIG. 97 is a sectional view taken along lines XCVII—XCVII in FIG. 96.
Figure 98:
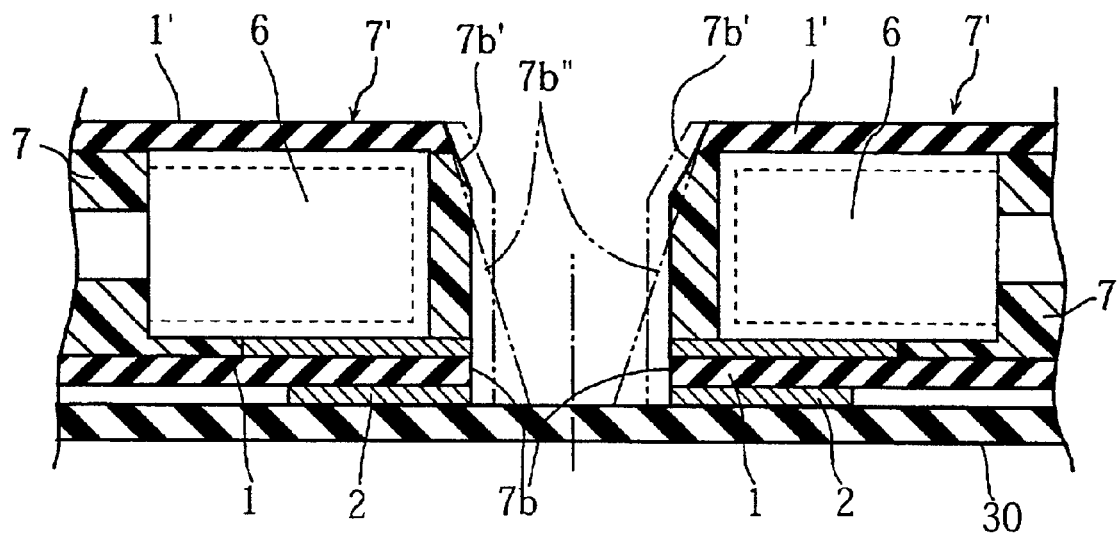
FIG. 98 is an enlarged sectional view showing another manner for cutting the plate assembly according to the seventh embodiment.
Figure 99:
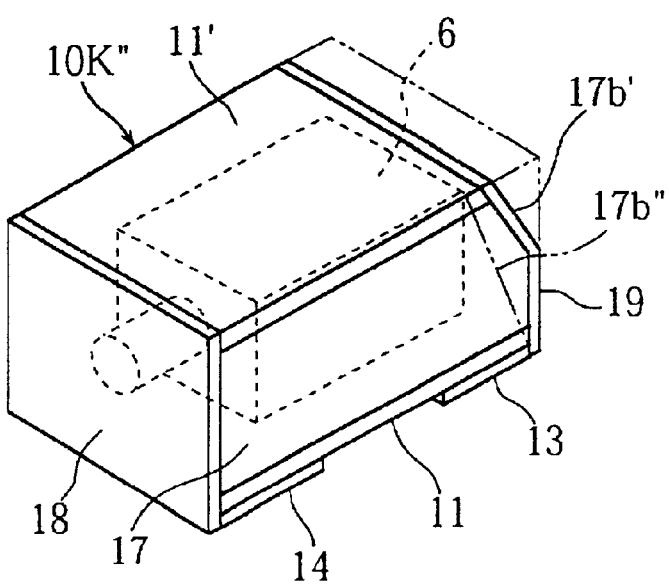
FIG. 99 is a perspective view showing a solid electrolytic capacitor resulting from the cutting manner shown in FIG. 98.

It is clear that the illustrated capacitor element 6, which has a body 6a in the form of a rectangular parallelepiped and a bar-like projecting anode, may be replaced with any one of the capacitor elements shown in FIGS. 17–19. Also, in the seventh embodiment again, the plate assembly 7' may be cut so as to have partially slanted portions 7a' or entirely slanted portions 7a" on the side of the first cut surfaces 7a, as shown in FIG. 95. FIGS. 96 and 97 show a solid electrolytic capacitor 10K' resulting from the slanting cut shown in FIG. 95. Alternatively, as shown in FIG. 98, the plate assembly 7' may be cut so as to have partially slanted portions 7b' or entirely slanted portions 7b" on the side of the second cut surfaces 7b. FIG. 99 shows a solid electrolytic capacitor 10K" resulting from the slanting cut shown in FIG. 98.

Figure 100:
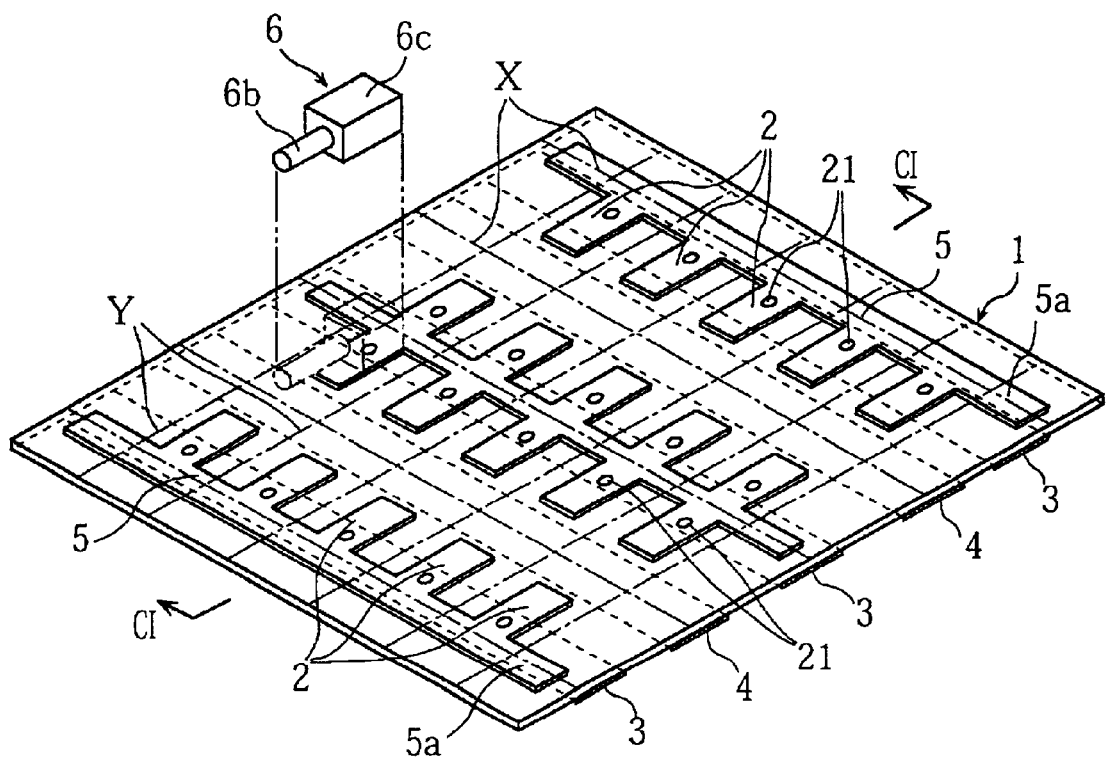
FIG. 100 is a perspective view showing a sheet member used for implementing a fabrication method according to an eighth embodiment of the present invention.
Figure 101:
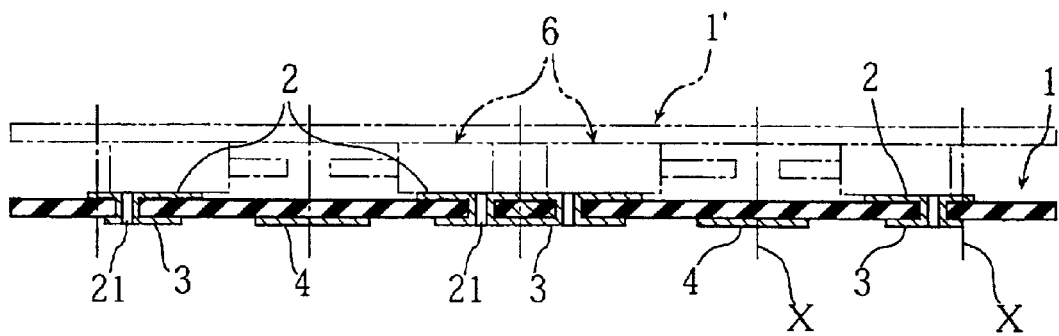
FIG. 101 is an enlarged sectional view taken along lines CI—CI in FIG. 100.

Reference is now made to FIGS. 100 and 101 illustrating a fabrication method according to an eighth embodiment of the present invention. The fabrication method of this embodiment is substantially the same as that of the seventh embodiment described above except that the lower sheet member 1 to be used is different from the lower sheet member used for the seventh embodiment. Specifically, while the lower sheet member of the seventh embodiment is formed with no through-holes (see FIG. 78), the lower sheet member 1 of the eighth embodiment is formed with a plurality of through-holes 21 (one through-hole for a corresponding one of the cathode connection layers 2), as shown in FIG. 100. As readily seen from FIGS. 100 and 101, the illustrated lower sheet member 1 is the same as the sheet member 1 used for the second embodiment (see FIGS. 25 and 26).

Figure 102:
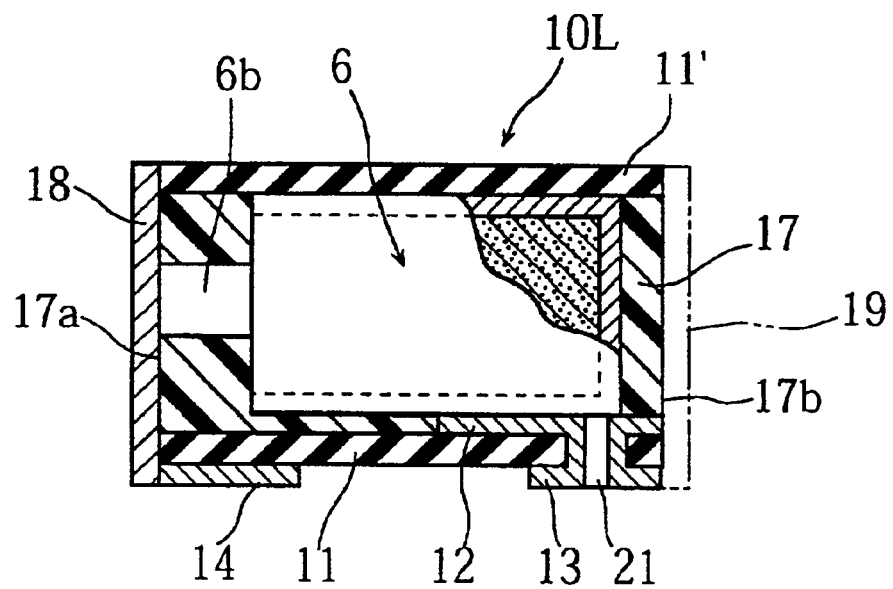
FIG. 102 is a sectional view showing a solid electrolytic capacitor obtained by the fabrication method of the eighth embodiment.
Figure 103:
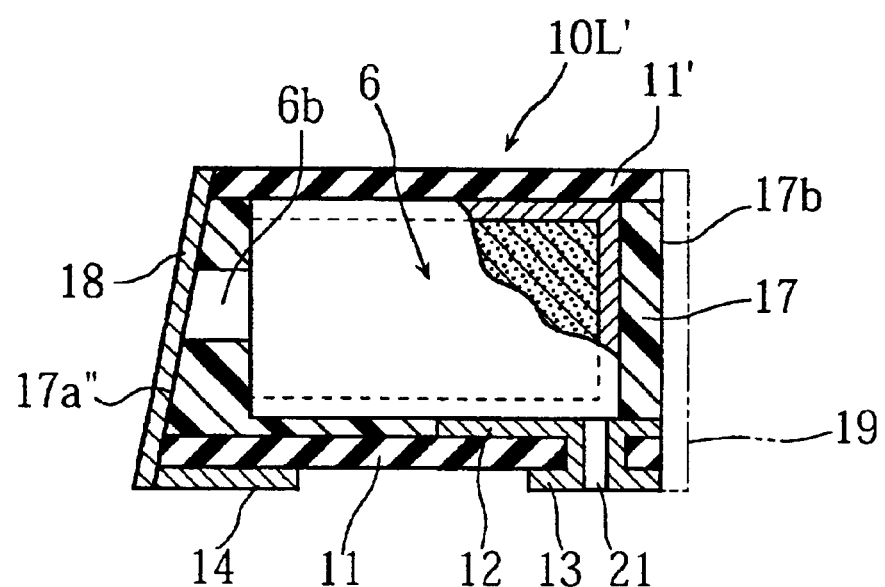
FIG. 103 is a sectional view showing a different type of solid electrolytic capacitor according to the eighth embodiment.
Figure 104:
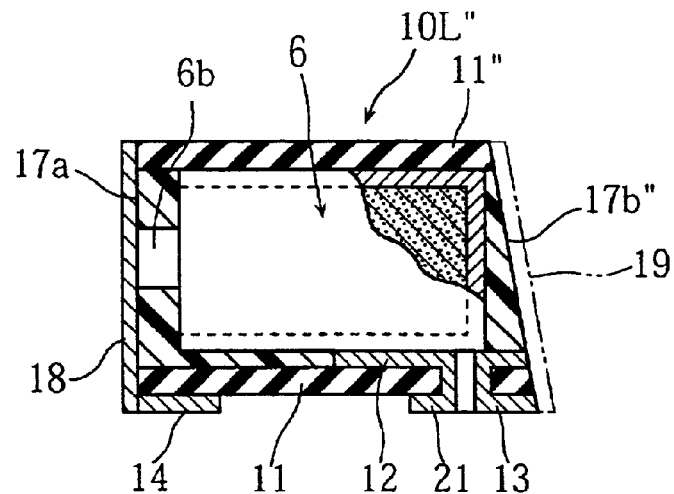
FIG. 104 is a sectional view showing another type of solid electrolytic capacitor according to the eighth embodiment.

FIG. 102 shows, in section, a solid electrolytic capacitor 10L obtained by the fabrication method of the eighth embodiment. The illustrated capacitor 10L is identical to the capacitor 10B (FIG. 27) of the second embodiment except that an upper resin sheet 11' is provided immediately above the capacitor element 6. FIG. 103 shows a modified version of the capacitor 10L shown in FIG. 102. The modified capacitor 10L' has an entirely slanted first cut surface 17a" and an upright second cut surface 17b. On the other hand, as shown in FIG. 104, another modified capacitor 10L" may have an upright first cut surface 17a and an entirely slanted second cut surface 17b".

Figure 105:
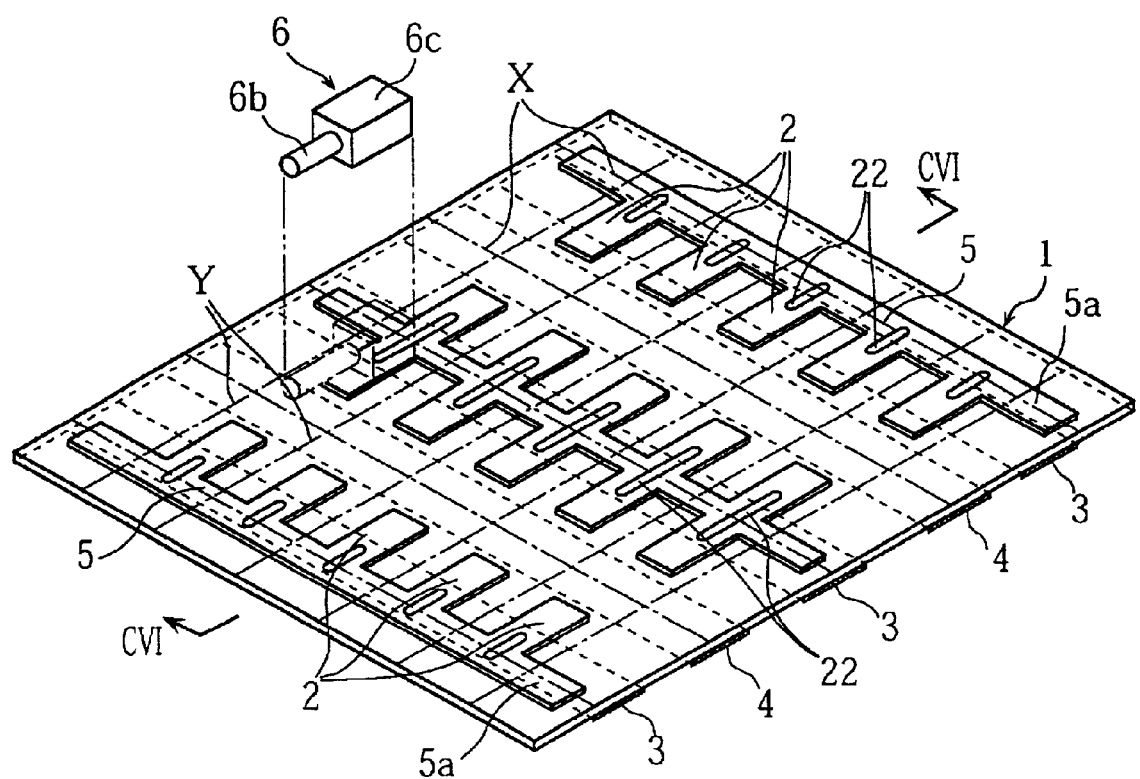
FIG. 105 is a perspective view showing a sheet member used for implementing a fabrication method according to a ninth embodiment of the present invention.
Figure 106:
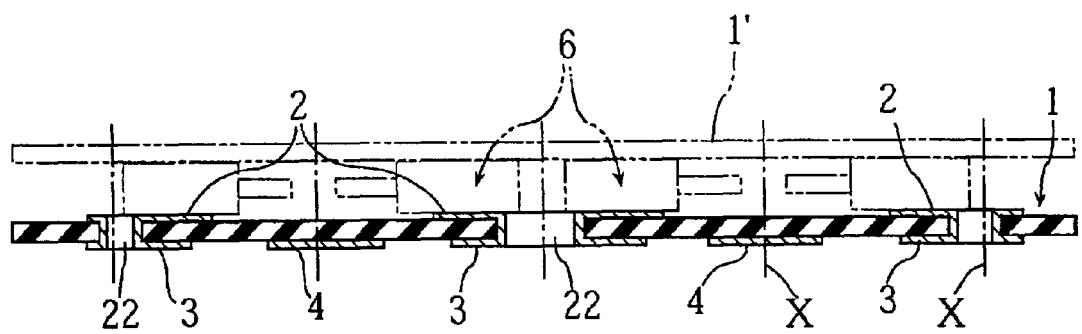
FIG. 106 is an enlarged sectional view taken along lines CVI—CVI in FIG. 105.

Reference is now made to FIGS. 105 and 106 illustrating a fabrication method according to a ninth embodiment of the present invention. The fabrication method of this embodiment is substantially the same as the method of the eighth embodiment. A major difference is that a lower sheet member 1 used for the ninth embodiment is formed with elongated through-holes 22, while the through-holes 21 of the eighth embodiment (FIG. 100) have a generally circular cross section. As readily seen from FIGS. 105 and 106, the lower sheet member 1 used for the ninth embodiment is the same as the sheet member 1 used for the third embodiment (FIG. 30). Another difference is that the method of the ninth embodiment may include a step of attaching an expansion sheet to the reverse surface of the lower sheet member 1. This sheet-attaching step may be performed before a synthetic resin material is supplied into the space between the lower and the upper sheet members 1, 1' to enclose the capacitor elements 6.

Figure 107:
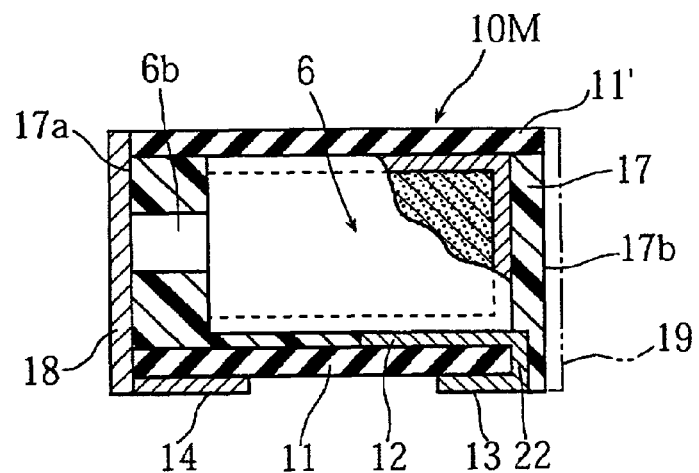
FIG. 107 is a sectional view showing a solid electrolytic capacitor obtained by the ninth embodiment of the present invention.
Figure 108:
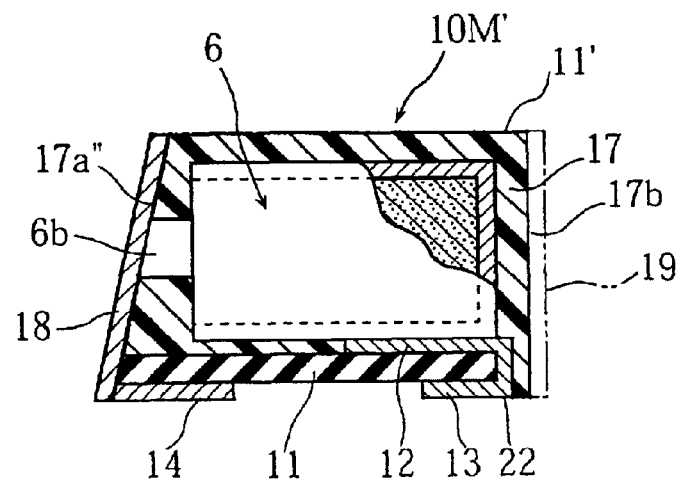
FIG. 108 is a sectional view showing a different type of solid electrolytic capacitor according to the ninth embodiment.
Figure 109:
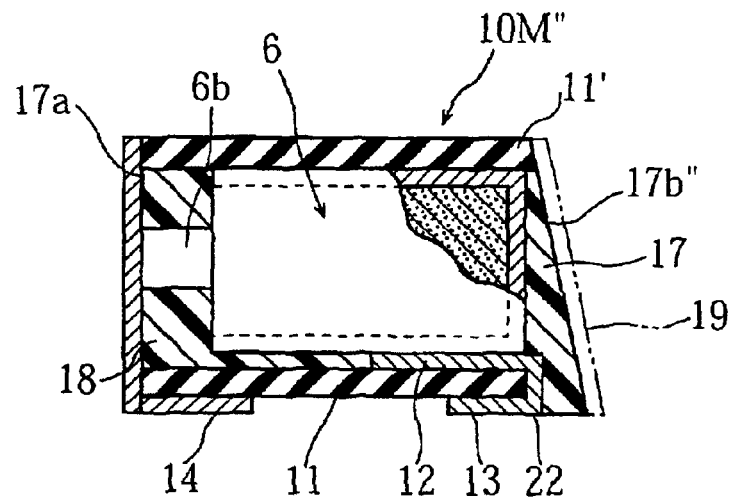
FIG. 109 is a sectional view showing another type of solid electrolytic capacitor according to the ninth embodiment.

FIG. 107 shows, in section, a solid electrolytic capacitor 10M obtained by the fabrication method of the ninth embodiment. The illustrated capacitor 10M is identical to the capacitor 10C (FIG. 32) of the third embodiment except that an upper resin sheet 11' is provided immediately above the capacitor element 6. FIG. 108 shows a modified version of the capacitor 10M shown in FIG. 107. The modified capacitor 10M' has an entirely slanted first cut surface 17a" and an upright second cut surface 17b. On the other hand, as shown in FIG. 109, another modified capacitor 10M" may have an upright first cut surface 17a and an entirely slanted second cut surface 17b".

Reference is now made to FIGS. 110–113 illustrating a fabrication method according to a tenth embodiment of the present invention.

Figure 110:
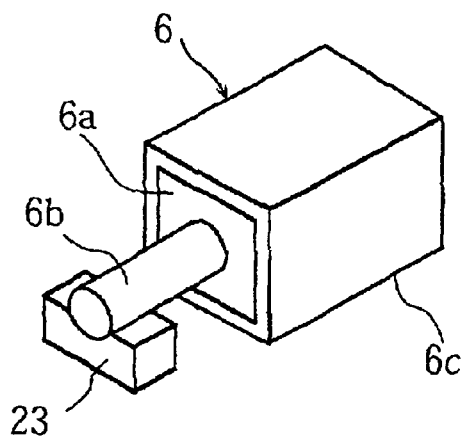
FIG. 110 is a perspective view showing a capacitor element used for implementing a fabrication method according to a tenth embodiment of the present invention.

FIG. 110 shows a capacitor element 6 used for implementing the fabrication method of this embodiment. As readily seen, the illustrated capacitor element 6, provided with a metal piece 23 welded to a bar-like anode 6b, is identical to the capacitor element used for the fourth embodiment (see FIG. 35B). Except for the constructional difference of the capacitor elements to be used, the fabrication method of the tenth embodiment is basically similar to the method of the seventh embodiment (FIGS. 78–91).

Figure 111:
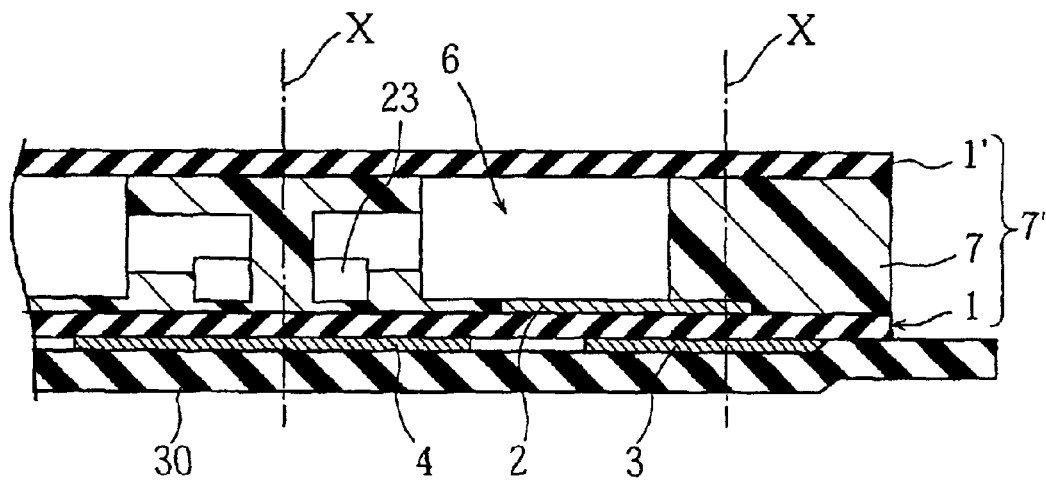
FIG. 111 is a sectional view showing a plate assembly obtained by the fabrication method of the tenth embodiment.

Specifically, according to the fabrication method of the tenth embodiment, a predetermined number of capacitor elements 6 (FIG. 110) are placed on a lower sheet member 1 (see FIG. 111), and then an upper sheet member 1' is stacked on the capacitor elements 6. A synthetic resin material is poured into the space between the lower and the upper sheet members 1, 1' to enclose the capacitor elements 6. The thus supplied resin material is hardened to form a resin plate 7 attached to the lower and the upper sheet members 1, 1'. The resin plate 7, the lower sheet member 1 and the upper sheet member 17 are combined to form a plate assembly 7', as shown in FIG. 111. The plate assembly 7' is attached to an expansion sheet 30.

Figure 112:
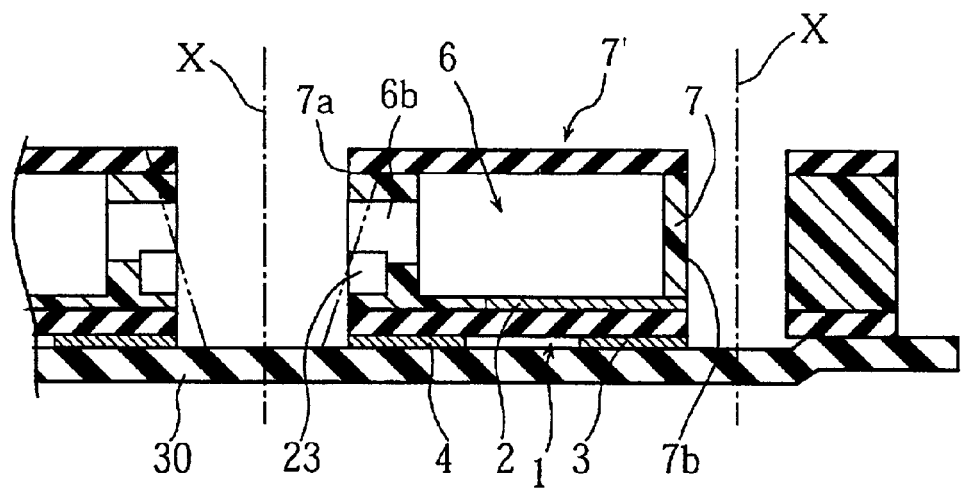
FIG. 112 is a sectional view showing the plate assembly of FIG. 111 with several cuts made therein.

Then, as shown in FIG. 112, the plate assembly 7' is cut along the cutting lines X, so that first cut surfaces 7a and second cut surfaces 7b are generated in the plate assembly 7'. At the first cut surfaces 7a, the anodes 6b of the respective capacitor elements 6, the associated metal pieces 23 and the anode electrode layers 4 are exposed to the exterior. At the second cut surfaces 7b, on the other hand, the cathode connection layers 2 and the cathode electrode layers 3 are exposed to the exterior.

Figure 113:
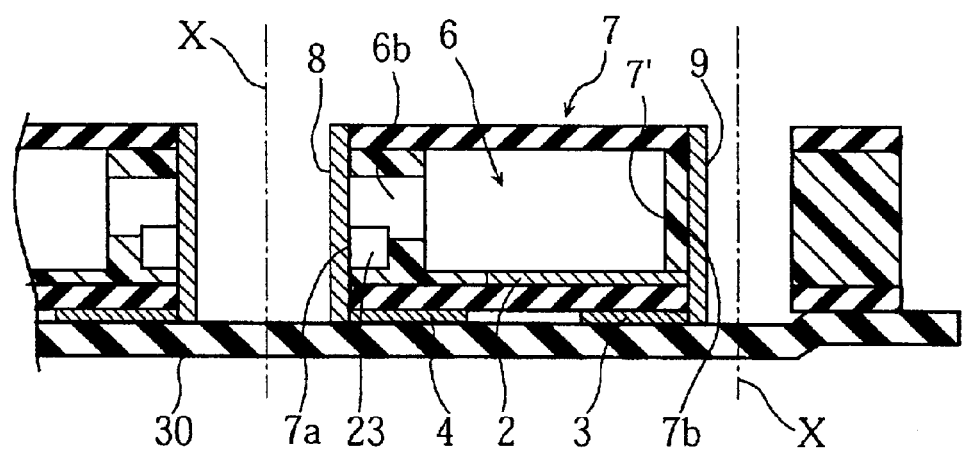
FIG. 113 is a sectional view showing the divided plate assembly of FIG. 112 with terminal electrode layers formed on its exposed cut surfaces.

Then, as shown in FIG. 113, anode terminal layers 8 are formed on the first cut surfaces 7a, while cathode terminal layers 9 are formed on the second cut surfaces 7b. The anode terminal layers 8 are connected to the anodes 6b, the metal pieces 23 and the anode electrode layers 4. The cathode terminal layers 9 are connected to the cathode connection layers 2 and the cathode electrode layers 3.

Then, the plate assembly 7' is cut along non-illustrated cutting lines perpendicular to the cutting lines X, and finally the expansion sheet 30 is removed. As a result, a desired number of solid electrolytic capacitors 10N as shown in FIG. 114 are obtained collectively.

Figure 114:
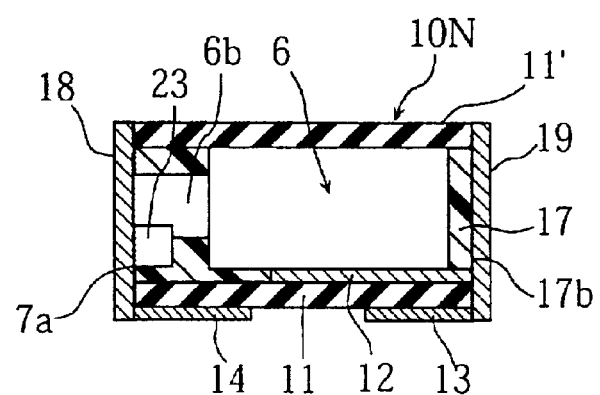
FIG. 114 is a sectional view showing a solid electrolytic capacitor obtained by the fabrication method of the tenth embodiment.

The capacitor 10N shown in FIG. 114 is basically the same as the capacitor 10K of the seventh embodiment shown in FIG. 93 except for the metal peace 23 fixed to the anode 6b. The anode bump 6b' (FIG. 93) for establishing proper electrical connection between the anode terminal layer 18 and the capacitor element 6 may not be needed for the capacitor 10N of the tenth embodiment.

Figure 115:
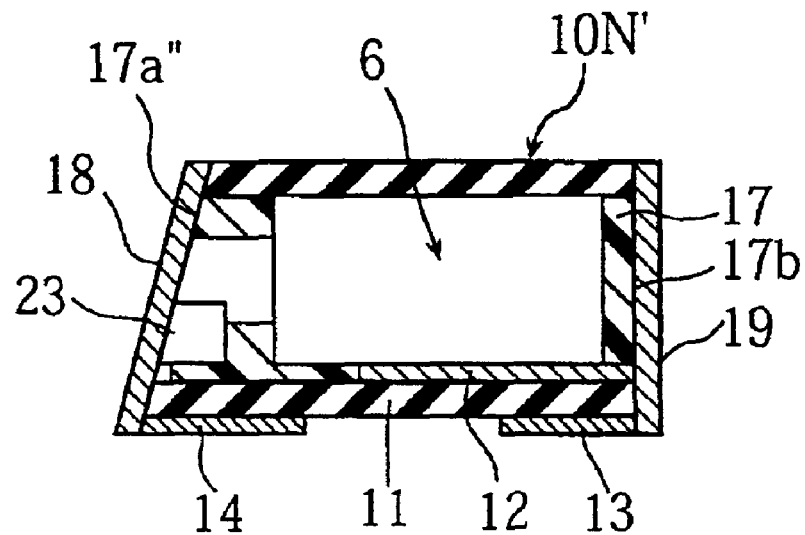
FIG. 115 is a sectional view showing a different type of solid electrolytic capacitor according to the tenth embodiment.
Figure 116:
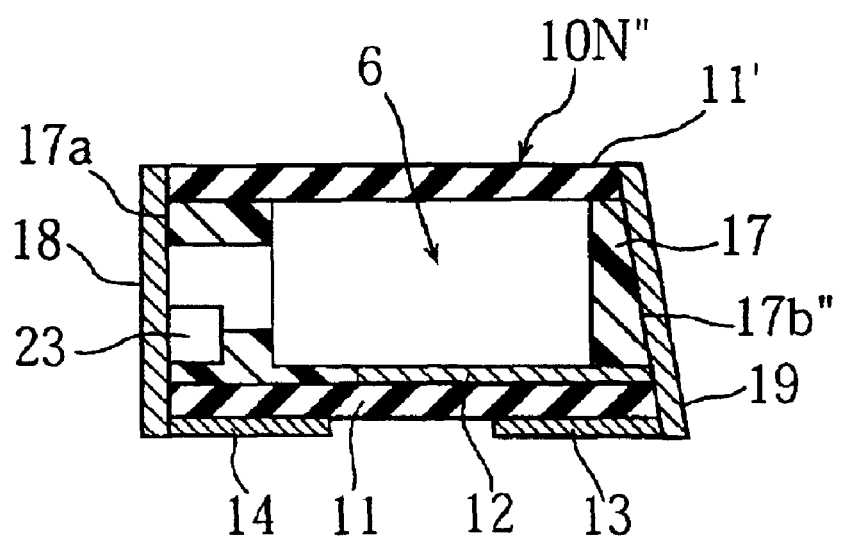
FIG. 116 is a sectional view showing another type of solid electrolytic capacitor according to the tenth embodiment.

FIGS. 115 and 116 show modified versions of the capacitor ION shown in FIG. 114. The modified capacitor 10N' of FIG. 115 has an entirely slanted first cut surface 17a" and an upright second cut surface 17b. On the other hand, the modified capacitor 10N" of FIG. 116 has an upright first cut surface 17a and an entirely slanted second cut surface 17b".

Reference is now made to FIGS. 117–121 illustrating a fabrication method according to an eleventh embodiment of the present invention. As readily seen from FIG. 117, capacitor elements 6 to be used for the fabrication method of this embodiment are the same as those used for the fabrication method of the fifth embodiment (see FIG. 47).

Figure 117:
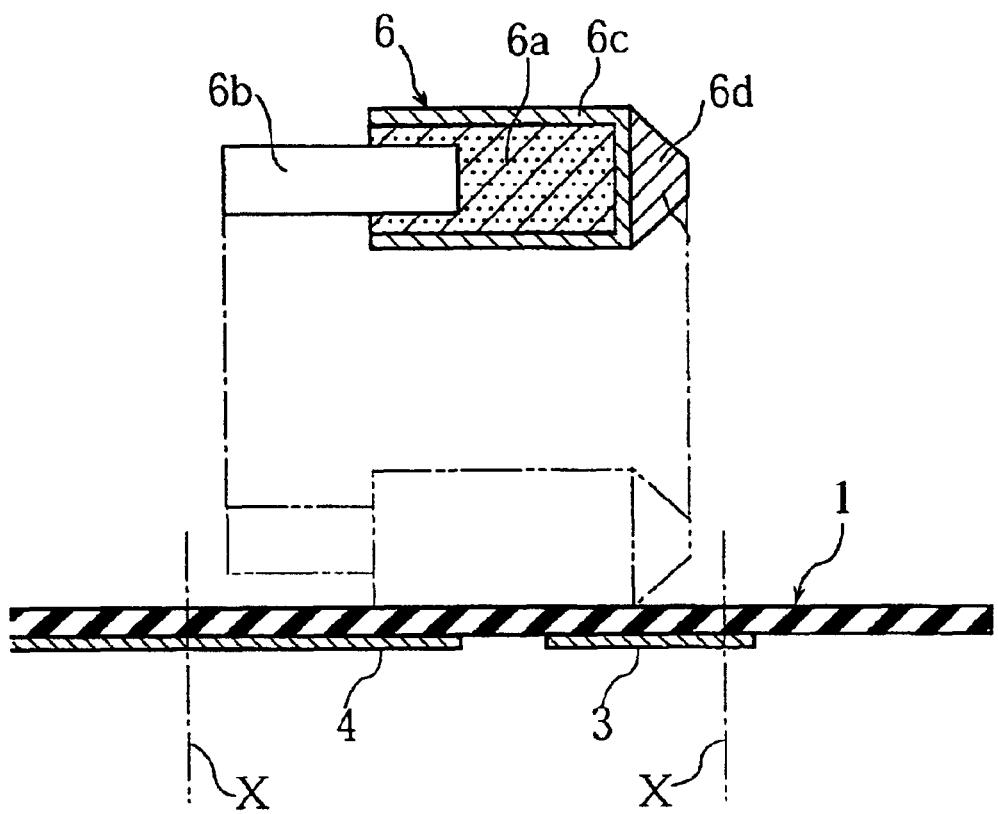
FIG. 117 is a sectional view showing a sheet member and a capacitor element used for implementing a fabrication method according to an eleventh embodiment of the present invention.

According to the fabrication method of the eleventh embodiment, first, a predetermined number of capacitor elements 6 are mounted on a lower sheet member 1, as shown in FIG. 117. The obverse (upper) surface of the sheet member 1 is formed with no conductive layers, while the reverse (lower) surface thereof is formed with cathode electrode layers 3 and anode electrode layers 4. These electrode layers 3 and 4 may be arranged in the same pattern as the counterparts of the seventh embodiment shown in FIG. 78.

Figure 118:
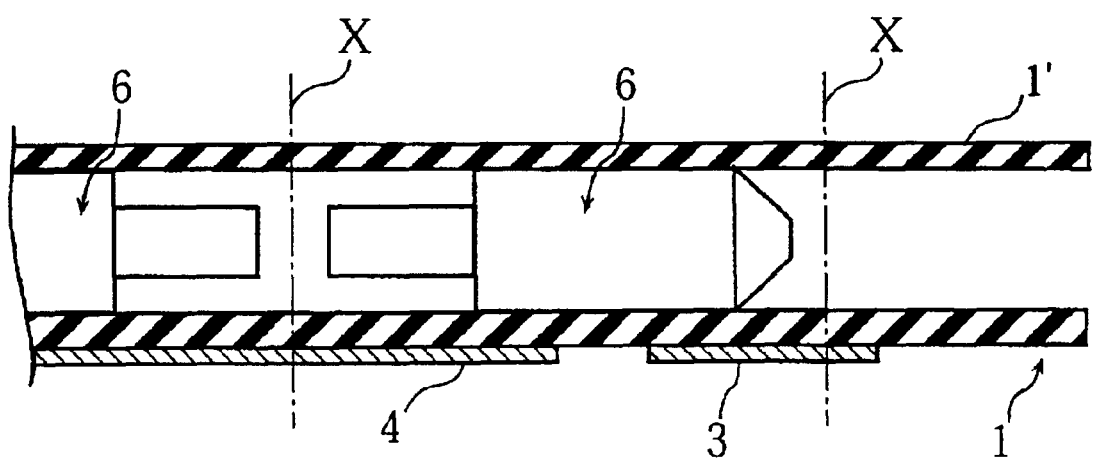
FIG. 118 is a sectional view showing one step of the fabrication method of the eleventh embodiment, in which capacitor elements are held between upper and lower sheet members.

Then, as shown in FIG. 118, an upper sheet member 1' is stacked on the capacitor elements 6. Thereafter, a synthetic resin material in a liquid state is poured into the space between the lower and the upper sheet members 1, 1' to enclose the respective capacitor elements 6.

Figure 119:
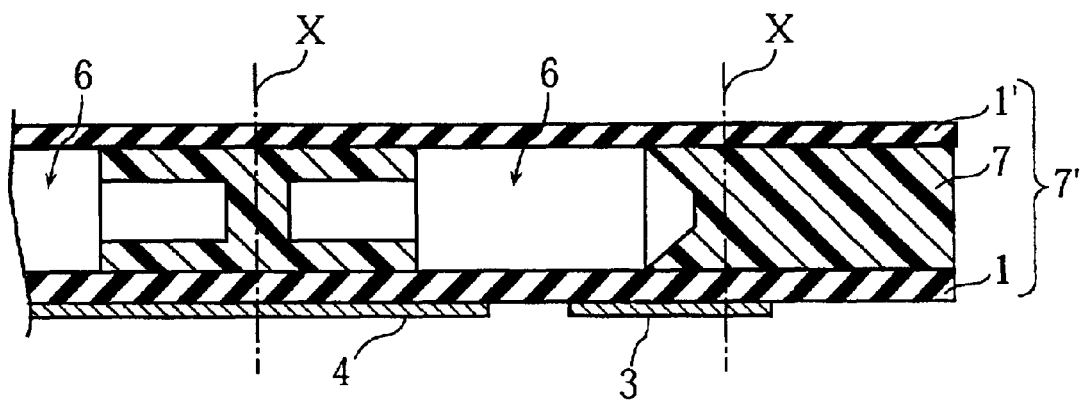
FIG. 119 is a sectional view showing another step of the fabrication method of the eleventh embodiment, in which the space between the two sheet members is filled with a resin material.

The thus supplied resin material is hardened to form a resin plate 7 attached to the lower and the upper sheet members 1 and 1', as shown in FIG. 119. The resin plate 7 and the two sheet members 1, 1' are combined to form a plate assembly 7'. Then, the plate assembly 7' is attached to an expansion sheet 30 (see FIG. 120).

Figure 120:
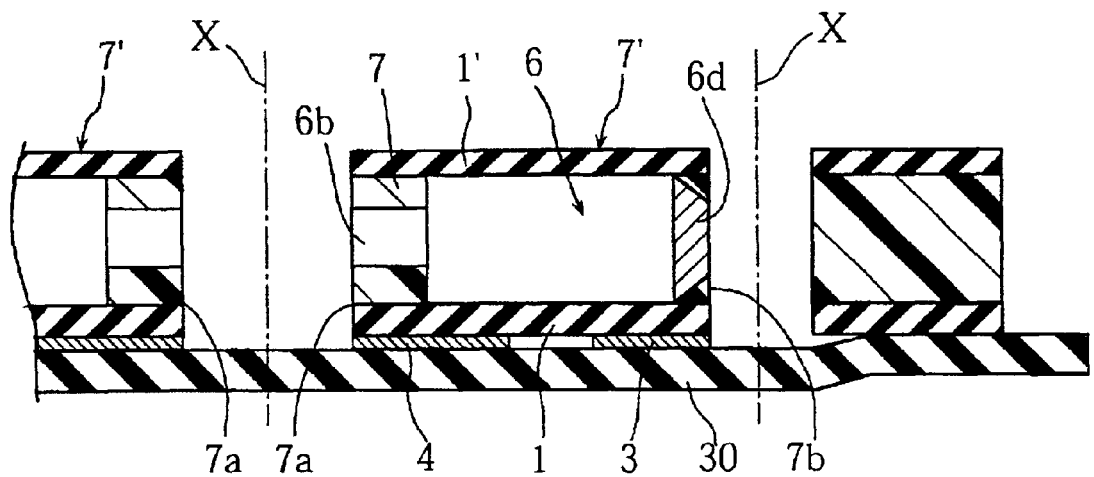

Then, as shown in FIG. 120, the plate assembly 7' is cut along the predetermined cutting lines X, whereby first cut surfaces 7a and second cut surfaces 7b are produced. At the first cut surfaces 7a, the anodes 6b of the respective capacitor elements 6 and the anode electrode layers 4 are exposed to the exterior. At the second cut surfaces 7b, on the other hand, the cathode bumps 4d of the respective capacitor elements 6 and the cathode electrode layers 3 are exposed to the exterior.

Figure 121:
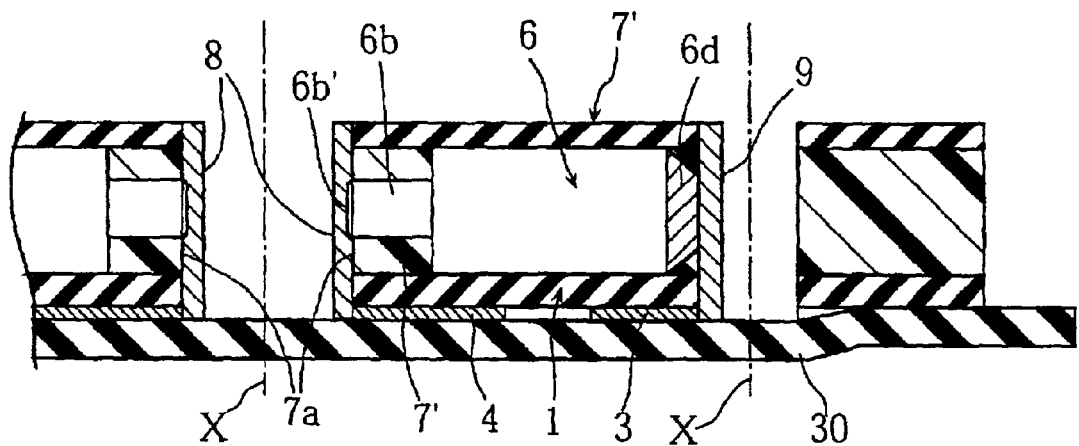

Then, as shown in FIG. 121, anode bumps 6b' may optionally be formed on the anodes 6b. Thereafter, anode terminal layers 8 and cathode terminal layers 9 are formed on the first cut surfaces 7a and the second cut surfaces 7b, respectively. The anode terminal layers 8 are connected to the anodes 6b and the anode electrode layers 4, while the cathode terminal layers 9 are connected to the cathode bumps 6d and the cathode electrode layers 3.

Then, though not shown, the plate assembly 7' is cut along predetermined cutting lines perpendicular to the cutting lines X, and finally the expansion sheet 30 is removed. In this manner, a desired number of solid electrolytic capacitors are obtained collectively.

Figure 122:
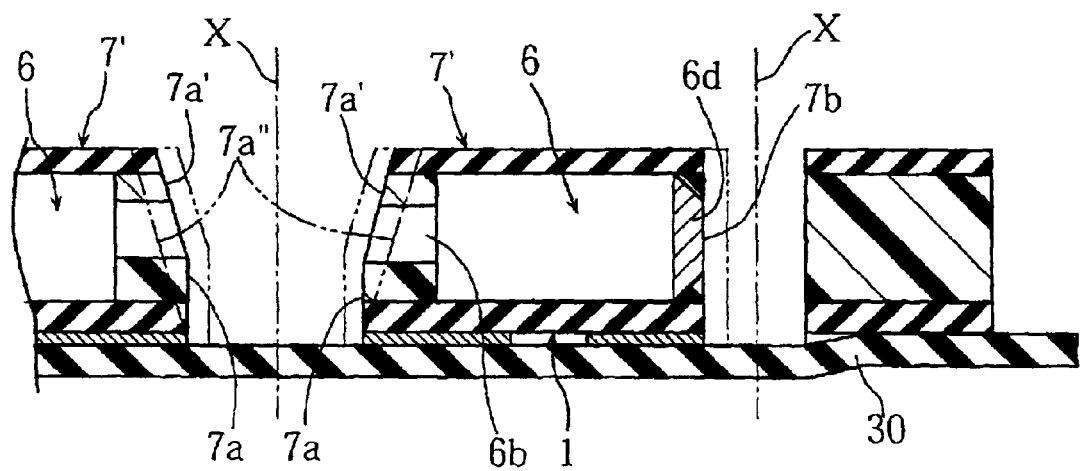

FIG. 122 shows a different manner for cutting the plate assembly 7' shown in FIG. 119. As illustrated, the plate assembly 7' may be formed with partially slanted portions 7a' or entirely slanted portions 7a", while its second cut surfaces 7b are upright.

Figure 123:
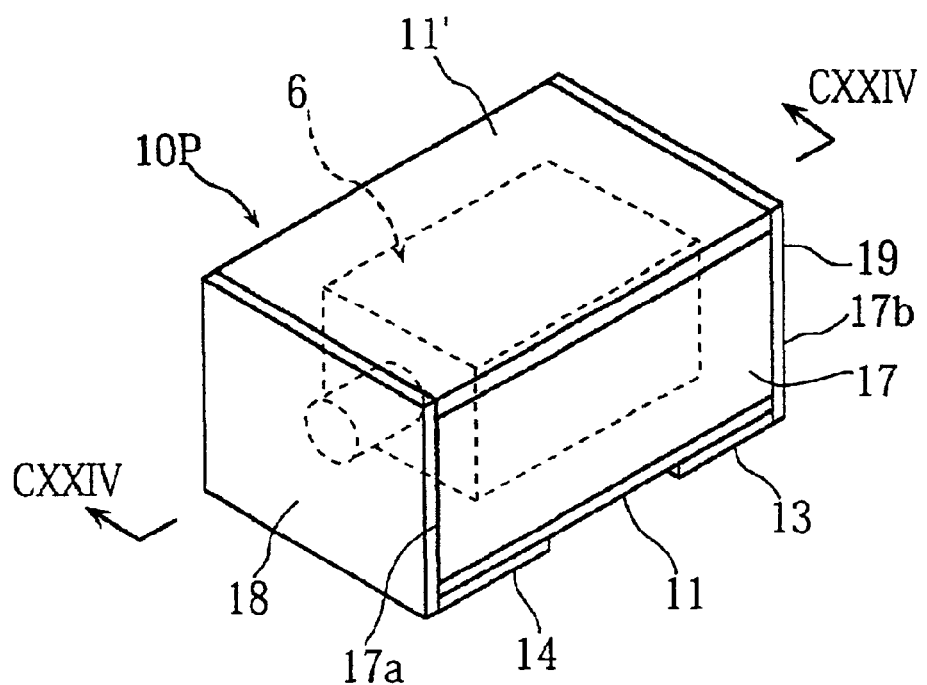
Figure 124:
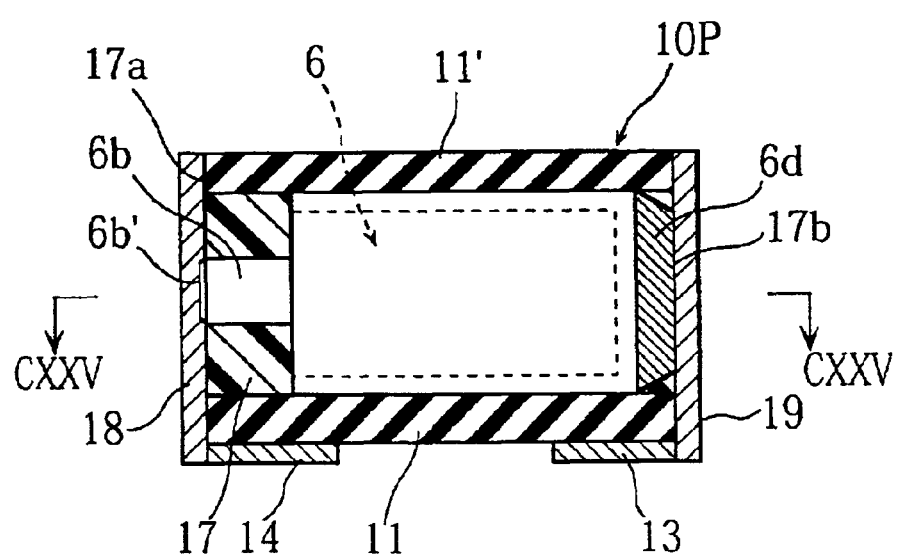
Figure 125:
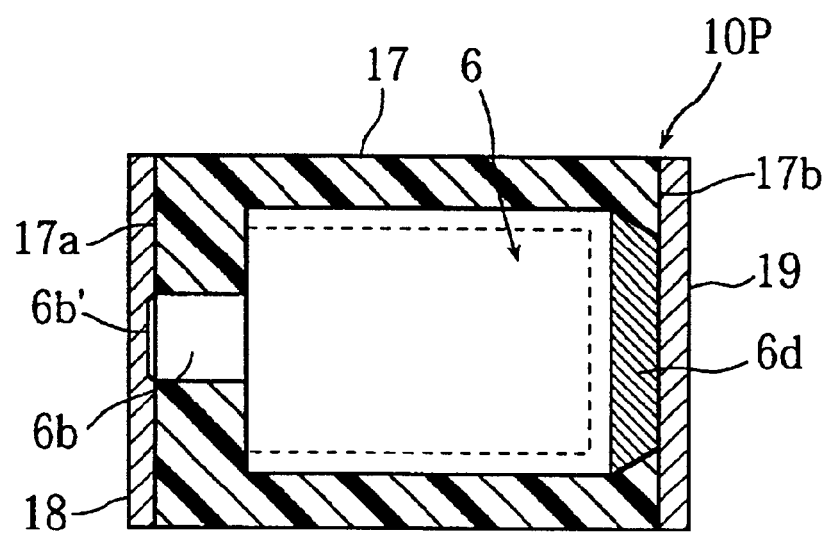
Figure 126:
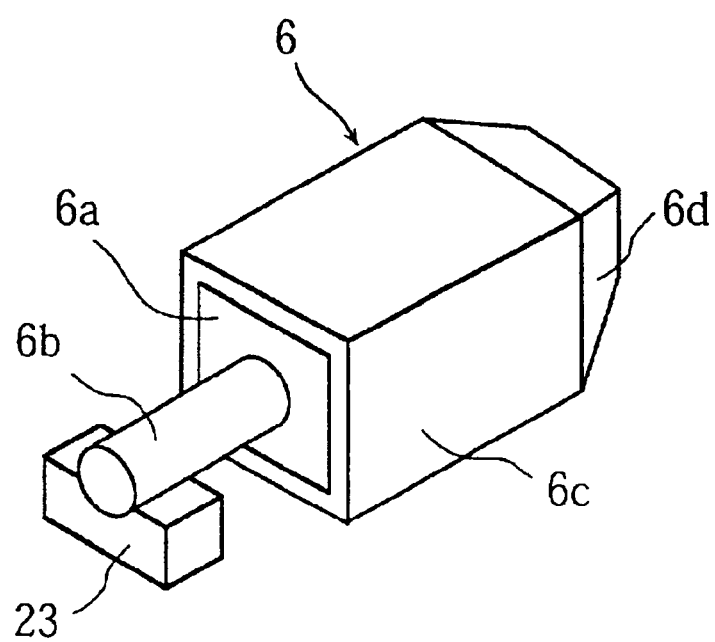

FIGS. 123–125 show a solid electrolytic capacitor 10P obtained by the fabrication method of the eleventh embodiment. As readily seen, the illustrated capacitor 10P is basically the same as the capacitor 10H of the fifth embodiment (see FIGS. 58–60) except that the former is provided with an upper resin sheet 11' arranged immediately above a capacitor element 6. In the capacitor 10P again, either one of the first cut surface 17a and the second cut surface 17b may be rendered partially or entirely slanted.

Figure 127:
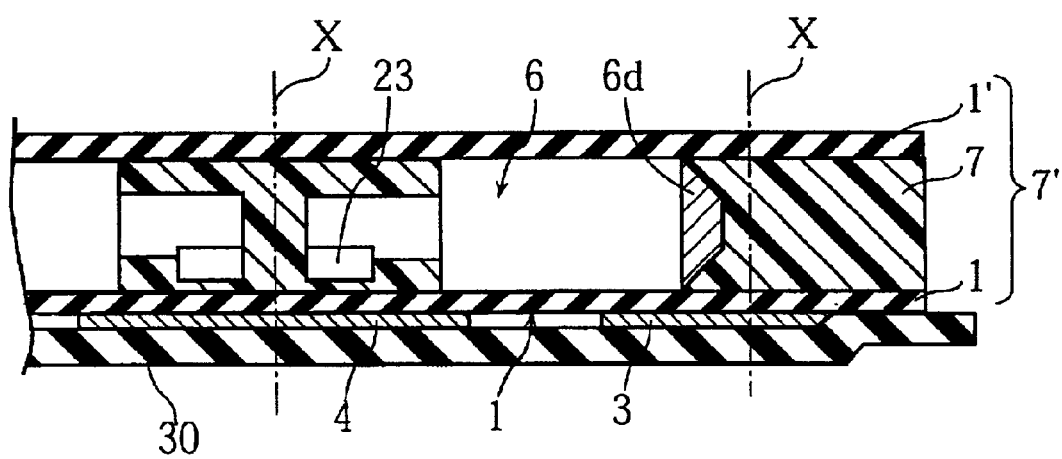

Reference is now made to FIGS. 126–129 illustrating a fabrication method according to a twelfth embodiment of the present invention. In this embodiment, use may be made of a capacitor element 6 shown in FIG. 126. The illustrated capacitor element 6 is the same as the capacitor element used for the sixth embodiment (see FIG. 69). Similarly to some of the previous embodiments, according to the fabrication method of the twelfth embodiment, a plate assembly 7' as shown in FIG. 127 is prepared which includes a lower sheet member 1, an upper sheet member 1' and a resin plate 7 attached to these sheet members 1, 1'. The plate assembly 7' is attached to an expansion sheet 30.

Figure 128:
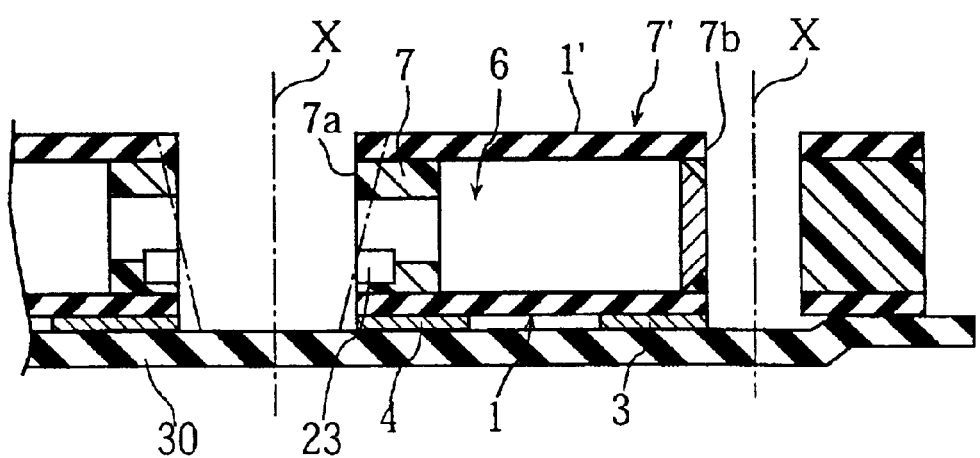
Figure 129:
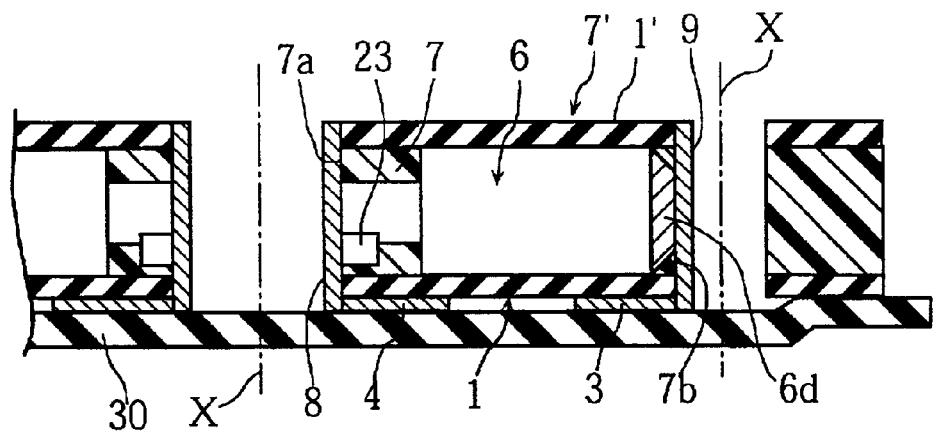

Then, as shown in FIG. 128, the plate assembly 7' is cut along the predetermined cutting lines X to produce first cut surfaces 7a and second cut surfaces 7b. Thereafter, as shown in FIG. 129, anode terminal layers 8 are formed on the first cut surfaces 7a, while cathode terminal layers 9 are formed on the second cut surfaces 7b.

Figure 130:
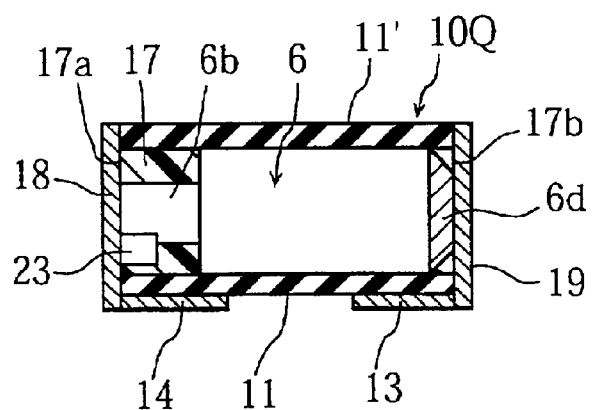

Then, though not illustrated, the plate assembly 7' is cut along the other sets of predetermined cutting lines perpendicular to the cutting lines X, and the expansion sheet 30 is removed. Consequently, a desired number of solid electrolytic capacitors as shown in FIG. 130 are obtained collectively. The capacitor 10Q shown in FIG. 130 is basically the same as the capacitor 10P of FIG. 124 except that the former is provided with a metal piece 23 welded to the anode 6b of the capacitor element 6. With such an arrangement, an anode bump 6b' shown in FIG. 124 may not be necessary.

Figure 131:
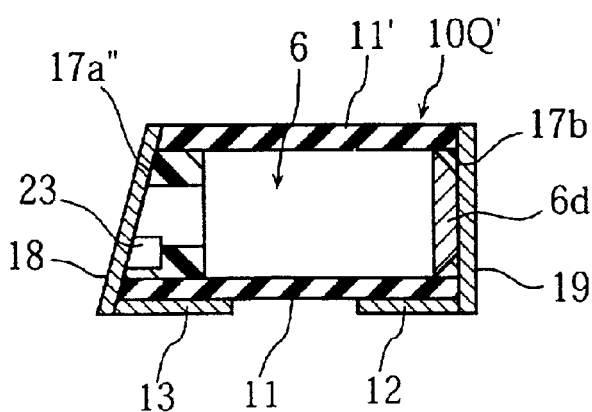

FIGS. 131 and 132 show modified versions of the capacitor 10Q shown in FIG. 130. As shown in FIG. 131, the modified capacitor 10Q' is provided with an entirely slanted first cut surface 17a" and an upright second cut surface 17b. On the other hand, the modified capacitor 10Q" shown in FIG. 132 is provided with an upright first cut surface 17a and an entirely slanted second cut surface 17b". Optionally, the capacitor 10Q" may be provided with a cathode connection layer 12 for establishing better electrical conduction between the capacitor element 6 and the cathode terminal layer 19. Further, in the capacitor 10Q", neither the anode 6b nor the metal element 23 may be exposed at the first cut surface 17a to be directly connected to the anode terminal layer 18. In this case, as shown in FIG. 77, an anode connection layer (reference numeral 24) may be formed on the lower resin sheet 11 for connecting the metal piece 23 to the anode terminal layer 18.

Reference is now made to FIGS. 133–135 illustrating a fabrication method according to a thirteenth embodiment of the present invention. In this method, use may be made of the same kind of capacitor elements as shown in FIG. 110. Specifically, each capacitor element 6 includes, among other things, a bar-like anode 6b and a metal piece welded to the anode 6b.

As seen from FIG. 133, a sheet member 1 used for implementing the method of the thirteenth embodiment is similar to the sheet member used for the second embodiment (see FIG. 26). Specifically, as shown in FIG. 133, the obverse surface of the illustrated sheet member 1 is formed with a plurality of cathode connection layers 2 arranged in several rows. Each row extends along the cutting lines X in the same manner as shown in FIG. 25. The reverse surface of the sheet member 1 is formed with elongated cathode electrode layers 3 disposed below the cathode connection layers 2. The reverse surface is also formed with elongated anode electrode layers 4 extending in parallel to the cathode electrode layers 3. As seen from FIG. 133, each anode electrode layer 4 is arranged between two adjacent cathode electrode layers 3, so that one of the predetermined cutting lines X halves the anode electrode layer 4 (see the cutting line Xa in FIG. 133).

The sheet member 1 is formed with through-holes 21 positioned in the same manner as shown in FIG. 25. The through-holes 21 are provided with conductors for electrically connecting the cathode connection layers 2 to the cathode electrode layers 3.

Differing from the sheet member 1 shown in FIGS. 25 and 26, the sheet member 1 of the thirteenth embodiment is provided, on its obverse side, with a plurality of anode connections layers 24 (only one is shown in FIG. 133).

These anode connection layers 24 may be arranged in several rows each extending along the cutting lines X. The same number of anode connection layers are provided in each row. The anode connection layers 24 in each row are arranged between two adjacent rows of cathode connection layers 2. Referring to FIG. 133, the illustrated anode connection layers 24 are disposed between the first-row cathode connection layers 2a and the second-row cathode connection layers 2b. The number of the illustrated anode connection layers 24 is equal to the number of the first-row cathode connection layers 2a (hence the number of the second-row cathode connection layers 2b). The anode connection layers 24 are spaced from each other along the cutting line Xa by the same pitch as that of the first-row cathode connection layers 2a.

In addition to the above-mentioned through-holes 21, the sheet member 1 is also formed with through-holes 27, as shown in FIG. 133. The through-holes 27 are provided with conductors for electrically connecting the anode connection layers 24 to the anode electrode layers 4. As seen from FIG. 133, a pair of through-holes 27 are provided for each anode connection layer 24. The paired through-holes 27 are arranged symmetrically with respect to a relevant one of the cutting lines X.

According to the fabrication method of the thirteenth embodiment, a predetermined number of capacitor elements are placed on the sheet member 1 having the above-described arrangements. Specifically, as shown in FIG. 133, each of the capacitor element 6 is mounted on the sheet member 1 in a manner such that its cathode 6c is connected to a corresponding one of the cathode connection layers 2 via conductive adhesive, while its metal piece 23 is connected to a corresponding one of the anode connection layers 24 via conductive adhesive.

Then, as shown in FIG. 134, a resin plate 7 is formed on the sheet member 1 to enclose the respective capacitor elements 6. Thereafter, an expansion sheet 30 may be attached to the reverse surface of the sheet member 1.

Then, as shown in FIG. 135, the resin plate 7 is cut along the predetermined cutting lines X. Further, though not shown, the resin plate 7 is cut along other cutting lines perpendicular to the cutting lines X. Finally, the expansion sheet 30 is removed. In this manner, a desired number of solid electrolytic capacitors 10R as shown in FIG. 136 are obtained collectively.

The capacitor 10R shown in FIG. 136 may not be provided with an anode terminal layer 18 or a cathode terminal layer 19. The cathode electrode layer 13 is electrically connected to the cathode of the capacitor element 6 via the cathode connection layer 12 and the conductor arranged in the through-hole 21. The anode electrode layer 14 is electrically connected to the anode 6b of the capacitor element 6 via the metal piece 23, the anode connection layer 24 and the conductor arranged in the through-hole 27. With such an arrangement, since no terminal layers may be needed, it is possible to reduce the size, weight and production costs of the capacitor 10R. Wherever appropriate, however, the capacitor 10R may be formed with anode and cathode terminal layers 18, 19, as shown by double-dot chain lines in FIG. 136.

FIG. 137 shows a modified version of the capacitor 10R of FIG. 136. The modified capacitor 10R' includes an entirely slanted first cut surface 17a" and an upright second cut surface 17b. FIG. 138 shows another modified version of the capacitor 10R. The modified capacitor 10R" includes an upright first cut surface 17a and an entirely slanted second cut surface 17b".

Reference is now made to FIGS. 139–142 illustrating a fabrication method according to a fourteenth embodiment of the present invention. As seen from FIG. 139, a capacitor element 6 used for this embodiment may be the same as the capacitor element shown in FIG. 110.

As seen from FIGS. 139 and 140, a sheet member 1 used for the fabrication method of this embodiment is formed with plural pairs of first through-holes 22 and second through-holes 28 (only one pair is shown in FIGS. 139 and 140). As best shown in FIG. 140, each of the first and the second through-holes 22, 28 is halved by a corresponding one of the predetermined cutting lines X.

The obverse surface of the sheet member 1 is formed with a plurality of cathode connection layers 2 each of which encloses a corresponding one of the first through-holes 22, as shown in FIG. 140. The obverse surface of the sheet member 1 is also formed with a plurality of of anode connection layers 24 each of which encloses a corresponding one of the second through-holes 28.

As seen from FIG. 139, the reverse surface of the sheet member 1 is formed with a plurality of cathode electrode layers 3 each of which encloses a corresponding one of the first through-holes 22. The reverse surface of the sheet member 1 is also formed with a plurality of anode electrode layers 4 each of which encloses a corresponding one of the second through-holes 28. The first through-holes 22 are provided with conductors for electrically connecting the cathode connection layers 2 to the cathode electrode layers 3. Likewise, the second through-holes 28 are provided with conductors for electrically connecting the anode connection layers 24 to the anode electrode layers 4.

According to the fabrication method of the fourteenth embodiment, a predetermined number of capacitor elements 6 are placed on the sheet member 1 having the above-described arrangements. Specifically, as shown in FIG. 139, each of the capacitor elements 6 is mounted on the sheet member 1 in a manner such that its cathode 6c is connected to a corresponding one of the cathode connection layers 2, while its metal piece 23 is connected to a corresponding one of the anode connection layers 24. Use may be made of conductive adhesive for fixing each capacitor element 6 to the sheet member 1.

Then, as shown in FIG. 141, a resin plate 7 is formed on the sheet member 1 to enclose the respective capacitor elements 6. Part of the resin plate 7 extends into the first and the second through-holes 22, 28. Thereafter, an expansion sheet 30 is attached to the reverse (or lower) surface of the resin plate 7.

Then, as shown in FIG. 142, the resin plate 7 is cut along the predetermined cutting lines X. Though not illustrated, the resin plate 7 is further cut along the other sets of cutting lines Y (see FIG. 140) perpendicular to the cutting lines X. Finally, the expansion sheet 30 is removed. In this manner, a desired number of solid electrolytic capacitors 10S shown in FIG. 143 are obtained collectively.

With the arrangement shown in FIG. 143 again, no anode terminal layer nor cathode terminal layer (shown by double-dot chain lines) may be needed.

FIGS. 144 and 145 show modified versions of the capacitor 10S of FIG. 143. The modified capacitor 10S' of FIG. 144 is provided with an entirely slanted first cut surface 17a" and an upright second cut surface 17b. On the other hand, the modified capacitor 10S" of FIG. 145 is provided with an upright first cut surface 17a and an entirely slanted second cut surface 17b".

Reference is now made to FIG. 146 illustrating a fabrication method according to a fifteenth embodiment of the present invention. The fabrication method of this embodiment is basically the same as the method of the thirteenth embodiment except that the method of the fifteenth embodiment includes an additional step of stacking an upper sheet member 1' on the capacitor elements 6 mounted on the lower sheet member 1. After the upper sheet member 1' is properly stacked, a synthetic resin material is supplied into the space between the lower and the upper sheet members 1, 1'. The thus supplied resin material is then hardened to form a resin plate 7 attached to the lower and the upper sheet members 1, 1'. The resin plate 7, the lower sheet member 1 and the upper sheet member 1' constitute a plate assembly 7'. Thereafter, the plate assembly 7' is divided to collectively provide a desired number of solid electrolytic capacitors.

FIG. 147 shows a solid electrolytic capacitor 10T obtained by the fabrication method of the fifteenth embodiment. As readily seen, the illustrated capacitor 10T is the same as the capacitor 10R shown in FIG. 136 except that the capacitor 10T is provided with an upper resin sheet 11' arranged immediately above the capacitor element 6. The upper resin sheet 11' can have an advantageously small thickness. Thus, the height or thickness of the capacitor 10T shown in FIG. 147 may be rendered smaller than that of the capacitor 10R shown in FIG. 136.

FIGS. 148 and 149 show modified versions of the capacitor 10T of FIG. 147. The modified capacitor 10T' shown in FIG. 148 is provided with an entirely slanted first cut surface 17a" and an upright second cut surface 17b. On the other hand, the modified capacitor 10T" shown in FIG. 149 is provided with an upright first cut surface 17a and an entirely slanted second cut surface 17b".

Reference is now made to FIG. 150 illustrating a fabrication method according to a sixteenth embodiment of the present invention. The fabrication method of this embodiment is basically the same as the method of the fourteenth embodiment except that the method of the sixteenth embodiment includes an additional step of stacking an upper sheet member 1' on the capacitor elements 6 mounted on the lower sheet member 1. After the upper sheet member 1' is properly stacked, an expansion sheet 30 may be attached to the lower sheet member 1. Then, a synthetic resin material is supplied into the space between the lower and the upper sheet members 1, 1'. The thus supplied resin material is then hardened to form a resin plate 7 attached to the lower and the upper sheet members 1, 1'. The resin plate 7, the lower sheet member 1 and the upper sheet member 1' constitute a plate assembly 7'.

Then, though not illustrated, the plate assembly 7' is cut along the predetermined cutting lines X and non-illustrated other cutting lines perpendicular to the cutting lines X. Thereafter, the expansion sheet 30 is removed, whereby a desired number of solid electrolytic capacitors 10U as shown in FIG. 151 are obtained collectively. As readily seen from FIG. 151, the capacitor 10U obtained by the method of the sixteenth embodiment is basically the same as the capacitor 10S shown in FIG. 143 except that the capacitor 10U is provided with an upper resin sheet 11' arranged immediately above the capacitor element 6.

FIGS. 152 and 153 show modified versions of the capacitor 10U of FIG. 151. The modified capacitor 10U' shown in FIG. 152 is provided with an entirely slanted first cut surface 17a" and an upright second cut surface 17b. On the other hand, the modified capacitor 10U" shown in FIG. 153 is provided with an upright first cut surface 17a and an entirely slanted second cut surface 17b".

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A solid electrolytic capacitor comprising:
    a capacitor element having an anode and a cathode;
    a base sheet member made of resin, the base sheet member having an obverse surface for mounting the capacitor element and a reverse surface opposite to the obverse surface;
    a protection package formed on the obverse surface of the sheet member to enclose the capacitor element, the package being made of a resin composition only and having a first side surface adjacent to the anode of the capacitor element and a second side surface opposite to the first side surface;
    a conductive outer anode layer electrically connected to the anode of the capacitor element; and
    a conductive outer cathode layer electrically connected to the cathode of the capacitor element, the outer cathode layer being spaced from the cathode of the capacitor element with the base sheet member positioned therebetween;
    wherein the outer anode layer is formed on at least one of the package and the sheet member, the outer cathode layer being formed on the reverse surface of the sheet member, and
    wherein the base sheet member is brought into direct contact with the protection package between the first side surface and the second side surface of the protection package.

2. The solid electrolytic capacitor according to claim 1, further comprising an upper sheet member for shielding the capacitor element, the capacitor element being arranged between the base sheet member and the upper sheet member.

3. The solid electrolytic capacitor according to claim 1, wherein the package is formed with an at least partially slanted portion.

4. The solid electrolytic capacitor according to claim 1, wherein the outer anode layer is formed on at least one of the first side surface of the package and the reverse surface of the base sheet member, the outer cathode layer extending onto the second side surface of the package.

5. The solid electrolytic capacitor according to claim 4, wherein the anode is exposed at the first side surface of the package to come into contact with the outer anode layer.

6. The solid electrolytic capacitor according to claim 4, further comprising a metal piece attached to the anode of the capacitor element, the metal piece being exposed at the first side surface of the package to come into contact with the outer anode layer.

7. The solid electrolytic capacitor according to claim 4, further comprising a metal piece attached to the anode of the capacitor element and an anode connection layer formed on the obverse surface of the base sheet member, the anode connection layer being connected to the metal piece and exposed at the first side surface of the package to come into contact with the outer anode layer.

8. The solid electrolytic capacitor according to claim 4, further comprising a metal piece attached to the anode of the capacitor element and an anode connection layer formed on the obverse surface of the base sheet member, the metal piece being connected to the anode connection layer, the base sheet member being formed with a through-hole for connecting the anode connection layer to the outer anode layer.

9. The solid electrolytic capacitor according to claim 5, further comprising a cathode connection layer formed on the obverse surface of the base sheet member and connected to the cathode of the capacitor element, the cathode connection layer being exposed at the second side surface of the package to come into contact with the outer cathode layer.

10. The solid electrolytic capacitor according to claim 5, further comprising a cathode bump arranged on the cathode of the capacitor element, the cathode bump being exposed at the second side surface of the package to come into contact with the outer cathode layer.

11. The solid electrolytic capacitor according to claim 1, further comprising a cathode connection layer formed on the obverse surface of the base sheet member and connected to the cathode of the capacitor element, the base sheet member being formed with a through-hole for connecting the cathode connection layer to the outer cathode layer.

12. The solid electrolytic capacitor according to claim 1, wherein the capacitor element comprises a valve metal body, the anode comprising a bar projecting from the metal body, the cathode comprising a cathode layer formed on the metal body.

13. The solid electrolytic capacitor according to claim 1, further comprising a flat conductive cathode connection layer electrically connected to the outer cathode layer, wherein the cathode connection layer extends only on the obverse surface of the base sheet member, the cathode connection layer including an obverse surface and a reverse surface, the obverse surface of the cathode connection layer coming into direct contact with the cathode of the capacitor element, the reverse surface of the cathode connection layer coming into direct contact with the obverse surface of the base sheet member.

14. The solid electrolytic capacitor according to claim 13, wherein the outer cathode layer comprises a flat cathode electrode portion extending only on the reverse surface of the base sheet member, the cathode electrode portion being parallel to the cathode connection layer.

15. The solid electrolytic capacitor according to claim 14, wherein the cathode connection layer and the cathode electrode portion extend in a direction running from the second side surface to the first side surface of the package, the cathode connection layer extending beyond the cathode electrode portion toward the first side surface of the package.

* * * * *